United States Patent [19]

Trottier et al.

[11] Patent Number: 4,851,988
[45] Date of Patent: Jul. 25, 1989

[54] LOOSELY-COUPLED COMPUTER SYSTEM USING GLOBAL IDENTIFIERS TO IDENTIFY MAILBOXES AND VOLUMES

[75] Inventors: Robert R. Trottier, Lowell, Mass.; Robert J. Slezak, Hollis, N.H.

[73] Assignee: Wang Laboratories, Inc., Lowell, Mass.

[21] Appl. No.: 846,665

[22] Filed: Mar. 31, 1986

[51] Int. Cl.[4] ............... G06F 13/00; G06F 15/16
[52] U.S. Cl. ............................................. 364/200
[58] Field of Search ... 364/200 MS File, 900 MS File; 370/94

[56] References Cited

U.S. PATENT DOCUMENTS

| | | | |
|---|---|---|---|
| 4,007,450 | 2/1977 | Haibt et al. | 364/200 |
| 4,253,146 | 2/1981 | Bellamy | 364/200 |
| 4,287,592 | 9/1981 | Paulish et al. | 370/94 |
| 4,335,426 | 6/1982 | Maxwell | 364/200 |
| 4,342,083 | 7/1982 | Freedman | 364/200 |
| 4,400,775 | 8/1983 | Nozaki et al. | 364/200 |
| 4,414,624 | 11/1983 | Summer et al. | 364/200 |
| 4,488,231 | 12/1984 | Yu et al. | 364/200 |
| 4,570,220 | 2/1986 | Tetrick et al. | 364/200 |
| 4,709,325 | 11/1987 | Yajima | 364/200 |
| 4,748,558 | 5/1988 | Hirosawa | 364/200 |
| 4,769,771 | 9/1988 | Lippmann et al. | 364/200 |

OTHER PUBLICATIONS

A. Tanenbaum, R. Van Renesse, Distributed Operating Systems, ACM Computing Surveys, vol. 17, No. 4, 1986, pp. 419–470.
J. Morris, et. al., ANDREW: A Distributed Personal Computing Environment, CACM, vol. 29, No. 3, 1986, pp. 184–201.
Nancy Kronenberg, et. al., VAXclusters: A Closely–Coupled Distributed System, ACM Transactions on Computer Systems, vol. 4, No. 2, 1986, pp. 130–146.
Guide to VAXclusters, Digital Equipment Co., Order Number AA-Y513A-TE, 1984, Chapter 4, Managing Cluster Disks.

Primary Examiner—Raulfe B. Zache
Assistant Examiner—Emily Y. Chan
Attorney, Agent, or Firm—Michael H. Shanahan; Gordon E. Nelson

[57] ABSTRACT

A loosely-coupled computer system certains global resources and is made up of stand-alone systems connected by a data link. Each stand-alone system includes a global identifier list which contains identifiers for global resources and the locations of those resources. The global identifier list in each system is identical to those on other systems. Each system further includes a global identifier list maintenance system, an outbound global resource system, an inbound global resource system, and a communications system. When a request for a global resource is made in a stand-alone system, the outbound global resource system determines whether the resource is local or remote. If the resource is remote, the outbound global resource system makes a resource access message and sends it via the communications system to the remote system where the resource is located. The inbound global resource system on the remote system responds to the resource access message by performing the access and providing a return message to the local system. The global identifier list maintenance system keeps the identifier list identical in all stand-alone systems. Global resources disclosed include global aliases for mailboxes, global file access, and global user and group name lists.

15 Claims, 24 Drawing Sheets

B. LOOSELY-COUPLED SYSTEM 111

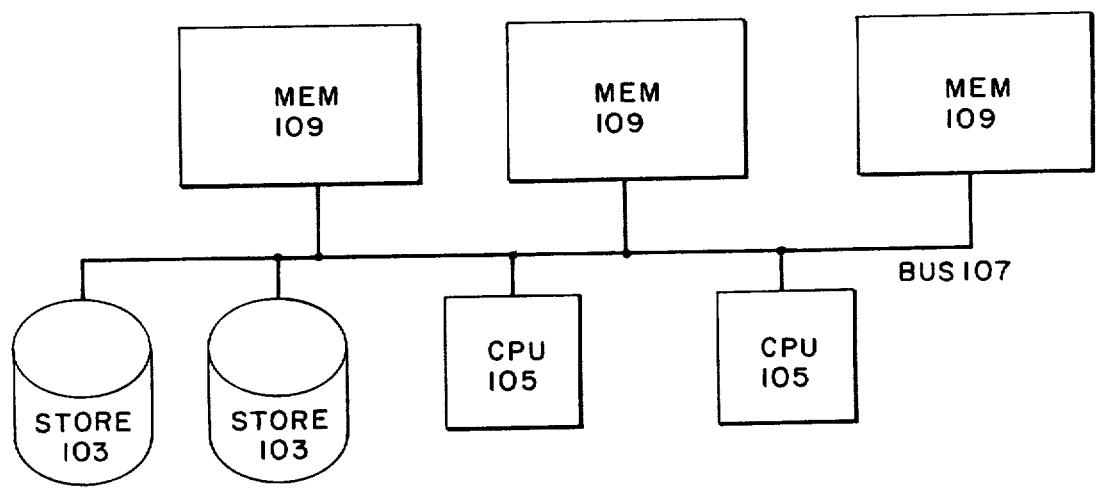
FIG. IA
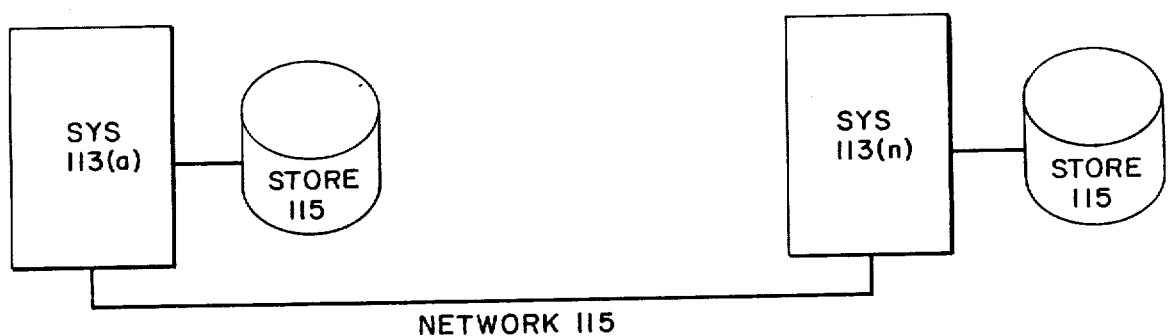
B. LOOSELY-COUPLED SYSTEM III
FIG. IB

| GF 901 | L/R 903 | INA 905 | GR 907 |
|---|---|---|---|
| RI 909 | RC 910 | | |

ALIAS 911

| MBPTR | 913 |
|---|---|
| MABCHN | 915 |
| SABCHN | 917 |

AB 517

| NRSCBCHN | 1003 |
|---|---|
| SCBPTR | 1005 |
| ACKSEM | 1007 |
| LSID | 1009 |
| RSID | 1011 |
| PKTPTR | 1013 |
| FCI | 1015 |
| RDISSMESS | 1021 |
| TNCB | 1023 |

RSCB 1001

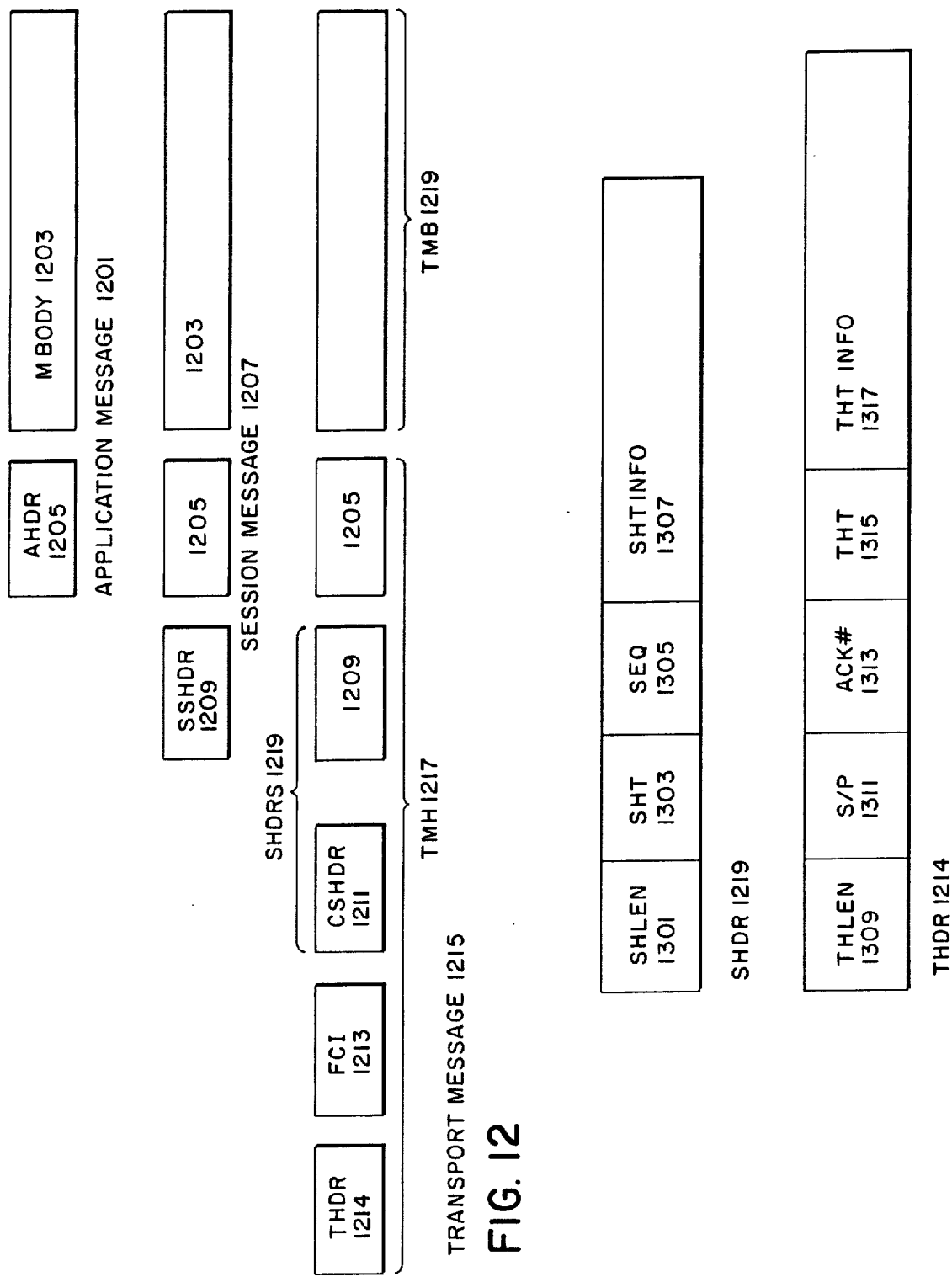

| VNAME | 2301 |
|---|---|
| VDA | 2303 |
| VSYS | 2305 |
| GVLCHN | 2307 |

VLE 1809

| TS | 2309 |
|---|---|
| SRCHN | 2311 |
| VRCHN | 2313 |
| PMBID | 2315 |
| VNAME | 2317 |
| . | |
| . | |
| VDA | 2319 |
| | |
| VSYS | 2323 |

MR 2203

| STS | 2325 |
|---|---|
| RTS | 2327 |
| LCHN | 2329 |
| MRPTR | 2331 |
| VCBADDR | 2333 |
| VNAME | 2335 |
| | |
| VSYS | 2337 |
| | |
| ACKFLGS | 2341 |

MPE 2211

| REQSYS | 2343 |
|---|---|
| VOLSYS | 2345 |
| RMBID | 2347 |
| | |
| NACKRFL | 2349 |
| DPLCHN | 2351 |
| VNAME | 2353 |
| OKFL | 2355 |
| NOACKFL | 2357 |

DPE 2219

FIG. 23

LOOSELY-COUPLED COMPUTER SYSTEM USING GLOBAL IDENTIFIERS TO IDENTIFY MAILBOXES AND VOLUMES

BACKGROUND OF THE INVENTION

1. Field of the Invention

The present invention relates to data processing systems and more particularly to data processing systems made up of a plurality of loosely-coupled stand-alone systems.

2. Description of the Prior Art: FIG. 1

It has been common in the art to make large computer systems by combining a number of smaller computer systems. The components thus assembled into a large computer system may be either tightly or loosely coupled together. FIG. 1 contains a conceptual block diagram of a tightly-coupled system 101. System 101 contains at least a number of mass storage devices 103, a number of CPUs 105, and a number of memory units 109. All of these devices are connected to a single bus 107 and function as a single unit. Thus, any of the CPUs 105 may reference data in any of MEMs 109 and may retrieve files from any store 103. Since system 101 is in fact a single system, users of system 101 need know nothing about the system's topography.

FIG. 1 further contains a conceptual block diagram of loosely-coupled system 111. Loosely-coupled system 111 consists of a number of stand-along computer systems 113 connected by a network 115. Mass storage units 115 may be associated with any of the stand-along systems 113. Data may be exchanged between systems 113 via network 115, but system 111 does not appear to its users as a single system. If a user on system 113(a) wishes to retrieve a file from store 115 connected to system 113(n), he must specify that the file is available at system 113(n). Thus, unlike the user of system 101, the user of system 111 must know where a resource is located in the network in order to use it.

System 101 and System 111 both have advantages and disadvantages. Tightly-coupled system 101 is in fact a single computer system, and places no more burden on its users than any other single computer system. While convenient to use, system 101 has a number of disadvantages. Among them are the fact that a system 101 cannot be made by linking preexisting computer systems together. A user who wishes to have the increased capacity and ease of use offered by such a system must purchase an entirely new system. Another disadvantage is the fact that the failure of a single component of system 101 such as bus 107 may make the system useless for all users. Further, there may be small fixed limits to the number of CPUs 105 or memories 109 which may be attached to tightly-coupled system 101, and consequently, it may not be possible to expand system 101 beyond a given maximum size.

System 111 is not as easy to use as system 101, since the user must be aware of the topography of system 11 and of which system 113 has a resource to use resources form systems 113 other than the one he is using. On the other hand, system 111 may be put together using systems 113 already available to the user and may be expanded simply by hooking additional systems 113 to network 115. Moreover, system 111 is not dependent on any single component. If a given system 113 fails, only those using that system or data stored thereon are affected, and if network 115 fails, users of each of the systems 113 may continue working locally.

As may be seen from the foregoing survey of the prior art, what is needed, and what is provided by the present invention, is a system which combines the ease of use of tightly-coupled system 101 with the economy, robustness, and ease of expansion of loosely-coupled system 111.

SUMMARY OF THE INVENTION

The present invention solves the above problems of the prior art by providing a loosely-coupled computer system wherein certain resources are global, i.e., are accessible from all parts of the computer system as if they were located on the component at which the user is located. Consequently, users of the loosely-coupled computer system of the present invention need know nothing about the topography of the system in order to have access to a global resource.

FIG. 2 is a conceptual block diagram of the present invention. Computer system 201 of the present invention includes a number of independent computer systems 203 connected by a link 219. Link 219 may be any means providing for transmission of data between independent systems 203. Each independent system 201 contains the following components: communication system (COMS) 205, global identifier list (GIL) 215, global identifier maintenance system (GIMS) 213, outbound global resource system (OGRS) 211, and inbound global resource system (IGRS) 209). COMS 205 is a system which permits each ICS 203 to exchange messages concerning global resources (GMESS) 207 with other ICSs 203. Global identifier list (GIL) 215 is one or more lists of identifiers for global resources. Such identifiers are termed herein global identifiers. In GIL 215, each global identifier is associated with a location specifier indicating which ICS 203 has the global resource identified by the global identifier. An identical copy of GIL 215 is located on every ICS 203 of system 201. Global identifier maintenance system (GIMS) 213 is a system which maintains GIL 215. When an ICS 203 commences operation, GIMS 213 ensures that GIL 215 in that ICS 203 is identical to the GILs 215 on the other ICSs 203. When an ICS 203 makes a change to its local GIL 215, GIMS 213 propagates the change to the GILs 215 on the other ICSs 203. Communication between ICSs 203 for the purpose of synchronizing GILs 215 is by means of COMS 205.

Outbound global resource system (OGRS) 211 handles requests from users of a given ICS 203 for a global resource which is not available on that ICS 203. OGRS 211 first determines by reference to GIL 215 whether a requested resource is global and if it is, whether it is located on a different ICS 203. If it is, OGRS 211 prepares a GMESS 207 requesting the resource and employs COMS 205 to send the GMESS 207 to the ICS 203 which has the resource. Inbound global resource system (IGRS) 209 on the ICS 203 which has the resource receives the GMESS, obtains the resource, and sends a GMESS 207 with the resource back to OGRS 211, which then provides the resource to the user. As can be seen by the above description, the user of system 201 need know nothing about the location of a global resource in system 201. The only noticeable distinction between a request for a global resource which is located on the user's ICS 203 and one which is located elsewhere is that a longer period of time will be required to obtain the remotely-located global resource.

The effect of the operation of the various systems for handling global resources in system 201 is that a global identifier space 217 is established in system 201. As regards references to resources identified by global identifiers, global identifier space 217 causes system 201 to appear to its users as a single system. If most or all of the identifiers used by users of system 201 are global, then system 201 will appear to users to be a single system like tightly-coupled system 101 even though it is in fact a loosely-coupled system 111.

An important advantage of system 201 is that all ICS 203 in the system are peers. Consequently, system 201 will continue to operate as long as any of ICSs 203 is operating. Moreover, GIMS 213 is implemented in such a fashion that when any ICS 203 is disconnected from system 201, global identifiers for resources on that ICS 203 are removed from GIL 215 on the remaining ICSs 203 and when any ICS 203 is connected to the system, global identifiers for resources on that ICS 203 are added to GIL 215 on the other ICSs 203 and the global identifiers for the resources on the other ICSs 203 are added to GIL 215 on the system which has just been connected. GIL 215 thus always contains only those global resources which are presently available to ICS 203 presently connected to system 201.

It is thus an object of the invention to provide an improved computer system.

It is another object of the invention to provide a loosely-coupled computer system in which the user need not know where certain resources are located in the computer system in order to be able to use them.

It is an additional object of the invention to provide a loosely-coupled computer system which appears to the user to be a tightly-coupled computer system.

It is a further object of the invention to provide a loosely-coupled computer system having a global identifier space.

It is yet another object of the invention to provide a loosely-coupled computer system wherein identical global identifier lists are maintained in component computer systems.

It is a still further object of the invention to provide a loosely-coupled computer system in which each component computer system has a system for requesting a global resource from another component computer system and a system for responding to such requests.

It is a further additional subject of the invention to provide a loosely-coupled computer system in which the global identifier space only identifies those resources available in component systems currently connected to the loosely-coupled system.

Other objects and advantages of the present invention will be understood by those of ordinary skill in the art after referring to the detailed description of a preferred embodiment contained herein and to the drawings, wherein:

BRIEF DESCRIPTION OF DRAWINGS

FIG. 1 is a conceptual block diagram of prior-art interconnected computer system.

FIG. 12 is a diagram of messages structures in system 301;

FIG. 13 is a detailed diagram of message headers in system 301;

FIG. 23 is a detail of VLE 1809, MR 2203, MP2211, and DPE 2219;

Figure 2:
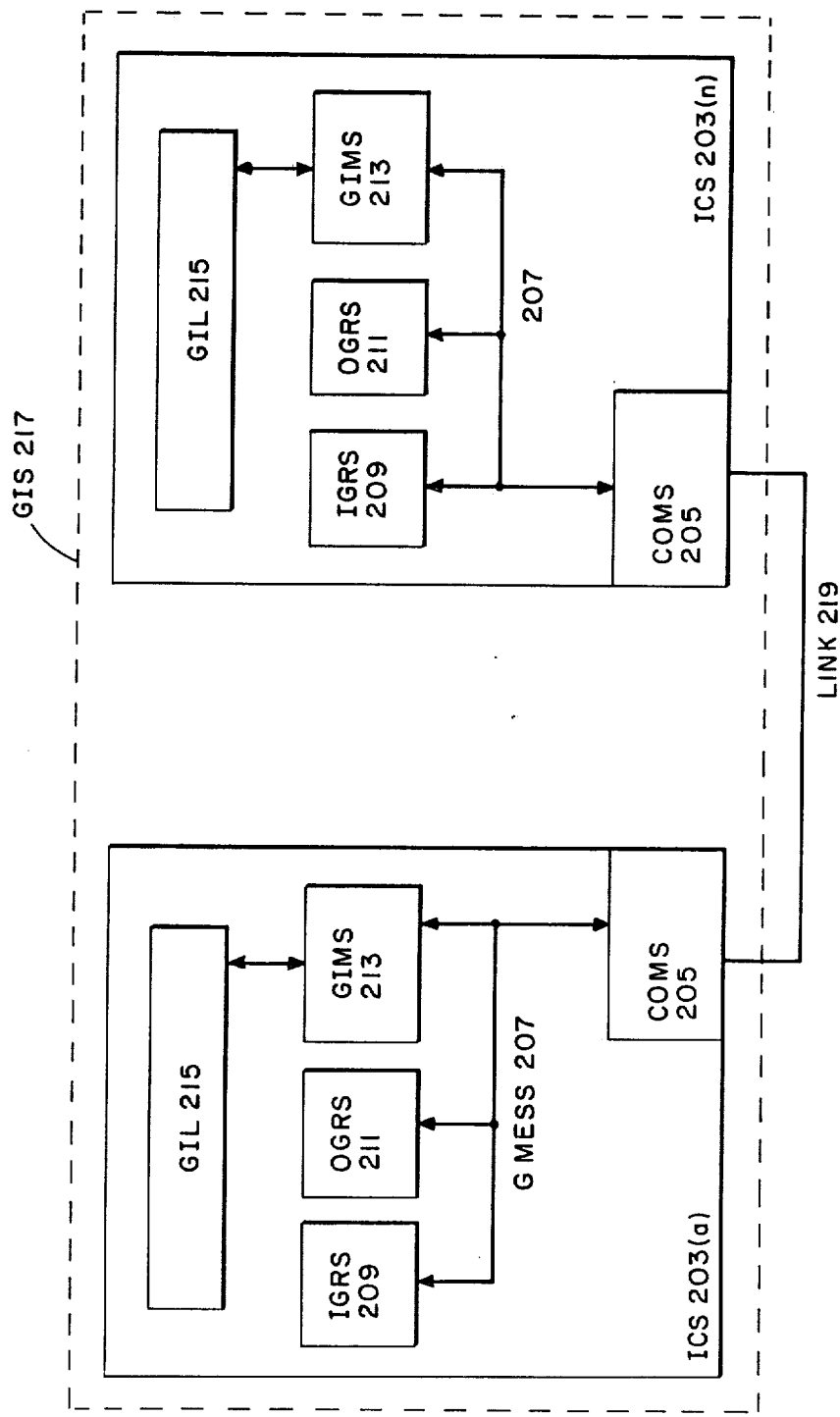
FIG. 2 is a conceptual block diagram of loosely-coupled computer system 201 of the present invention.

Reference numbers in the figures have three or more digits. The two last-significant digits are reference numbers within a drawing; the more significant digits are the drawing number. For example, the reference number 417 refers to item 17 first shown in drawing 4.

DETAILED DESCRIPTION OF THE PREFERRED EMBODIMENT

The following description of a presently-preferred embodiment begins with an overview of the loosely-coupled computer system in which system 201 is implemented in a preferred embodiment. It then discusses features of the process and communications structures employed in the components of the loosely-coupled computer system to the extent required for understanding of the present invention. Once the above foundation has been laid, the description deals in detail with the implementation of global identifiers and global resources in a preferred embodiment. The detailed description begins with global mailboxes, continues with global file access, and concludes with global file synchronization.

Figure 3:
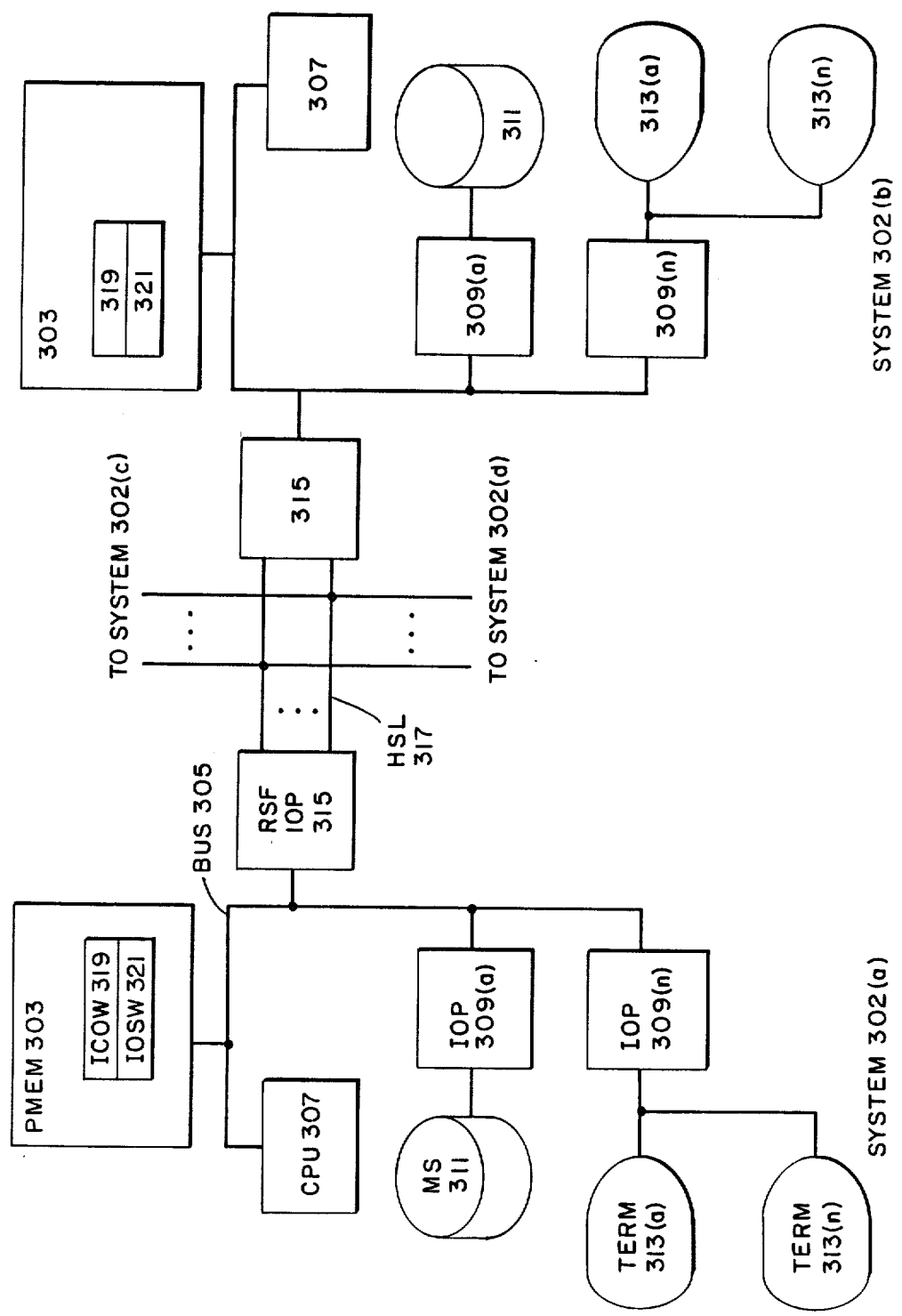
FIG. 3 is a block diagram of loosely-coupled system 301 which embodies system 201 in a preferred embodiment.

1. Loosely-Coupled System Embodying the Present Invention: FIG. 3

In a preferred embodiment, system 201 of the present invention is embodied in the loosely-coupled computer system shown in FIG. 3. Loosely-coupled system 301 of that figure is composed of up to 4 stand-alone computer systems 302, each one of which functions as an ICS 203. Each computer system 302 includes a CPU 307, a physical memory (PMEM 303), and a set of I/O processors (IOPs) 309. Each IOP is connected to one or more input/output devices. Shown in FIG. 3 are a mass storage device (MS) 311 connected to IOP 309(a) and a group of terminals (TERM) 313 connected to IOP 309(n). The number of IOPs 309 may vary in a system 302, as may the type and number of I/O devices attached to an IOP 309. The IOPs 309, CPU 307, and PMEM 303 are connected by means of system bus 305. Both CPU 307 and individual IOPs 309 have direct access to PMEM 303 via bus 305.

Each stand alone system 302 is a multiprogramming computer system with virtual memory, i.e., system 302 is capable of executing a number of programs apparently simultaneously by multiplexing CPU 307 among a set of processes. A process, as is well-understood in the art, is the entity in a data processing system which performs a given execution of a program. The process may be a user process, i.e., one which executes a program for a user, or it may be a system process, i.e., one which executes a program for the operating system. At any instant, CPU 307 is executing a program for a single process, handling an interrupt form an IOP 309, or switching processes on CPU 307. The instructions and data required for the process currently being executed are contained in PMEM 303. When an I/O operation is required, CPU 307 places an I/O command word (IOCW) 319 specifying the operation at a location in PMEM 303 known to the IOP 309 which must perform the operation, signals the IOP 309 that it has an operation to perform, and ceases executing instructions for the process until the I/O operation is complete. While the I/O operation is being completed, the process is barred from CPU 307 and CPU 307 executes instructions for another process.

IOP 309 responds to the signal from CPU 307 by retrieving IOCW 319 from PMEM 303 and performing the operation specified therein, referencing PMEM 303 directly as required to read data from PMEM 303 to an I/O device or to write data from the I/O device to PMEM 303. When the operation is complete, IOP 309 places an I/O status word (IOSW) 321 indicating the status of the operation at a special location in PMEM 303 and signals an interrupt to CPU 307. CPU 307 responds to the interrupt by executing system interrupt code which examines IOSW 321 to determine the outcome of the operation and then performs the processing required to permit the process for which the I/O operation was performed to resume execution on CPU 307. In a preferred embodiment, systems 302 may be VS computer systems manufactured by Wang Laboratories, Inc. Loosely-coupled system 301 may consist of up to four VS computer systems of the types VS 85, VS 90, VS 100, or VS 300. Different models may be combined in the same system 301.

When system 302 is part of loosely-coupled system 301, one IOP, shown in FIG. 3 as RSF IOP 315, is specially adapted to be connected to a parallel high-speed link (HSL) 317 which connects the given system 302 to up to three other systems 302. Since HSL 317 is connected to an IOP, a given system 302 can transfer data to and receive data from another system 302 in exactly the same fashion as it transfers data to and receives data from any other I/O device. However, the high rate of transfer possible in HSL 317 permits users of a given system 302 to employ a global resource located on another system 302 in the same fashion as they employ resources located on their own system 302. The high rate of transfer is further advantageous for the information propagation required to keep GILs 215 identical on each of the systems 302. In a preferred embodiment, HSL 317 is a 60-conductor differential bus which transfers control signals and 16-bit data words in parallel between the systems 302 at a maximum rate of 13.33 Mbytes/sec.

Figure 4:
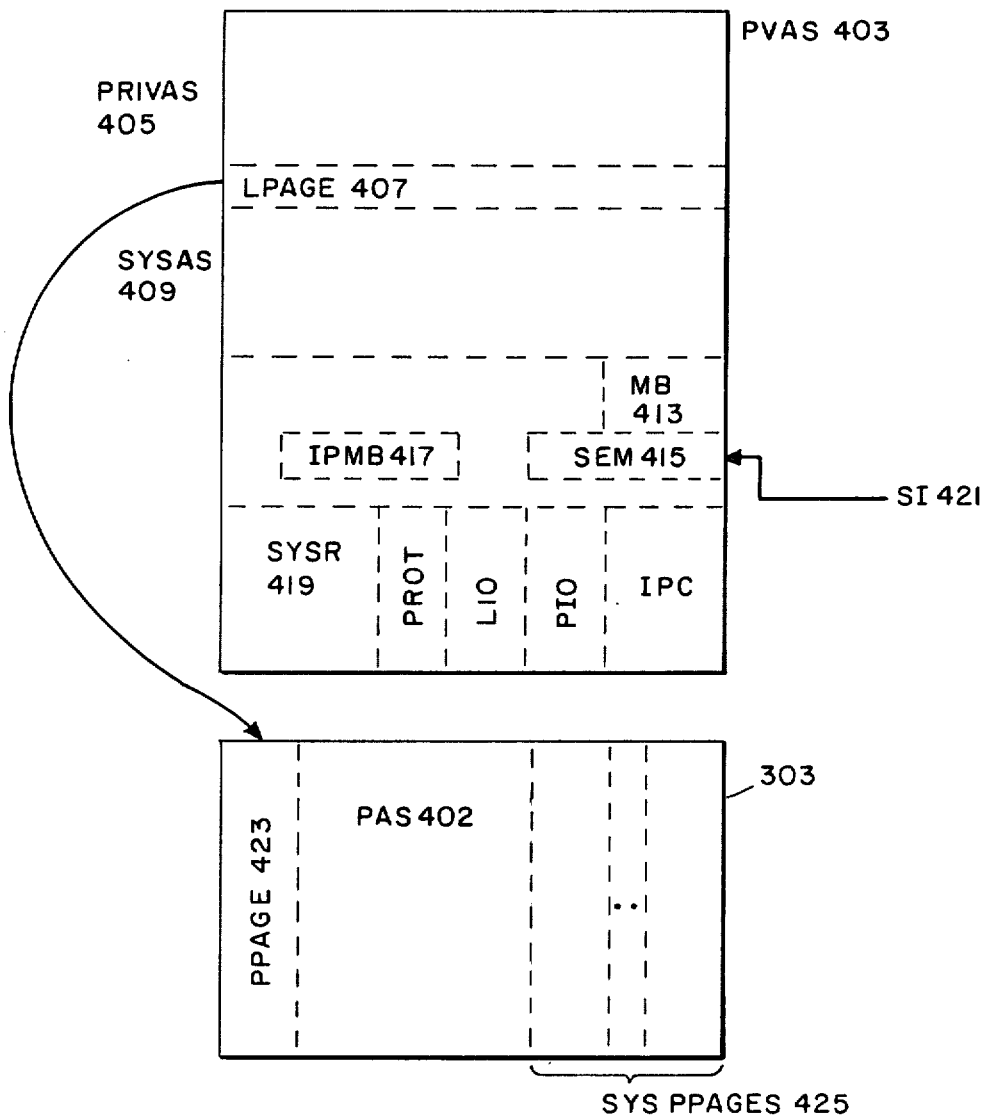
FIG. 4 is a block diagram of the structure of a process 401 in a component system 302 of system 301.

2. Process Address Space in System 302: FIG. 4

As mentioned above, system 302 further has a virtual memory, i.e., each process can reference a number of memory locations which is much larger than the number of memory locations in PMEM 303. In system 302, process refer to data by means of 24-bit virtual addresses, each one of which specifies 1 byte of data. Each process has its own virtual address space, i.e., appears to share the bytes which it can address with its virtual addresses with no other process.

FIG. 4 shows the virtual address space of a process (PVAS) 403 in system 302. To begin with, the virtual address space is created as follows: PVAS 403 is divided up into logical pages (LPAGE) 407 which reside on MS 311, while PMEM 303 constitutes a physical address space (PAS) 402 which is divided into physical pages (PPAGE) 423. Each LPAGE 407 is the same size as a PPAGE 423. When a process refers to an item of data in LPAGE 407, the virtual memory system in system 302 copies the contents of LPAGE 407 from MS 311 into PPAGE 423. After LPAGE 407 is copies into PPAGE 423, CPU 307 transforms virtual addresses referring to LPAGE 407 into physical addresses referring to PPAGE 423, and the process accesses the data in PPAGE 423. If the data in PPAGE 423 is modified, the contents of PPAGE 423 are eventually copied back to LPAGE 407.

PVAS 403 thus created by the virtual memory system is divided into two main parts: private process address space (PRIVAS) 405, in which are located the user programs executed by the process and the user data which the programs operate on, and system process address space SYSAS 409, in which are located operating system routines (SYSR) 419 executed by the process and the operating system data structures which the operating system programs operate on. As indicated in FIG. 4, SYSR 419 includes at least routines for doing data and file protection, routines for doing logical I/O, routines for doing physical I/O, and routines for communicating between processes.

The relationship between the two address spaces is hierarchical: a user program in PRIVAS 405 may access data in PRIVAS 405 and may invoke system routines (SYSR 419) in SYSAS 409, but cannot directly access data in SYSAS 409. System routines in SYSAS 409, on the other hand, may access data in either PRIVAS 405 or SYSAS 409. The system data structures are thus protected from user programs, while system routines can write data into or read data from PRIVAS 405.

While each process has its own PVAS 405, processes may share programs, data, or PPAGEs 423. Programs and data are shared by mapping the virtual addresses representing the programs or data in each PVAS 403 onto the locations in MS 311 where the data is actually kept. When shared data is copied into a PPAGE 423, the virtual addresses from the processes which share the data are translated into physical addresses for that PPAGE 423. In system 302, all processes share the programs and data structures in SYSAS 409. Additionally, certain SYSRs 419 and system data structures in SYSAS 419 must always be available in PMEM 303; the PPAGEs 423 containing these programs and structures are permanently present in PMEM 303 and are shown in FIG. 4 as SYS PPAGES 425.

Because SYSAS 409 is shared by all processes, processes may use SYSAS 409 to synchronize their operations and communicate with each other. Data structures in SYSAS 409 which serve this function are semaphores (SEM) 415, mailboxes (MB) 413, and inter process message buffers (IPMB) 417. A semaphore is a data structure which processes may use to synchronize operations. Semaphore instructions (SIs) 421 issued by SYSRs 419 may increment a semaphore and decrement a semaphore and, if the decremented semaphore's value is less than 0, cause the process issuing the SI 421 to wait until the semaphore's value has been incremented. Two processes, A and B, may thus cooperate using two semaphores, A's semaphore and B's semaphore, as follows: At the beginning, A is executing and B is waiting; A's semaphore has the value 0 and B's semaphore has the value −1. A then increments B's semaphore and decrements its own semaphore, causing A to wait. When B's semaphore is incremented, B's wait ends and B begins execution. When B is done, B decrements its semaphore and increments A's, causing B to wait and A to resume execution.

Mailboxes (MB) 413 are data structures by which a process may receive an inter-process message 417 from another process. A process may have many mailboxes, but each MB 413 belongs to only one process and has a unique mailbox identifier. A MB 413 may also have one or more aliases, that is, character string names for the mail box. If another process knows MB 413's identifier or one of its aliases, that process may use a SYSR 419 to locate MB 413, and send a message to the process to which MB 413 belongs. The SYSR 419 locates the proper MB 413, copies the message from PRIVAS 405 for the sending process into a one or more IPMBs 417, places IPMB 417 in a queue of IPMBs 417 belonging to MB 413, and increments a SEM 415 belonging to MB 413. The receiving process waits on the SEM 415 belonging to MB 413, and when a message arrives in MB 413, the receiving process employs another SYSR 419 to retrieve the message from the mail box and copying it into the receiving process's PRIVAS and to decrement the mail box SEM 415.

Figure 5:
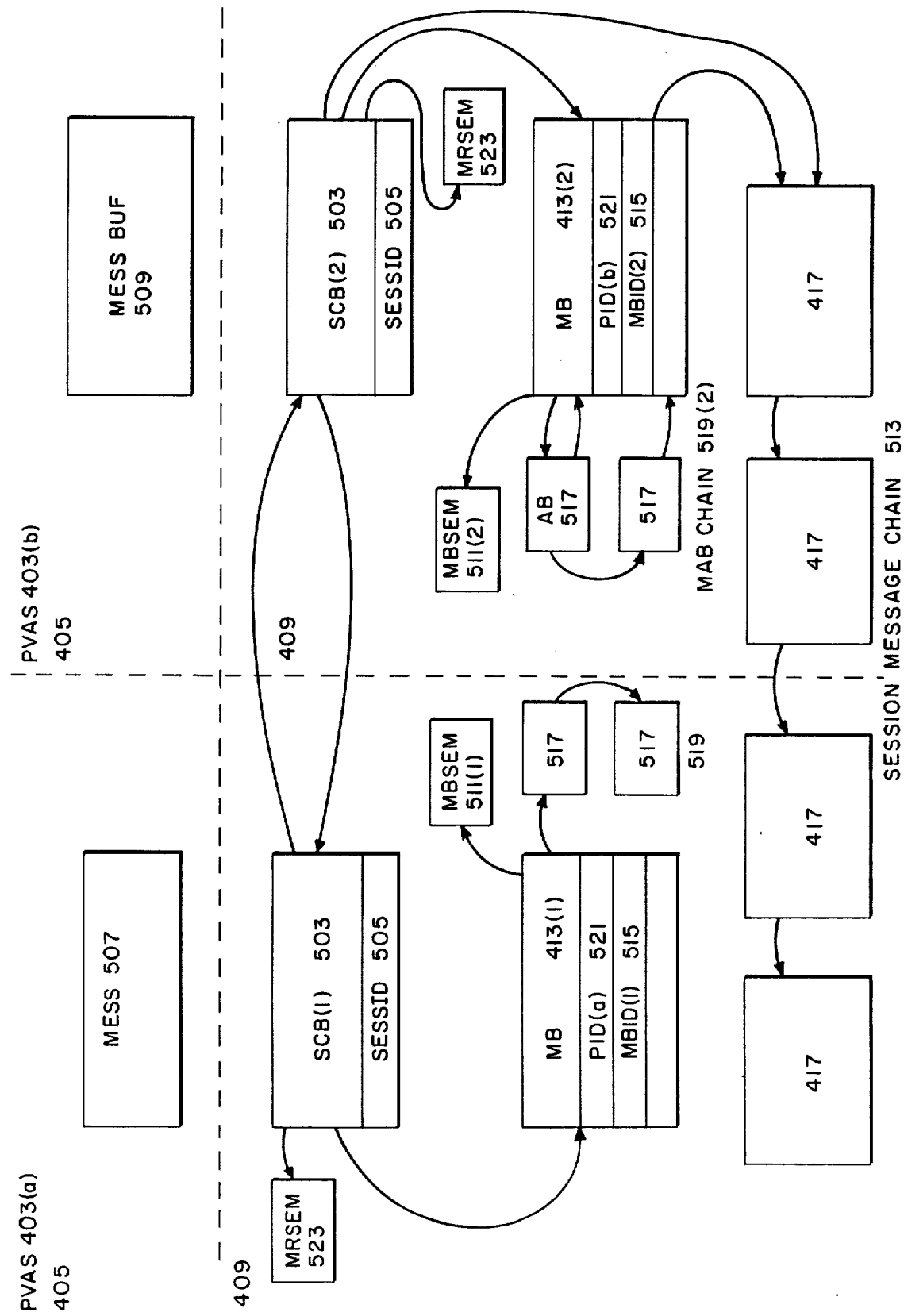
FIG. 5 is a block diagram of a session 501 between two processes 401.
Figure 6:
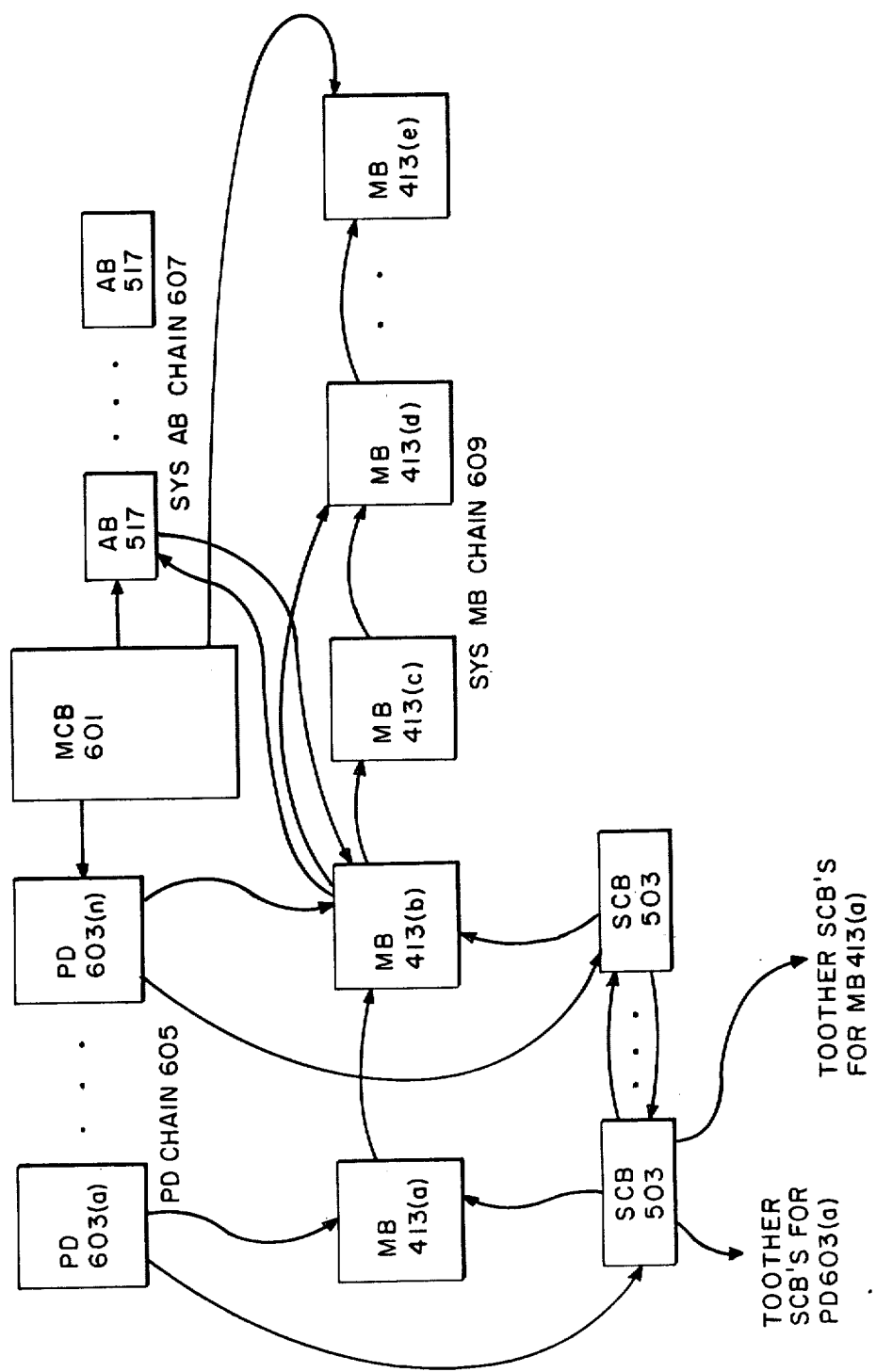
FIG. 6 is a block diagram of how MBs 413, ABs 517, and SCBs 503 are located in a system 302.

3. Sessions between Processes: FIGS. 5 and 6

MBs 413 and IPMBs 417 form the basis for a bi-directional inter-process communication mechanism termed a session. FIG. 5 shows the components of a session 501 in a preferred embodiment. Arrows connecting blocks in FIG. 5 and subsequent figures indicate that the data structure represented by the block which is the source of an arrow contains a pointer (a data item which contains the address of another item) to the data structure represented by the block which is the destination of the arrow.

Session 501 provides for two-way communication between process (a) with PVAS 403(a) and process (b) with PVAS 403(b). Session 501 is created by means of the following data structures: session control block (SCB) 503, MB 413 for the session, and SEM 511 belonging to MB 413. All of the data structures are located in the processes' SYSAS 405. Messages are sent from each process to the other's session MB 413 using IPMBs 417. If several messages are sent, the result is a chain 513 of IPMBs 417 at the receiving MB 413. When a message is larger than the capacity of a single IPMB 417, the process sending the message must subdivide it and send a series of inter-process messages.

SCB(1) and SCB(2) 503 represent the session. SESSID 505, which is identical in both SCB(1) and SCB(2) uniquely identifies the session. Each SCB 503 contains a pointer to the other SCB, a pointer to MB 413 belonging to the same process as SCB 503, and a pointer to MRSEM 523, a semaphore which is incremented whenever the process to which SCB 503 belongs receives a message. Additionally, when a process has sent an IPMB 417 to the other process via the IPMB 417 at the head of IPMB chain 513. MB 413 contains a mail box identifier (MBID) 515 which uniquely identifies the mail box, and a process identifier (PID) 521 which identifies the process to which MB 413 belongs. It also contains a pointer to a mailbox semaphore (MBSEM) 511 and if it has aliases, a pointer to a chain of alias blocks (AB 517). Each AB 517 contains one alias for MB 413 and includes a pointer to the MB 413 to which it belongs. If there are messages waiting to be received, MB 413 further contains a pointer to IPMB chain 513. A given MB 413 may receive IPMBs 417 from more than one session 501.

MBs 413 are locatable by means of aliases and are related to processes and sessions 501 by means of the data structures and pointers shown in FIG. 6. All of these data structures are in SYSAS 409 and are accessible only by system routines 419. The primary data structure in FIG. 6 is the master control block (MCB) 601. There is only one MCB 601 in system 302, and from it, operating system data structures and processes may be located. Chained off of MCB 601 are first a set of process descriptors (PD) 603, one for each process currently executing programs on system 302. Each PD 603 contains PID 521 for the process which it represents. If the process represented by a given PD 603 has MBs 413 associated with it, then a pointer in PD 603 points to the first MB 413 in a chain of MBs 413 associated with the process. The chain is formed by a pointer in each MB 413 which points to the next MB 413 for the process. If the process represented by a given PD 603 has sessions 501 associated with it, then a pointer in PD 603 points to the first SCB 503 in a chain of SCB's 503 representing sessions 501 associated with the process. Again, the chain is formed by a pointer in each SCB 503 which points to the next SCB 503 for the process.

Also chained off MCB 601 are all of the MB's 413 in system 302. This chain appears in FIG. 6 as SYS MB CHAIN 609. Each MB 413 thus belongs simultaneously to SYS MB CHAIN 609 and to a chain of MBs 413 for the process to which MB 413 belongs. MCB 601 further contains a pointer to SYS AB CHAIN 607, which is a chain of all of the alias blocks (AB) 517 in the system. As previously pointed out, each AB 517 contains a pointer to the MB 413 for which it contains a name and a pointer to the next AB 517 belonging to that MB 413. Each MB 413 thus belongs both to SYS AB CHAIN 607 and to a MAB chain 519.

Each SCB 503, finally, contains a pointer to MB 413 for session 501 represented by SCB 503, a pointer to the SCB 503 for the other end of session 501, a pointer to a chain of other SCB's for the process to which SCB 503 belongs, and a pointer to a chain of other SCB's 503 for the MB 413 for the session 501 represented by SCB 503.

Establishment and operation of a session 501 is by means of system routines in SYSR 419. Routines of interest in the present context are the following: ICREATE, IDESTROY, IREGALS, ILKUPALS, ICA- NALS, ICONNECT, IACCEPT, IDECLINE, IDISCONN, ISEND, IRETRIEV, and IWAIT.

ICREATE creates a MB 413 for the process which invoked ICREATE and returns the new MB 413's MBID 515. ICREATE links the new MB 413 into SYS MB CHAIN 609 and into the chain of MBs 413 belonging to PD 603 for the process which invoked ICREATE. IDESTROY destroys an existing MB 413 by destroying any ABs 517 associated with the MB 413, unlinking the MB 413 from the chain of MBs 413 belonging to PD 603 for its process, unlinking the MB 413 from SYS MB CHAIN 609, and freeing the storage for MB 413.

IREGALS, ILKUPALS, and ICANALS all deal with aliases for MBs 413. IREGALS creates an alias for the MB 413 specified by an MBID 515. IREGALS creates and AB 517 for the new alias, hooks the AB 517 into SYS AB CHAIN 607, locates MB 413 having the specified MBID 515 in SYS MB CHAIN 609, sets a pointer in AB 517 to point to MB 413, and links AB 517 into MAB chain 519 for the MB 413. ILKUPALS receives an alias as an argument and retrieves the MBID 515 for the MB 413 specified by the alias. As is clear from FIG. 6, it does so by locating AB 517 for the alias on SYSAB CHAIN 607, following the pointer from AB 517 to MB 413, and returning MBID 515 from that MB 413. ICANALS cancels an alias by locating AB 517 for the alias to be cancelled in SYS AB CHAIN 607, unlinking AB 517 from SYS AB CHAIN 607 and MAB CHAIN 519, and freeing the storage for AB 517.

ICONNECT, IACCEPT, IDECLINE, and IDISCONNECT are used to set up and terminate sessions 501. ICONNECT is a request to establish a session 501 between two MBs 413 belonging to different processes. ICONNECT specifies the MB 413 belonging to the process invoking ICONNECT by means of its MBID 515 and the MB 413 belonging to the other process by means of its MBID 515 or its alias. ICONNECT locates MB 413 belonging to the invoking process from PD 603 and establishes a SCB 503 representing the new session 501 and containing the new session's SESSID 505. The SCB 503 is linked into the SCB 503 chains for the process and the mailbox. ICONNECT then locates MB 413 for the other end of the session from SYS AB CHAIN 607 or from SYS MB CHAIN 609, locates PD 603 for the process to which MB 413 belongs using PID 521 in MB 413, creates SCB 503 for that process, giving SCB 503 a unique SESSID 505, and links that SCB 503 into the chains for that process and MB 413 and links SCB 503 to the SCB 503 representing the new session 501 for the other process. ICONNECT then sends a system connect message to MB 413 for the other process indicating that the process invoking ICONNECT wishes to commence a session and containing the SESSID 505 from the SCB 503 for the connecting process. The message is sent as described for ISEND below. The invoking process can then continue execution or wait for a reply from the other process to arrive in MB 413.

When the connect message arrives, the other process can either accept or decline the new session 501. To accept, the other process invokes IACCEPT, which sends a system accept message to MB 413 for the connecting process and returns. When the connecting process receives the IACCEPT message, it may use ISEND to send messages via the new session 501. To decline, the other process invokes IDECLINE, which removes SCB's 503 for the declined session 501 from the lists in which they were inserted and frees the storage required for them, thus terminating the session. IDISCONN permits either of the processes using a session 501 to terminate that session 501. The routine takes SESSID 505 for the session 501 to be terminated as an argument. IDISCONN first sends a system disconnect message indicating that the session 501 has been terminated to MB 413 for the process not invoking IDISCONN and then removes SCB's 503 for the terminated session 501 from the lists to which they belong.

ISEND and IRETRIEV are used to send messages. ISEND is used to send a message from the process which invokes ISEND to the process at the other end of session 501. The arguments with which ISEND is invoked include SESSID 505 for the session, a pointer to the location in the process's PVAS 403 of the message to be sent (seen as MESS 507 in FIG. 5), and a specification of the length of MESS 507. Optionally, the arguments to ISEND may include a pointer to a header which is to be sent separately from the message. ISEND obtains an IPMB 417 for MESS 507, copies the message from MESS 507 from the sending process's PRIVAS 405 into the IPMB 417, locates MB 413 belonging to session 501 in the process at the other end of the session 501 from that end's SCB 503, links the IPMB 417 into session message chain 513 for MB 413, and increments MBSEM 511 belonging to receiving MB 413 and MRSEM 523 belonging to receiving SCB 503. ISEND locates the proper MB 413 by using SCB 503 belonging to the sending process to locate SCB 503 belonging to the receiving process and using that SCB 503 to locate MB 413. System messages are sent as described for ISEND, except that the operating system routines which send the messages write them directly into the relevant IPMB 417.

With certain MBs 413, ISEND may be used to send a datagram, i.e., a message which is sent outside of a session. In such a case, ISEND's arguments include MBID 515 for MB 413 or the mailbox's alias. In the first case, ISEND locates MB 413 using SYS MB chain 609; in the second, ISEND locates MB 413 using SYS AB chain 607. Once MB 413 is located, ISEND proceeds as described above for ISEND in a session.

IRETRIEV is used by the receiving process to retrieve a message which is queued to a MB 413. In the case of a session message, IRETRIEV is invoked with arguments including SESSID 505 for the session 501, MBID 515 for the receiving MB 413, a pointer to an area in PVAS 403 for the receiving process (shown as MESSBUF 509), and the size of that area. The routine copies the message from the IPMB 417 in which it was sent to MB 413 into MESSBUF 509 and unlinks the IPMB 417 from session message chain 513. When IRETRIEV retrieves a message, it also decrements MBSEM 511 for the receiving MB 413 and MRSEM 523 for the receiving SCB 503. In the case of a datagram, IRETRIEV is invoked without SESSID 505.

IWAIT, finally, permits the process which invokes it to wait for the arrival of a message in a session 501 or in a MB 413. For a session, IWAIT is invoked with arguments including SESSID 505 for the session. IWAIT locates SCB 503 for the invoking process from PD 603, locates session MB 413 from SCB 503, decrements MRSEM 523. If the process has received a message via session 501 represented by SCB 503, MRSEM 523 has a value of 0 or greater after it has been decremented and IWAIT returns. If there are no messages, MRSEM 511 has value of less than 0 and the process invoking IWAIT waits until a message arrives. For a MB 413, IWAIT is invoked with MBID 515 for the receiving MB 413.

Figure 7:
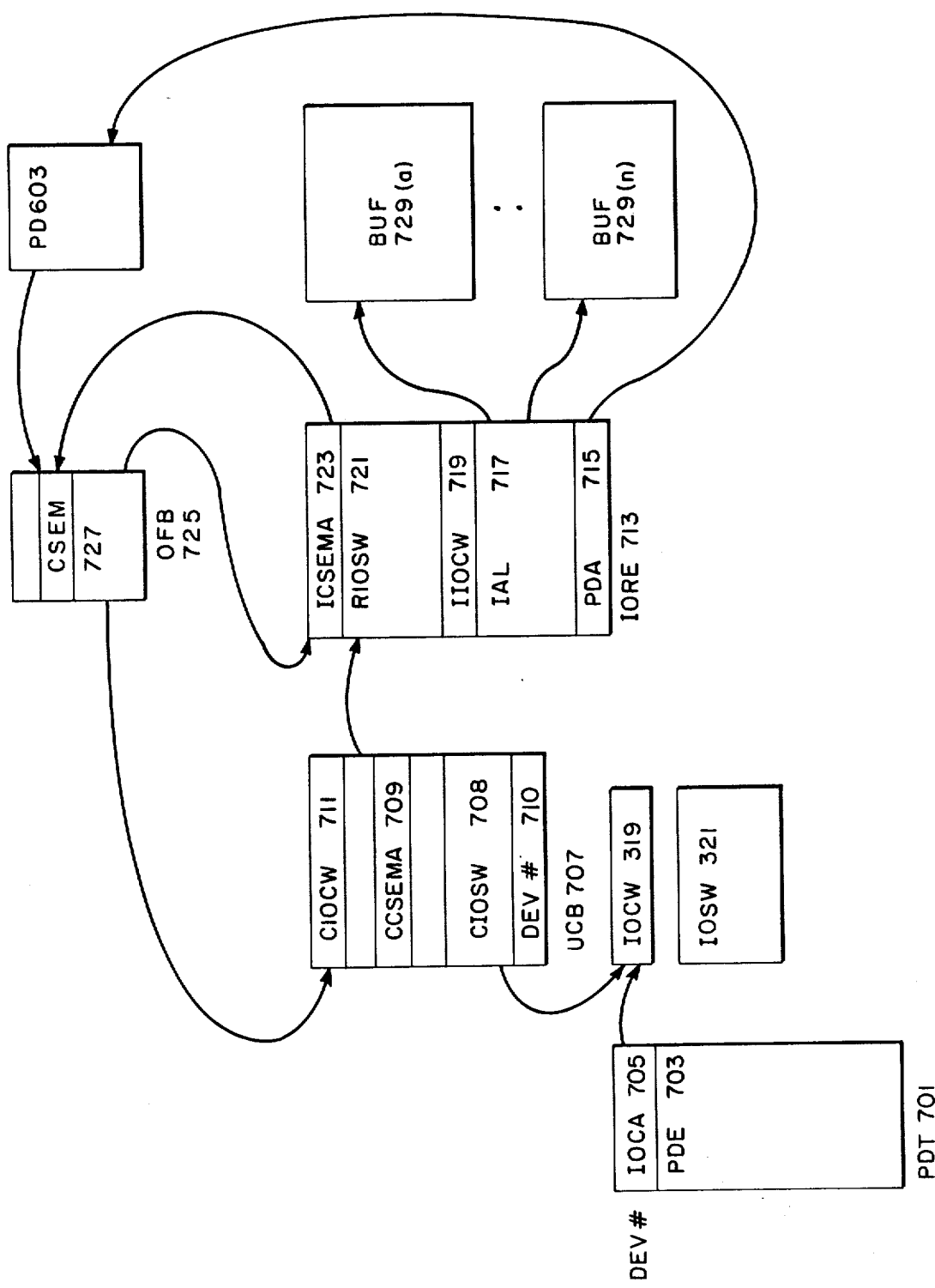
FIG. 7 is a overview block diagram of the I/O structure of system 302.
Figure 8:
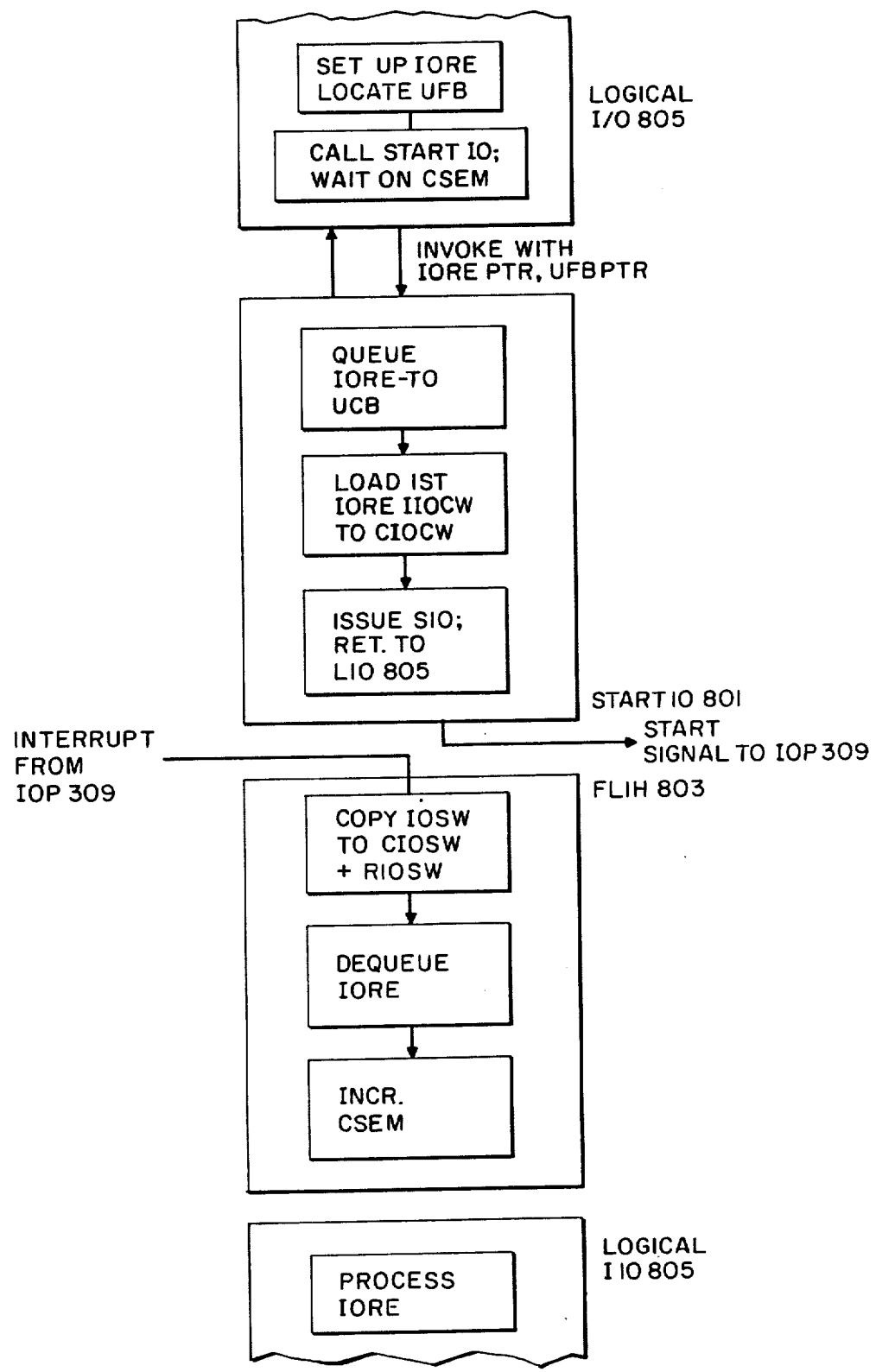
FIG. 8 is a flow diagram of I/O operation in system 302.

4. I/O Structure of System 302: FIGS. 7 and 8

As previously explained, I/O in system 302 is performed by IOPs 30. The I/O operation is defined in I/O command word (IOCW) 319 stored in PMEM 303 and is performed when the IOP 309 in response to a signal generated by CPU 307 when it executes a SIO instruction specifying a physical device attached to IOP 309. At the end of the operation, IOP 309 places status information concerning the operation in IOSW 321 and generates an interrupt to CPU 307.

Processes are permitted to share the I/O devices of system 302 by means of the data structures shown in FIG. 7, all of which are located in SYSAS 409. Beginning at the left hand of the figure, physical device table (PDT) 701 is a table which has one entry (PDE 703) for each physical device such as a TERM 313, MS 311, or in the case of a system 301, other system 302, attached to system 302. The number of the entry is the number by which that physical devices is known to system 302. Each PDE 703 contains I/O command word address (IOCA) 705 which points to the physical address in PMEM 303 of IOCE 319 for the device corresponding to PDE 703. When a SIO instruction specifies a physical device attached to a given IOP 309, that IOP 309 responds to the signal generated by the SIO instruction by obtaining IOCA 705 from the device's entry in PDT 701 and executing the IOCW 319 at the specified location.

The remaining data structures associated physical devices with processes. Each physical device has associated with it a unit control block (UCB) 707 which is locatable by the physical device's device number. A UCB 707 for a device contains information about the device and provides values to IOCW 319 and receives values from IOSW 321 for the device. DEV # field 710 indicates which device is represented by UCB 707. CIOCW 711 in UCB 707 contains the IOCW value which will placed in IOCW 319 prior to the next SIO instruction UCB 707's physical device. At the end of an I/O operation, CIOSW 708 contains a copy of the value of IOSW 321 resulting from the operation. CCSEMA 709, finally, is the address of a semaphore to be incremented on completion of the I/O operation.

Attached to UCB 707 by a pointer is a chain of I/O requests (IOREs) 713 (only one IORE is shown in the chain in FIG. 7). Each IORE 713 represents a request by a process to the physical device represented by UCB 707 to perform and I/O operation. Fields of interest in IORE 713 are the following: ICSEMA 723, the address of a semaphore to be incremented when the I/O operation represented by IORE 713 is complete;

RIOSW 721, which contains the value of IOSW 321 resulting from the operation;

IIOCW 719, which contains the value to be used in IOCW 319 for the operation;

Indirect address lists (IAL) 717, which is a list of physical addresses of buffers (BUF) 729 to be used in the operation; and PDA 713, the address of PD 603 for the process performing the I/O operation.

System 302 has a fixed number of IOREs 713. Unused IOREs 713 are chained from MCB 601. Each time a process makes an I/O request of a logical I/O devices such as a file, an IORE 713 is obtained from the list of unused IOREs for that I/O request. Each logical I/O device being used by a given process in system 302 is represented by an open file block (OFB) 725. A chain of OFBs 725 (only one is shown in FIG. 7) representing the logical I/O devices being used by a given process is accessible from PD 603 for the process. Each OFB 725 contains CSEM 727, the completion semaphore for the logical device represented by OFB 725. OFB 725 further contains information (represented by a pointer in FIG. 7) by which the address of UCB 707 for the physical device upon which the I/O is to be performed may be obtained and a pointer to IORE 713 representing the most recent logical I/O request made by the process to which OFB 725 belongs to the logical I/O device represented by OFB 725. In system 302, PDT 701, UCB 707, IOCW 319, IOSW 321, IOREs 713, and BUFs 729 are all in SYSPAGES 425 and are consequently always available in PMEM 303.

The manner in which an I/O operation involving the above data structures is performed is shown in overview in FIG. 8. The operation begins when the process represented by PD 603 invokes a system routine for the performance of logical I/O, LOGICAL I/O 805. Assuming that the I/O operation is logical read operation, the system routine obtains and prepares an IORE 713 for the operation. Specified in the IORE are the IOCW for the operation, in IIOCW 719, the address of CSEM 727 for the OFB, and IAL 717 pointing to the BUFs 729 which are to receive the data returned by the read operation. A pointer in OFB 725 points to the IORE 713.

The next stages of the I/O operation are shown in FIG. 8. As shown there, the logical I/O routine invokes another system routine, STARTIO 801. The actions performed by STARTIO are the following: STARTIO receives pointers to the UCB 707 and the IORE 713 associated with OFB 725 representing the logical device. STARTIO queues IORE 713 to be specified UCB 707, then loads IIOCW 719 from the first IORE 713 on the queue into CIOCW 711 and ICSEMA 723 into CCSEMA 709 of UCB 707, then loads CIOCW 711 into IOCW 319, issues the SIO instruction for the physical device represented by UCB 707, and then returns to Logical I/O 805. Generally, Logical I/O 805 will then wait on CSEM 727. The wait is, however, only necessary where Logical I/O 305 cannot proceed before completion of the I/O operation.

As previously described, the SIO instruction provides a start signal to IOP 309 for the physical device specified in the instruction and the IOP 309 performs the I/O operation specified in IOCW 319. When IOP 309 has completed the operation, it places IOSW 321 in memory and signals CPU 307 that the operation is complete. In the case of the read operation being discussed, at completion of the operation, the data being read is in BUFs 729 specified in the IORE 713's IAL 717. In response to the interrupt signal from IOP 309, CPU 307 executes system first level interrupt handler code (FLIH) 803. FLIH 803 is executed by the process which is on CPU 307 when the interrupt occurs.

FLIH 803 determines from IOSW 321 which physical device caused the interrupt, locates UCB 707 for that physical device, copies the contents of IOSW 321 to CIOSW 708 of UCB 707, copies the contents of CIOSW 708 to RIOSW 721 in IORE 513, dequeues IORE 513 from UCB 707, and increments CSEM 727. Since the process which invoked STARTIO 801 is waiting on CSEM 727, the result of the increment is the resumption of execution of that process. On resuming, the process continues executing Logical I/O 805, which processes IORE 713 and the data in BUFs 709 as required for the logical I/O operation. At the end of the logical I/O operation, IORE 713 is returned to the free IORE chain. If the I/O operation does not succeed, RIOSW 721 in IORE 713 indicates the cause and logical I/O 805 can deal with it accordingly.

Operation in the case of a write operation is essentially the same as described above, except that there the data to be written is copied into BUFs 729 before IORE 713 is prepared. In the cases previously described, the interrupt from IOP 309 has been solicited, i.e., it was a consequence of an I/O operation performed by CPU 307. In some circumstances, IOP 309 may receive data which it has not solicited. One such situation is when a user logs onto a TERM 313. In such situations, IOP 309 produces an unsolicited interrupt to CPU 307, and IOSW 321 indicates the source of the interrupt.

5. COMS 205 in a Preferred Embodiment: FIGS. 9–16

In a presently-preferred embodiment of the invention, communications system (COMS) 205 has been implemented by providing for sessions 801 which connect processes operating on different systems 302. Such processes are termed remote processes, and the sessions connecting them are termed remote sessions. Conceptually, what occurs when an inter-process message is sent to a remote process is that the relevant system inter-process message routine determines that a remote session is involved and calls a routine called ITRANSPORT which incorporates the inter-process message into an outgoing transport message which is sent via RSF IOP 315 and HSL 317 to system 302 upon which the remote process is running. In the destination system 302, the incoming transport message causes an interrupt to which FLIH 805 responds. Since the IOP causing the interrupt is RSF IOP 315, FLIH 805 increments a semaphore to which a system process called the second-level interrupt handler (SLIH) responds. The SLIH examines the inter-process message contained in ITRANSPORT, and if the message contains data, the SLIH does an ISEND which sends the data to the mailbox for the session on the destination system. The following discussion will deal with COMS 205 as follows: first, it will show how remote mail boxes and remote sessions are identified; then it will discuss the data structures employed in a remote session; thereupon, it will disclose the form of the message sent over COMS 205, and finally, it will discuss operation of COMS 205.

Figures 9, 10:
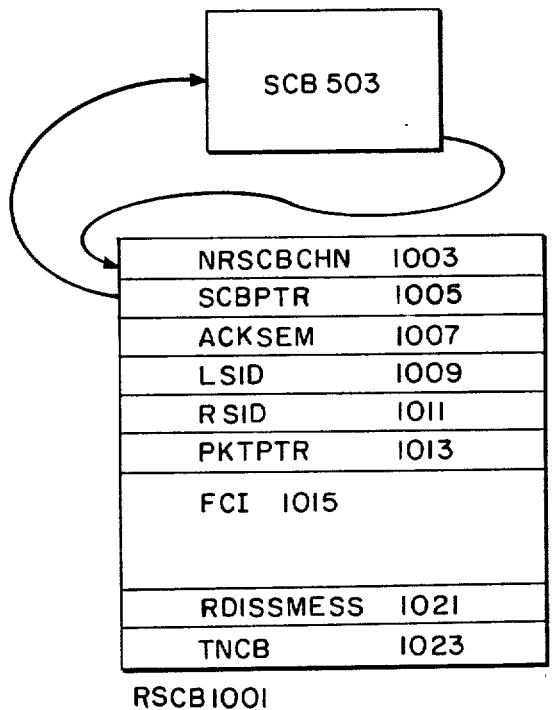
FIG. 9 is a detailed diagram of AB 517.
FIG. 10 is a detailed diagram of an RSCB.

6. Remote Sessions: FIG. 10

Whether a session 801 is local or remote may be determined from SCB 503. If SCB 503 represents a remote session 801, SCB 503 contains a pointer to a remote session control block (RSCB) which contains the additional information needed for a remote session 801. FIG. 10 is a detailed diagram of a RSCB 1001. The fields are the following:

NRSCBCHN 1003 is a pointer to the next RSCB 1001 in a chain of all RSCBs 1001 representing remote sessions 801 with processes on a given component system 302.

SCBPTR 1005 is a pointer to the SCB 503 to which RSCB 1001 belongs.

ACKSEM 1007 is a SEM 415 which is used by session flow control.

LSID 1009 is the SESSID 505 of the SCB 503 representing the remote session 801 in this system 302.

RSID 1011 is the SESSID 505 of the SCB 503 representing the remote session 801 in the other system 302.

PKTPTR 1013 is a pointer to the previously-received portions of a message which required more than one BUF 729.

FCI 1015 contains flow control information.

RDISSMESS 1021 contains a message from the remote system 302 when that system has disconnected the remote session.

TNCB 1013 contains the address of the node control block, a data structure representing the remote system 302 in this system 302.

The flow control information in FCL 1015 is information governing the flow of messages in the session. The flow control technique used in a preferred embodiment is the well-known window technique in which the sending side of a session 801 is permitted to send only a limited number of messages to the other side before it receives an acknowledgement from the other side that the messages have been received.

Figure 11:
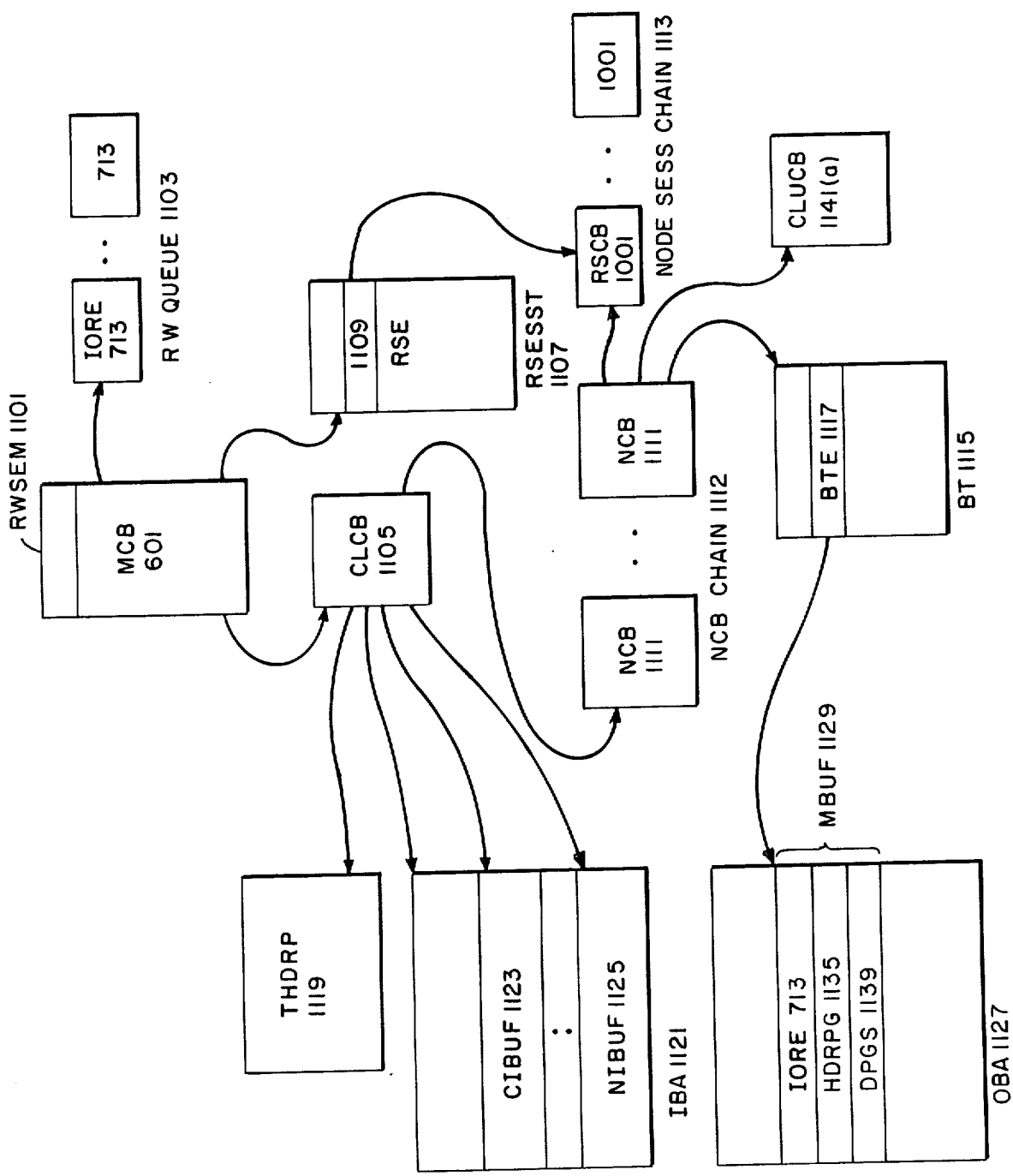
FIG. 11 is a block diagram of remote session data structures.
Figure 14:
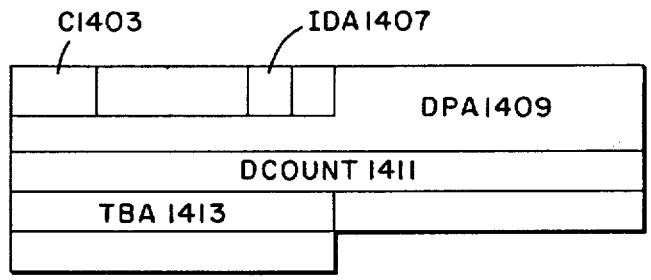
FIG. 14 is a detailed diagram of IOCW and IOSW for RSF IOP 314.

7. Remote Session Data Structures: FIGS. 11 and 14

FIG. 11 provides an overview of the data structures required in a preferred embodiment to implement remote sessions 801. Beginning with MCB 601, that data structure additionally contains a pointer to RQ Queue 1103, which is a queue of IOREs 713 representing messages received from a remote system 302 and RWSEM 1101, a semaphore which is incremented every time an IORE 713 is added to queue 1103. As will be explained in detail later, the second-level interrupt handler waits on RWSEM 1101, and consequently executes whenever there are IOREs 713 in queue 1103.

MCB 601 further contains pointers to remote session table (RSESST) 1107 and to cluster control block (CLCB) 1105. RSESST 1107 is a table representing all remote sessions 801 currently active in system 302. RSESS 1107 contains a remote session entry (RSE) 1109 for each active remote session 801, and RSE 1109 contains a pointer to RSCB 1001 representing the remote session 801 pointed to by RSE 1109. Thus, RSCBs 1001 for all remote sessions 801 may be located from MCB 601 via RSESST1107.

CLCB 1105 establishes relationships between remote sessions, individual systems 302, BUFs 729, and UCBs for RSF IOP 315, and thus contains the information required for system 302 to operate as a node (individual system 302) in a loosely-coupled system 301. CLCB 1105 contains pointers to the following:

NCB Chain 1112: a chain of NCBs 1111, each one of which represents one system 302 in system 301.

IBA 1121, CIBUF 1123, and NIBUF 1125: IBA 1121 is an area in SYS PAGES 425 which contains BUFs 729 for receiving data from RSF IOP 315. CIBUF 1123 is the current input buffer and NIBUF 1125 is the next.

THDRP 1119 is an area in SYSPAGES 425 which contains transport headers for outgoing messages.

Each NCB 1111 representing a remote system 302 further contains a pointer to a chain of RSCBs 1001 (node session chain 1113) representing remote sessions with processes on system 302 represented by NCB 1111 and pointers to data structures representing the resources available for sending messages to that system 302. The data structures are the following: CLUCB 1141 is a UCB 707 representing system 302 represented by NCB 1111 as a physical I/O device. In a given system 302, CLUCB 1141 for NCB 1111 representing that system 302 is treated as a CLUCB 1141 for an input device; the CLUCBs 1141 representing the remote systems 302 are treated as output devices. Buffer table (BT 115) r represents the BUFs 729 available for outgoing messages to system 302 represented by NCB 1111. BT 1115 consists of BTEs 117, each one of which is a set of pointers to MBUF 1129, a BUF 729 for an outgoing message to a remote session. The parts of MBUF 1129 are IORE 713, which contains the IORE 713 representing the output operation using MBUF 1129, HDRPG 1135, which contains headers for the message, and data pages (DPGS) 1139 which contains the data for the message.

As mentioned in the general discussion of I/O in system 302, IORE 713 for an I/O operation contains copies of IOCW 319 and IOSW 321 for the operation. The contents of IOCW 319 and IOSW 321 in system 302 depend on the physical device which responds to the IOSW. The contents of IOCW 319 and IOSW 321 for a remote system 302 connected by HSL 317 to RSF IOP 315 are shown in FIG. 14. RSF IOCW 1401 contains the following fields of interest:

C 1403 contains the I/O command which RSF IOP 315 is to execute. Commands are READ, WRITE, WRITE to IOP 315 (for initializing IOP 315, and SET IOP to not ready.

IDA 1407 indicates whether there is an IAL 717 associated with IOCW 1401.

DPA 1409 is the physical address in PMEM 303 from which data is to be read or to which data is to be written.

DCOUNT 1411 is a count of the number of bytes of data which are to be transferred by the I/O operation.

TBA 1413 specifies the system 302 to which data is to be sent in a write operation.

RSF IOCW 1401 thus specifies the operation to be performed, the amount of data to be transferred, the source or destination in PMEM 303 for the data, and in the case of a write operation the system 302 to which the data is to be transferred.

RSF IOSW 1415 is set by RSF IOP 315 upon completion of the operation specified in IOCW 1401. The fields of IOSW 1415 have the following general functions:

CQ 1417: This field is a completion qualifier, indicating how the I/O operation completed.

ERCQ 1419: error completion qualifier. If CQ 1417 indicates that there was an error, ERCQ 1419 specifies the kind of error.

IOPS1 and IOPS2 1421: these bytes indicate the status of RSF IOP 315 and the systems 302 attached thereto.

RCOUNT 1425: where a read or write operation does not transfer all of the data specified in IOCW 1401, this field specifies the number of bytes remaining.

ERRC 1427: this field contains codes further identifying errors specified by CQ 1417 and ERCQ 1419.

ADDR 1429: This field specifies the source or destination system for the transfer.

Fields in CQ 1417 which are pertinent to the present discussion are the following: NC, indicating normal completion of the I/O operation, EC, indicating error completion, U, indicating an unsolicited interrupt, and P, indicating that IOP 315 is ready for operation. Pertinent fields in IOPS1 are RDY, which indicates which of the 4 systems 302 which may make up system 301 are ready and online, DA, which indicates which of the four systems was the target of the I/O operation, CMP, which indicates that an acknowledgement was received from a system 302 other than the one to which the data was sent, and NRDY, indicating that the target system 302 went from ready to not ready during the I/O operation.

8. Remote Session Messages: FIGS. 12, 13

FIG. 12 is a diagram of the messages sent between systems 302 in a remote session. As with local sessions, the sending process employs ISEND to send a message to another process. In so doing, it may provide application message 1201 to the session. As shown In FIG. 12, application message 1201 may consist of message body (MBODY) 1205 and application header (AHDR) 1205 Either one or both may be omitted from a given message. AHDR 1205 is used where it is necessary to specify the type of message being sent in MBODY 1205 to the process receiving it. When ISEND receives application message 1201, it makes it into session message 1207 by adding to it session send header (SSHDR) 1209, which is a header indicating to RETRIEVE that the session message includes application message 1201. Other system session routines may send session messages to be read by the session system. An example of such a message is the one sent by IDECLINE when a session is declined. Headers for these messages are termed control session headers (CSHDR). As may be seen from the above, a session message 1207 may consist only of an SSHDR or a CSHDR.

If the session 801 is a remote session, ISEND provides session message 1207 to ITRANSPORT, which makes session message 1207 into a transport message 1215 by adding to it additional headers. These headers will always include transport header (THDR 1214) and may also include flow control information (FCI) 1213 and one or more CSHDRs 1211. The set of all headers for transport message 1215 is termed transport message header (TMH) 1217 and MBODY 1203 is termed transport message body 1219. At a minimum, a transport message 1215 will consist of THDR 1214; additionally, it may contain FCI 1213, one or more CSHDRs 1211, a single SSHDR 1209, and if there is a SSHDR 1209, an application message 1201.

Continuing with FIG. 13, that figure gives details of session header (SHDR) 1219 and transport header (THDR) 1214. No details of AHDR 1205 are shown because that header is created by the program which creates application message 1201 and is transported unaltered to the program which reads application message 1201. SHDR 1219 contains the following fields: SHLEN 1301, giving the length of SHDR 1219, SHT 1303, specifying the type of SHDR 1219, SEQ 1305, indicating the sequence number of session message 1207 having the header, and SHTINFO 1307, whose contents depend on the type of SHDR 1219. SEQ 1305 is used by the session routines to keep track of how many packets of a message have been sent and to determine whether packets are arriving out of sequence.

THDR 1214 contains fields as follows: THLEN 1209 specifies the length of header 1309; S/P field 1311 indicates alternatively that transport message 1215 following THDR 1214 is a high-priority message or that it is a given one of a sequence of messages. ACK# 1313 is used to return an acknowledgement that a given one of a sequence has been received; THT 1315 specifies the type of THDR 1214 and THTINFO 1317 contains type-dependent information.

The message structures in FIG. 12 correspond to levels of apparent communication. Application message 1201 corresponds to the application level, in which the applications executed by a pair of processes appear to communicate directly with each other. Session message 1201 corresponds to the session level, in which two processes establish a session and communicate with each other thereby. Transport message 1215 corresponds to the transport level, in which two systems send and receive messages across a link between them, in this case, the RSF IOPs 315 and HSL 317. There is a similar correspondence between routines and communication levels. The routine which makes an application message 1201 is operating at the application level; the session system routines are operating at the session level; I TRANSPORT, finally, is operating at the transport level. Levels below the transport level are handled by RFS IOP 315.

Figure 15:
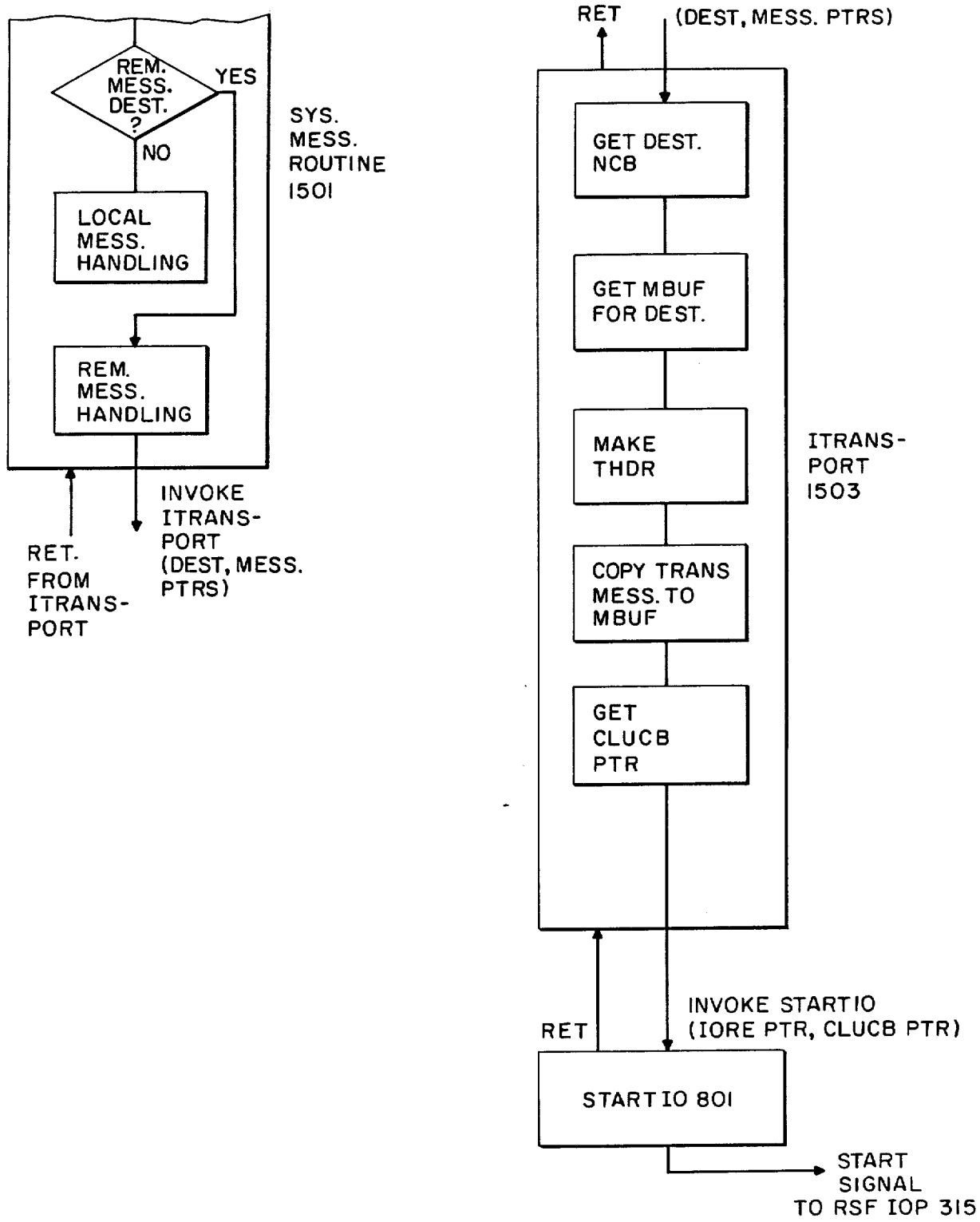
FIG. 15 is a flow diagram of outbound message processing.
Figure 16:
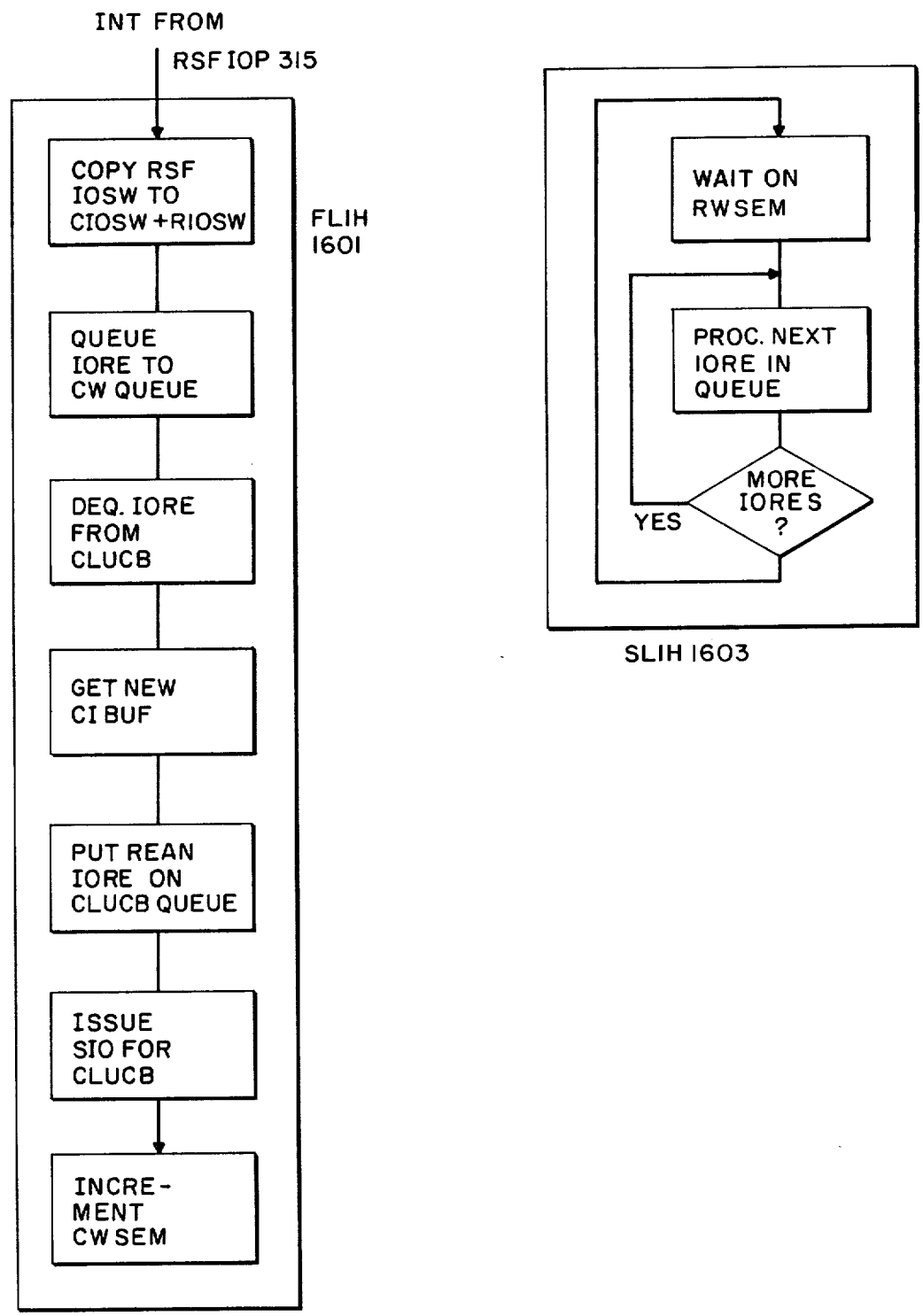
FIG. 16 is a flow diagram of inbound message processing.
Figure 17:
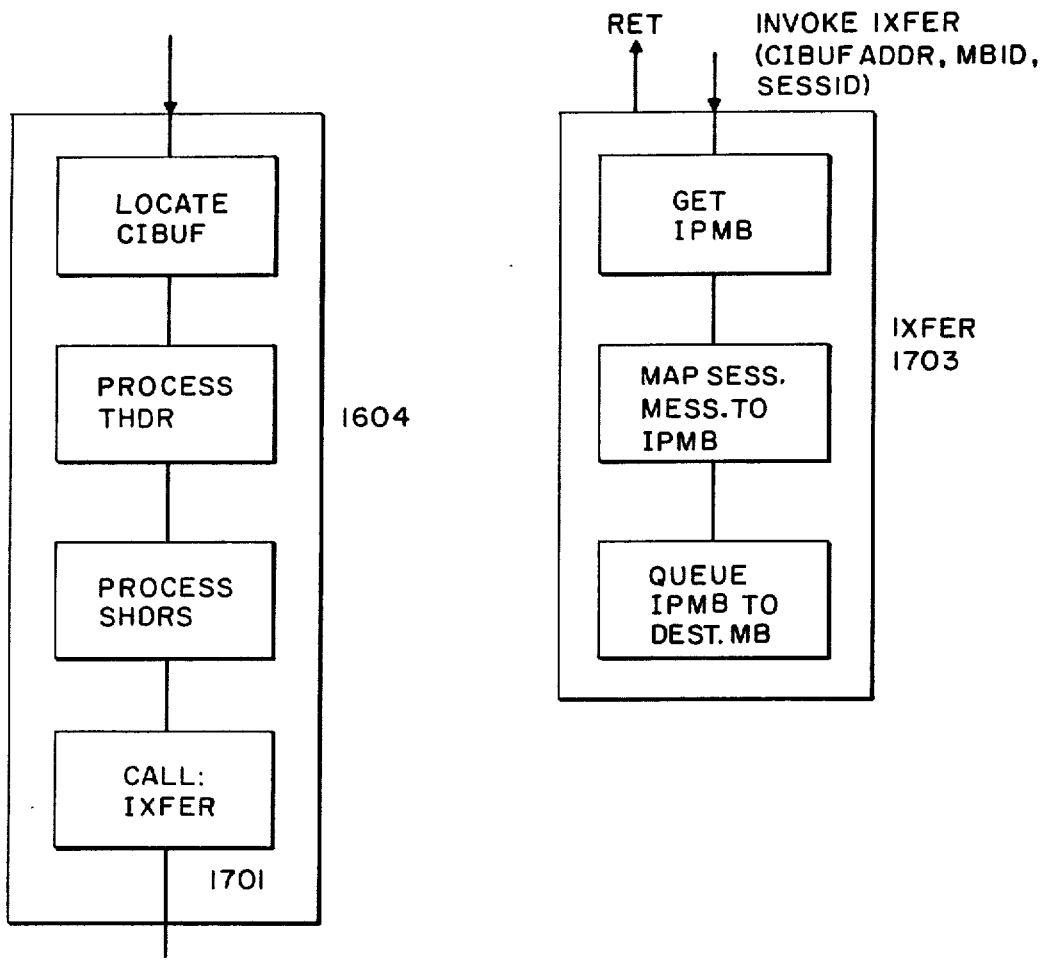
FIG. 17 is a detailed flow diagram of process IORE block 1604.

9. Operation of COMS 205 in a Preferred Embodiment: FIGS. 15-17

As previously indicated, users of system 301 send messages between processes executing on different systems 302 by means of the same inter-process message routine which they use to send messages between processes operating on the same system 302. The inter-process message routines which operate as part of COMS 205 are the following: ICONNECT, IDISCONN, IACCEPT, IDECLINE, and ISEND. Description of the operation of these routines in a preferred embodiment will show operation of COMS 205 in that embodiment.

Operation of these routines is shown in overview in FIGS. 1, 16, and 17. Beginning at FIG. 15 with ICONNECT as a typical system message routine 1501, when ICONNECT is invoked to initiate a remote session, the arguments for the invocation must include MBID 515 or an alias for MB 413 on the invoker's side of the session and an alias specifying the system 302 upon which MB 413 for the other side of the session is located. ICONNECT determines from the alias for the destination MB 413 that the session is remote and consequently performs the actions necessary to set up a remote session at this end. To do so, it creates not only an SCB 503 for the session, but also a RSCB 1001. Then ICONNECT makes a session message 1207 which consists of a CSHDR 1211 in which SHT field 1303 specifies a message of the CONNECT type. SHTINFO 1307 for the CONNECT type includes the following information: MBID 515 for the source MB 413, SESSID 505 from SCB 503 for the session, and the alias for the destination MB 413. ICONNECT then calls ITRANSPORT 1503 with a pointer to session message 1207 and an argument indicating what system 302 is to be the destination. ITRANSPORT 1503 uses CLCB 1105 to locate NCB 1111 for the destination system 302 and links RSCB 1001 to the chain of RSCBs 1001 for that NCB 1111. Next, ITRANSPORT employs BT 1115 for NCB 1111 to locate MBUF 1129 which will contain CSHDR 1211. ITRANSPORT then makes THDR 1214 for transport message 1215 containing CSHDR 1211 in THDRP 1119. THDR 1214 is of the Session Header Descriptor type, in which THTINFO 1317 specifies the number of SHDRs 1219 present, the total length of any MBODY 1203, and the length of the portion of MBODY 1203 contained in TMB 1219. ITRANSPORT then copies THDR 1214 and CSHDR 1211 into HDRPG 1135 and constructs a IORE 713 incorporating RSF IOCW 1401. RSF IOCW 1401 specifies a write operation to system 302 containing MB 413 specified by the alias, with the data to be obtained from MBUF 1129. ITRANSPORT 905 then locates CLUCB 1141 for the destination system 302 and provides pointers to CLUCB 1141 and IORE 713 in MBUF 1129 as arguments to STARTIO 801, which performs the write operation using RSF IOP 315 as described in the general discussion of I/O in system 302.

Destination system 302 has been prepared for receipt of messages from other systems 302 by making an IORE 713 containing a READ RSF IOCW 1401 and specifying CIBUTF 1123 as the destination for the data returned by the READ operation, queueing the IORE 713 to CLUCB 1141 representing destination 702, and issuing an SIO instruction to the logical device represented by CLUCB 1114.

Continuing with FIG. 16, when RSF IOP 315 receives transport message 1215 from the source system 302, it treats the receipt as the completion of the READ operation and consequently places transport message 1215 in CIBUF 1123 and generates an interrupt for source system 302 to CPU 307 of destination system 302. In response to the interrupt, destination system 302 executes first level interrupt handler (FLIH) 1601. FLIH 1601 operates generally as described in the discussion of I/O in system 302. However, when the interrupt is from a remote system 302, FLIH 1601 copies RSF IOSW 1415 into the IORE 713 associated with CLUCB 1141 and queues the IORE 713 onto remote work (RW) queue 1103, adjusts pointers in CLCB 1105 to make NIBUF 1125 the current CIBUF 1123 and to obtain another free buffer for NIBUF 1125, sets up another IORE 713 in which IIOCW 719 specifies CIBUF 1123 and a READ operation, queues the new IORE 713 to CLUCB 1141 for local system 302, issues an S10 instruction to RSF IOP 315, and increments RWSEM 1101.

Waiting on RWSEM 1101 is the system process termed the second-level interrupt handler (SLIH). As shown in overview in FIG. 16, SLIH 1603 is a loop which processes IOREs 713 from RW queue 1103 until that queue is empty and then waits on RWSEM 1101.

The details of processing for a given IORE 713 are shown in FIG. 17. In the discussion, it is assumed that the IORE 713 is for the CONNECT message of the foregoing discussion. When SLIH 1603 processes IORE 713 for the incoming CONNECT message, it locates CIBUF 1123 specified by IORE 713 and processes TMH 217, beginning with THRD 1214. In the present case, SLIH 1603 determines from THDR 1214 that transport message 1215 contains a single SHDR 1219. SLIH 1603 then reads CSHDR 1211 and determines that the message is a CONNECT message. In response thereto, SLIH 1603 locates destination MB 413 specified in the message, sets up SCB 503 and RSCB 1001 for the remote session, and calls IXFER routine 1703 with the address of CIBUF 1123, MBID 515 for the destination MB 413, and SESSID 505 of SCB 503. IXFER obtains an IPMB 417 for the message, maps CIBUF 1123 into that IPMB 417, queues IPMB 417 containing CIBUF 1123 to MB 413 specified by the alias in the CONNECT message, increments that MB 413's MBSEM 511, and returns. If MB 413 cannot be located or if the connect message cannot be queued to MB 413, SLIH 1603 destroys RSCB 1001 and SCB 503 which it made for the remote session and sends a transport message 1215 with a CSHDR 1211 indicating that the connection has been declined back to the source system 302.

From the above description of ICONNECT, it may be seen how IDISCONN, IACCEPT, and IDECLINE may be implemented in a preferred embodiment. In each case, the system message routine on the source system 302 determines that the destination is a remote system 302 and calls ITRANSPORT 1503 giving it the destination system and a pointer to the session message 1207 to be sent. ITRANSPORT then makes session message 1207 into transport message 1215 and sends the message to the destination system 302, where SLIH 1603 interprets it, performs the necessary processing with regard to RSCB 1001 and SCB 503 for the remote session, and employs IXFER to queue the received message to the destination MB 413.

ISEND is treated the same way, but MBUF 1129 will contain MBODY 1203 in DPGS 1139 and transport message 1217 will contain a SSHDR 1209, and perhaps an AHDR 1205 or TMB 1219. In some cases, MBODY 1203 of application message 1201 will exceed the capacity of DPGS 1139. In that case, ITRANSPORT divides message 1201 into a sequence of transport messages 1215. At the other end, SLIH 1603 will reassemble message 1201 and invoke IXFER 1703 to queue message 1201 to MB 413 for remote session 801 in which message 1201 was sent.

In loosely-coupled systems 301, component systems 302 may be detached from system 301. The detachment of a component system 302 affects operation of system 301 only to the extent that global resources located on the detached system 302 are no longer available to the remaining systems 301. Detachment may occur either because an operator of a system 302 has executed operating system detach routines which detach that system from system 301 or because the component system 302 has failed. In the first case, the detach routines locate each remote session with system 302 by means of node session chain 1113 attached to NCB 1111 for the system 302 being detached. For each session, a DISCONN operation is performed as described above, thus ending all remote sessions with that system 302. In the second case, the failed system 302 cannot disconnect its sessions; consequently, disconnection is handled as follows: when a system 302 fails, RSF IOP 315 detects that fact, generates an interrupt to CPU 307, and produces an IOSW 319 indicating the cause of the interrupt. In response to the interrupt, FLIH 1601 copies the IOSW into an IORE 713, queues the IORE 713 to RW queue 1103, and increments RWSEM 1101 as previously explained. When SLIH 1603 processes an IORE 713 whose RIOSW 721 indicates the failure of a remote system 302, it employs MCB 601, CLCB 1105, and NCB 1111 representing the failed system to locate node session chain 1113 for the node and performs a DISCONN operation which sends a disconnect message to the session mailbox and deletes RSCB 1001 and SCB 503 for each of the remote sessions with the failed system 302.

When the above discussion is viewed in terms of system 202 of FIG. 2, it is apparent that MBs 413 with global aliases represent a global resource in loosely-coupled system 301 and that a process which executes an inter-process message routine using a global alias as an argument is an embodiment of an OGRS 211, while SLIH 1603 is an embodiment of an IGRS 209.

10. Global Aliases for MBs 413: FIGS. 6 and 9

One of the global resources available to users of loosely-coupled system 301 are MBs 413 identified by global aliases. When a MB 413 has a global alias associated with it, the MB 413 may be referred to by the global alias from any of the systems 302 making up system 301. For example, ICONNECT may use the global alias to establish a remote session with the remote process to which MB 413 belongs.

The following discussion will describe ABs 517 representing global aliases in detail and will describe the routines and system messages which ensure that all systems 302 in loosely-coupled system 301 have the same set of global aliases. The set of ABs 517 representing global aliases in a given system 302 is thus an embodiment of GIL 215, and the routines which maintain ABs 517 in each system 302 are an embodiment of GIMS 213.

11. Detail of AB 517: FIG. 9

FIG. 9 is a detailed representation of AB 517. The following fields determine whether the alias represented by AB 517 is global or local, and if it is the latter, what its present status is:

GF 901 is a flag which indicates whether the alias represented by AB 517 is global.

L/R 903: When the alias is global, L/R 903 indicates whether the MB 413 referred to by the global alias is on a remote system.

INA 905: When the alias is global, INA 905 indicates that it is not yet active, i.e., that it has not yet been propagated to all running systems 302.

GR 907: When the alias is global and the MB 413 is on the local system 302, GR 907 indicates that it is not registered on all systems 302.

RI 909: When the alias is global and the MB 413 to which the alias belongs is located on the local system 302, RI 909 indicates that this alias was not sent with others to a system 302 which has begun to run.

RC 910 is a set of two bit maps. Each bit map has one bit per component system 302 in system 301. The first bit map supplements to GR 907 and indicates which systems 302 an alias has been registered on: the second supplements RI 909 and indicates which systems 302 did not receive an alias.

The next field, ALIAS 911, is the actual alias of MB 413 to which AB 517 belongs. In a preferred embodiment, ALIAS 911 may indicate the location of MB 413. The alias consists of up to five 8-character strings. At a minimum, the alias is the 8-character name of the mailbox; additionally, it may contain the names of the network to which MB 413 belongs, loosely-coupled system 301 in the network to which MB 413 belongs, the component system 302 in system 301 to which MB 413 belongs, and the subsystem in that system 302 to which MB 413 belongs.

The remaining fields are pointers. MBPTR 913 is a pointer to MB 413 to which AB 517 belongs; MABCHN 915 is a pointer to the next AB 517 in MAB chain 519 belonging to that mailbox; SABCHN 917 is a pointer to the next AB 517 in SYS AB chain 607.

12. Registration and Cancellation of Global Aliases: FIGS. 6 and 9

A process may register a global aliases by means of the IREGALS system routine previously described. When IREGALS is invoked in a component system 302 of a loosely-coupled system 301, the parameters may include one which specifies that the new alias is to be registered globally. When IREGALS receives such a parameter, it proceeds as follows: first, it examines each AB 517 in SYS AB chain 607 in turn. If GF field 901 indicates that the AB 517 being examined is for a global alias, IREGALS compares the alias to be registered with ALIAS 911 in the AB 517. If they are the same, IREGALS returns an error, thereby ensuring that global aliases are unique across loosely-coupled system 302.

If the new global alias is unique, IREGALS prepares an AB 517 for the new alias, places the new alias in ALIAS 911, and sets the global registration fields as follows: GF 901 indicates that the mailbox is global, L/R 903 indicates that MB 413 represented by the new alias is on this system 302, INA 905 indicates that the new alias is inactive, and GR 907, RI 909, and RC 910 together indicate that the new alias has yet to be registered on any other component system 302 of loosely-coupled system 301.

The next step is to propagate the new alias to the other component systems 302. IREGALS does this as follows: first, it calls ICREATE to create a local MB 413. Then it makes a register alias message consisting of a single CSHDR 1211 of the register alias type. SHTINFO 1307 in the CSHDR 1211 type contains the following information: the MBID 515 of the MB 413 established by IREGALS; the ALIAS 911 to be registered; the MBID 515 for the MB 413 to which AB 517 belongs; and the component system 302 which is the source of the registration message.

IREGALS employs ITRANSPORT 1503 in the manner described above to make and send a transport message 1215 containing the register alias message to each of the other component systems 302. After sending the message, IREGALS waits on MBSEM 511 for the local MB 413 which it established.

When the register alias message arrives in a destination system 302, SLIH 1603 processes the message by proceeding as described for IREGALS above. It examines the ABs 517 for global aliases in SYS AB chain 607 to ensure that the new alias is unique. If it is not, SLIH 1603 uses ITRANSPORT to send a reject alias registration datagram to the MB 413 established by IREGALS on the source system 302. That datagram is another CSHDR 1211 and specifies the MB 413 to which it is being sent, the rejected alias, the rejecting system 302, and an error code.

If the new alias is unique, SLIH 1603 prepares an AB 517 for the new alias and links the new AB 517 into SYS AB chain 607. In the new AB 517, GF 901 is set to indicate a global alias, L/R 903 to indicate that the MB 413 for the alias is not local, and INA 905 to indicate that the alias is inactive. Since MB 413 for the alias is not local, GR 907, RI 909, and RC 910 are not set. ALIAS 911 receives the new alias, MBPTR 913 and MABCHN 915 are set to null, since there is no local MB 423 for the alias, and SABCHN 917 points to the next AB 517 in SYS AB chain 609.

When the new AB 517 is finished, ALIH 1603 sends an accept alias registration datagram to MB 413 established by IREGALS in the source system 302 in the same fashion as described for the reject alias datagram. The datagram is a CSHDR 1211 whose SHTINFO contains the following: MBID 515 for the MB 413 established by IREGALS; the accepted alias; and the component system 302 which is sending the accept alias registration message.

As the messages sent by component systems 302 arrive in the system 302 which was the source of the register alias messages, SLIH 1603 processes them by queueing the messages to MB 413 established by IREGALS and incrementing MBSEM 511 for that MB 413. In response to MBSEM 511, IREGALS resumes execution and processes the messages. If any of the messages is a reject alias message, IREGALS destroys AB 517 for the rejected alias and sends cancel alias messages (described below) to all component systems 302 which did not reject the alias. If all of the messages are accept alias messages, but not all remote systems 302 are currently operating, IREGALS sets GR 907 to indicate that fact and indicates in RC 910 which systems 302 have the alias. Thereupon, IREGALS links AB 517 for the new global alias into SYS AB chain 607 and MAB chain 519 for its MB 413, sets INA field 905 to indicate that the alias is active, and sends an activate alias message to each remote systems 302. The activate alias message is another CSHDR 1211 which simply contains the alias in SHTINFO. After completing its attempt to register the new alias, IREGALS calls IDESTROY to destroy the MB 413 which it created for registration and returns. On receipt of the activate alias message in a destination system 302, SLIH 1603 uses the alias in the message to locate AB 517 for the alias in SYS MB chain 609, links that AB 517 into SYS AB chain 607, and sets INA 905 in that AB 517 to indicate that ALIAS 911 is active.

A global alias is cancelled when a process executes ICANALS on the component system 302 where MB 413 to which the global alias belongs is located. ICANALS is invoked with the alias to be cancelled. It locates AB 517 for the alias in SYS AB chain 607. If field GF 901 in AB 507 indicates that the alias is global, but L/R field 903 indicates that its MB 413 is not located on the local system 302, ICANALS returns an error; if MB 413 is located on the local system 302, ICANALS unlinks AB 517 for the alias from SYS AB chain 607 and MAB chain 519, destroys the AB 517, and sends a cancel alias message to the remote systems 302. The message is a CSHDR 1211 whose SHTINFO 1307 consists of the alias to be cancelled. When SLIH 1603 receives the cancel alias message, it uses the alias in the message to locate AB 517 for the alias in SYS AB chain 607. Thereupon, SLIH 1603 unlinks and destroys the AB 517.

13. Synchronization of Global Aliases among Systems 302: FIGS. 6, 9

It is not necessary for operation of loosely-coupled system 301 that all component systems 302 be operating. There consequently arises the problem of synchronizing global aliases: when a component system comes up, i.e., commences operation, it must be provided with the same global aliases as the rest of the component systems 302; when a component system 302 goes down, i.e., ceases operation, the global aliases referring to MBs 314 on that component system must be removed from the remaining component systems 302. Moreover, if a component system comes up while a global alias is being registered, that global alias must be provided to the system which has come up during registration.

Synchronization with a component system 302 which is just coming up begins when the component system 302 indicates via HSL 317 that it is ready. In response to that indication, RSF IOP 315 generates an unsolicited interrupt to CPU 307. RSF IOSW 1415 indicates via the U field of CQ 1417 that the interrupt is unsolicited and via the RDY field of IOPS1 that the component system 302 which is coming up is now ready. FLIH 1601 responds to the unsolicited interrupt in the usual fashion, and SLIH 1603 responds to the RSF IOSW 1415 by setting an initializing bit for the component system 302 which is coming up in NCB 1111 for that component system 302 and employing ITRANSPORT 1503 to send a transport message 1215 consisting only of THDR 1214 with the initialization type to the system which is coming up. THTINFO 1317 in that type of THDR 1214 specifies the system 302 which is coming up. When component system 302 which is coming up is ready to receive global aliases from the other component systems, it sends those systems a transport message 215 of the initialization type. FLIH 1601 in each of those component systems 302 responds to the initialization message in the usual fashion, and SLIH 1603 then reads the initialization message. In response thereto, SLIH 1603 sets the bit in NCB 1111 for the system coming up to indicate that initialization is complete and invokes a routine called IREGGTBL which sends a list of global aliases for MBs 413 on that system 302 to the system 302 which is coming up. The routine operates by making a global alias table message which consists of a CSHDR 1211 of the global alias table type and a MBODY 1203. The CSHDR 1211 specifies the system 302 from which the message is coming, the number of aliases being sent, and the length of the aliases. MBODY 1203 contains the list of aliases. IREGGTBL makes MBODY 1203 by examining each AB 517 in SYS AB chain 607, determining from fields GF 901 and L/R 903 whether AB 517 represents a global alias for a MB 413 located on that system 302, and if it does, adding the contents of ALIAS 911 to MB 1203. When the list is finished, IREGGTBL invokes ITRANSPORT 1503 to send the message to the system 302 which was coming up.

System 302 which is coming up has no MBs 413 or ABs 517. When SLIH 1603 in system 302 which is coming up receives the first global alias table message, system 302 which is coming up begins building its SYS AB chain 607. For each alias received in the global alias table message, system 302 which is coming up makes an AB 517 The global alias table messages from the other systems 302 are treated in the same fashion. When all of the messages have come in (the number of remote systems 302 operating can be determined from CLCB 1105), FLIH 1603 in the system 302 which is coming up calls IREGGTBL to send a global alias table response message to the remote systems 302. The global alias table response message is similar to the global alias table message, except the CSHDR 1211 contains a different type code and MBODY 1203 to each of the systems 302 contains the list of aliases received from all of the systems 302 together with an indication for each alias as to whether the alias was successfully registered on system 302 which was coming up.

SLIH 1603 in the other systems 302 responds to the global alias table response message by calling a routine called ISETGTBL which compares the aliases in the global alias table message with the global aliases in SYS AB Chain 607. Each time a new alias is encountered, ISETGTBL makes an AB 517 representing the new alias and inserts it is SYS AB Chain 607. Further, ISETGTBL marks each global AB 517's RC field 910 to indicate which system 302 each global alias is presently registered on. When ISETGTBL is finished, it sends a global alias table response message containing all global aliases in SYS AB chain 607 back to system 302 which is coming up. SLIH 1603 in that system responds to the global alias table response message by invoking a routine called IREGRSM which compares the received aliases with the ones presently on system 302 which is coming up. If they are the same, the global aliases are identical throughout system 301 and IREGRSM marks field 910 to indicate which systems the aliases are registered on; if they are not, IREGRSM indicates an error to the operator of system 302 which is coming up.

A process on a system 302 which is already running may register a global alias while another system 302 is coming up. That situation is dealt with as follows: IREGALS checks NCB 1111 b before it transmits a register alias message to a system 302 whether the system 302 is initializing. If it is IREGALs does not transmit the register alias message, but instead marks fields RI 909 and RC 910 to indicate that the alias represented by AB 517 has not yet been registered on that system. After ISETGTBL has sent the global alias response message, it examines SYS AB chain 607 for ABs 517 which have not been registered on the system coming up and for each of them, invokes IREGALS to send a register alias message to system 302 which was coming up. Registration is then completed as previously described.

When a component system 302 is detached from system 301 or fails, global aliases for MBs 413 in that system are removed from the other component systems 302. In the case of the detach operation, the global aliases for local MBs 413 are removed from the system 302 being detached as well. Removal in the other systems 302 happens when RSF IOP 315 in each of those systems 302 detects that the detached system is no longer ready and provides an unsolicited interrupt to CPU 307. CQ field 1417 and IOPS1 field 1421 in RSF IOSW 1415 indicate that the interrupt was unsolicited and that one of the component systems is down. In response to those fields, SLIH 1603 in each of the remaining systems calls a routine called ICANRALS which goes through SYS AB chain 607, examines ALIAS 911 in each AB 517, and if ALIAS 911 indicates that ALIAS 911 is for a MB 413 on the system which has been detached or has failed, ICANRALS destroys that AB 517.

14. File Access in System 301: FIGS. 18–22

One of the global resources available to users of loosely-coupled system 301 is files. A process on any component system 302 of system 301 may access any file on any of the component systems 302 in exactly the same fashion as it accesses a file on his own component system 302. The process is able to do so because each component system 302 includes a global list of volume names which is maintained by a system process and because the operating system routines which perform file access for a process (file system routines) determine from the global list whether a file operation is local or remote and perform local or remote file operations as required. In performing remote file operations, the file system routines establish system processes on the remote system where the file is located which function as agents for the process which originates the remote file access, establish remote sessions connecting the originating process and its remote agents, and provide messages over the sessions to which the agents respond by invoking file system routines on the remote system as required to perform the operation. When the agent has completed the operation, it sends a message with the result of the operation to the originating process and the file system routine invoked by the originating process then uses the contents of the message to complete the remote I/O operation. The file system routines thus turn an operation on a remote file into a message to the agent process, which performs the actual I/O operation and sends any results as a message to the process initiating the I/O operation. In terms of FIG. 2, the global list of volume names is an embodiment of a GIL 215, the system process which maintains the list is an embodiment of a GIMS 213, an originating process executing a remote I/O operation is an embodiment of an OGRS 209 and its agent process is an embodiment of an IGRS 211.

The following discussion of file access will first provide conceptual overviews of file access generally in system 302 and of remote file access in system 301 and will then provide details of the implementation of file access in system 302 and of remote file access. Finally, the discussion will deal with global volume lists, their maintenance, and their synchronization in system 301.

Figure 18:
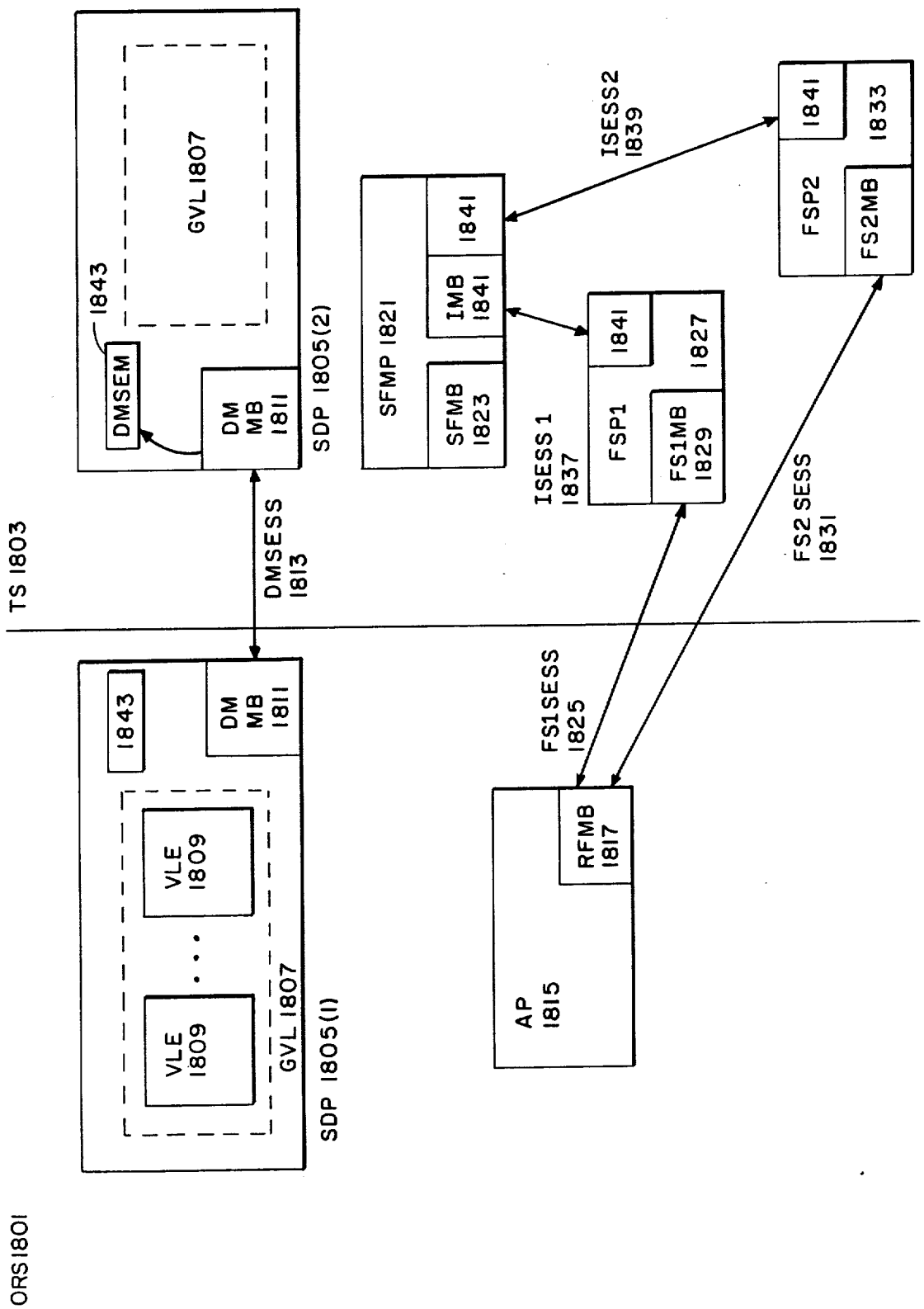
FIG. 18 is a conceptual overview of remote file access.

15. Conceptual Overview of Local and Remote File Access: FIG. 18

A program which performs operations on a file generally refers to the file by means of a file name internal to the program. System 302 provides a system file routine which opens a file for a process by associating the file name with the name of a disk file on MS 311. Thereafter, a process executing the program may perform I/O on the disk file by executing system file routines for the type of I/O required. These routines perform I/O in generally the same fashion as described in the overview of I/O in system 302. Finally, a process may close a file by calling a system file routine which destroys the association between the file name and the specific disk file.

The same operations of opening a file, performing I/O operations thereon, and closing the file may be performed on remote files in system 301. A conceptual overview of the manner in which these operations are performed on remote files is provided by FIG. 18. FIG. 18 is divided into two parts, one representing ORS 1801, the system 302 which initiates the file operation, and the other representing TS 1803, the target system 802 which has MS 311 in which the file is stored. All systems 302 in a system 301 may be both an ORS 1803 and a TS 1803, and consequently have all of the components shown in FIG. 18.

Components on ORS 1801 are the following: system doorman process (SDP) 1805(1), which is a GIM 213 which maintains global volume list (GVL) 1807, which is a list of all file volumes on system 301. Each volume on system 301 is represented by a volume list entry (VLE) 1809 in GVL 1807. The VLE 1809 for a volume contains the volume's name and the system 302 upon which it is presently located. The VLEs 1809 are chained together into a list. SDP 1805 has a global MB 413, DMMB 1811, in which it receives messages from SDPs 1805 on other systems 302. DMMB 1811's semaphore appears as DMSEM 1843. Accessing process (AP) 1815 is the user or system process which is performing the remote file access. Shown in AP 1815 is RFMB 1817, a local MB 413 which belongs to AP 1815 and is used to receive messages from AP 1815's agent processes in TS 1803.

In TS 1803, the components are SDP 1805(2), which performs the same function in TS 1803 as SDP 1805(1) in ORS 1801. GVL 1807 is identical to the one in ORS 1801, and DMMB 1811 receives messages from SDPs 1805 on other systems 302. SDPs 1805 on systems 302 are connected to each other by means of DM sessions (DMSESS) 1813. System file manager process (SFMP) 1821 is a system process which provides APs 1815 on other systems 302 with access to files on TS 1803. Belonging to SFMP 1821 are a global MB 413, SFMB 1823, in which it receives messages from processes wishing to have access to files in TS 1803 and two local internal mail boxes (IMB 1841) which it uses to communicate with the agent processes which do file I/O for remote processes.

FSP1 1827 and FSP2 1833 are system file server processes created by SFMB 1821 to perform I/O operations for a remote AP 1815. Each has a local MB 413 (FS1MB 1829 and FS2MB 1835 respectively) in which the process receives messages from AP 1815 for which it is performing I/O operations. Each further has another local IMB 1841 for a session connecting it with SFMP 1821. These sessions are termed herein internal sessions 1 and 2 (ISESS1 1837 and ISESS2 1839 respectively. The messages necessary for the performance of I/O pass between AP 1815 and FSP1 1827 and FSP2 1833 via two sessions, FS1SESS 1825 and FS2SESS 1831. Two file server processes are necessary because a process in system 302 may issue a break command which results in a transition from a user level (level 1) to a command processor level (level 2). Since I/O may be performed at both levels, a server process for each level is required in TS 1803.

Remote file access operates as follows: when AP 1815 calls the file system OPEN routine, it provides the routine with an argument which specifies the file to be opened by a name consisting of the name of the volume containing the file, the name of the library in the volume which contains the file, and the name of the file itself. The OPEN routine examines GVL 1807 to determine whether the specified volume is local or remote. If the volume is remote, the OPEN routine indicates in a data structure called the OFB that the I/O is remote and then determines whether FS1SESS 1825 and FS2SESS 1831 for TS 1803 already exist.

If they do, the OPEN routine sends the information necessary to perform the operation via a message in the proper session to whichever of FSP1 1828 or FSP2 1833 is to perform it. In the following it will be assumed that FSP1 1828 is to perform the operation. As will be explained in detail later, the information includes AP 1815's file access rights. After sending the message, the OPEN routine waits on FS1SESS 1825, i.e., waits on MRSEM 523 for that end of the session. FSP1 1827 invokes the OPEN routine in TS 1803 to open the file in system TS specified in the message and returns a message indicating the result to AP 1815 via FS1SESS 1825. On receipt of the message in RFMB 1817, the OPEN routine being executed by AP 1815 resumes executing and finishes the OPEN operation using the information in the message from FSP1 1827.

If FS1SESS 1825 and FS2SESS 1831 do not already exist, the OPEN routine executed by AP 1815 creates RFMB 1817 and invokes ICONNECT to establish a session with SFMB 1823. Included in the connect message are information about the file access privileges of the user for whom AP 1815 is executing programs and the alias of RFMB 1817. Again, the OPEN routine waits on RFMB 1817's semaphore. In response to the connect message, SFMP 1821 determines whether AP 1815's user has the proper access privileges for the file; if he does, SFMP 1821 creates FSP1 1827 and FSP2 1833, sets ISESS1 1837 and ISESS2 1839, and forwards the session specified in the connect message to them. They respond with accept messages to RFMB 1817, thereby establishing FS1SESS 1825 and FS2SESS 1831. Once these sessions are established, FSP1 1827 and FSP2 1833 terminate ISESS1 1837 and ISESS2 1839. Open resumes execution in response to the accept messages and performs an ISEND across the session with an open application message 1201. Assuming that the message is sent via FS1SESS 1825, FSP1 1837 responds to the message by executing the OPEN routine in TS 1803 and sends a result message to which the OPEN routine executed by AP 1815 responds, all as previously described.

The other I/O routines executed by AP 1815 can determine from the data structure established by OPEN whether the I/O is remote. When it is, the I/O routine in question executes the operation in the same fashion as described for OPEN when FS1 SESS 1825 and FS2SESS 1831 already exist. The contents of the application messages 1201 depends on the operation. For example, in a WRITE operation, the message to FSP1 1827 contains the data to be written; in a READ operation, the data which was read is contained in the return message from FSP1 to AP 1815. When AP 1815 executes the CLOSE routine for a remote file, FSP1 1827 or FSP2 1833 closes the file remotely. If no files referenced by AP 1815 on TS 1803 remain open, FSP1 1827 and FSP2 1833 disconnect FS1SESS 1825 and FS2SESS 1831 and SFMP 1821 terminates the two processes.

Figure 19:
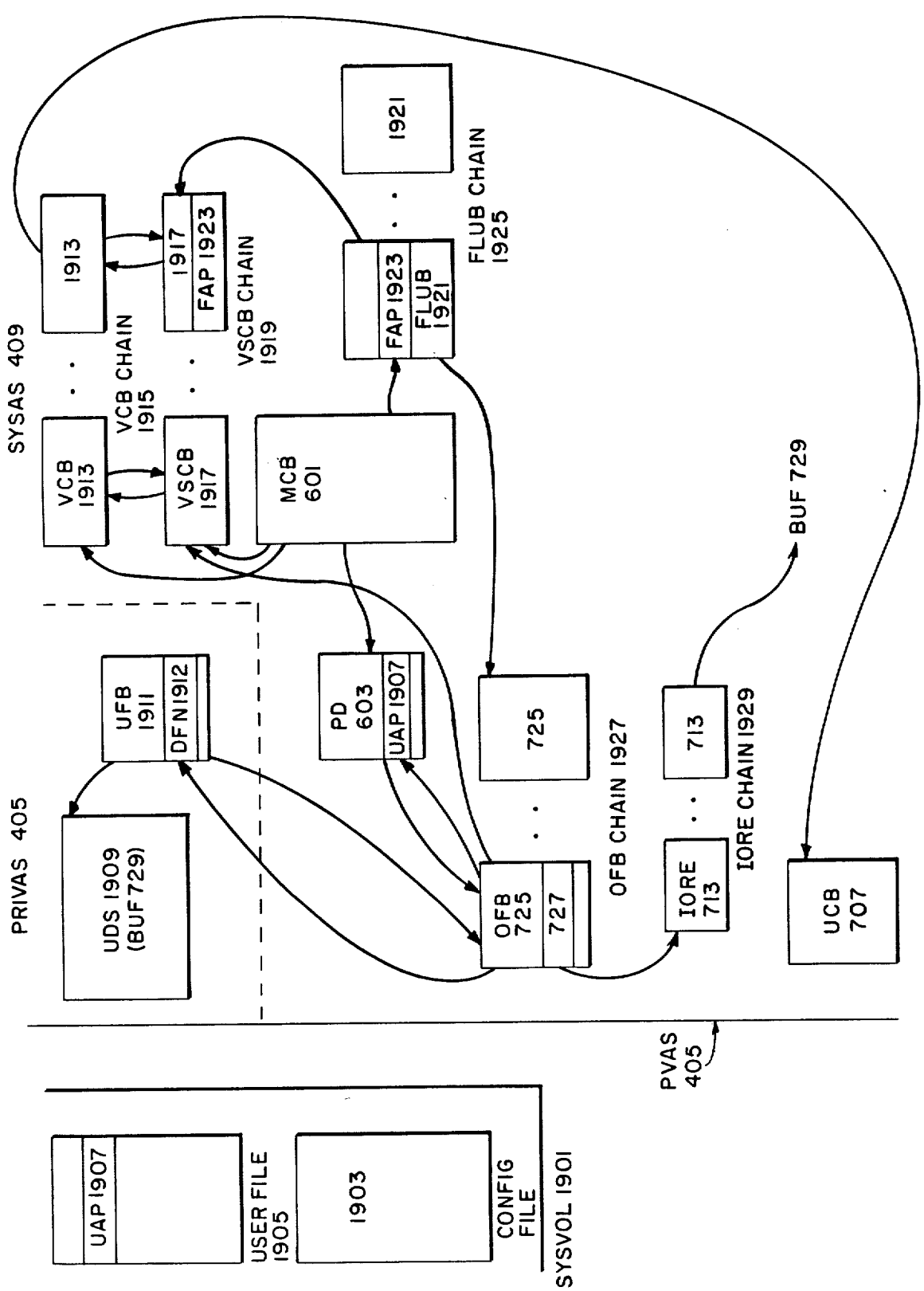
FIG. 19 is a detailed block diagram of file I/O structures in system 302.

16. Detailed File I/O Structure of System 302: FIG. 19

FIG. 19 is a diagram showing the data structures which system 302's file system routines use in performing file I/O. Beginning with information which is stored in disk files, SYSVOL 1901 is a file volume which must be present on a predetermined mass storage device (MS) 311 in system 302 in order for system 302 to operate. Contained in SYSVOL 1901 are CONFIG file 1903 and USER file 1905. CONFIG file is a file which contains information about the hardware configuration of system 302 and which system 302 reads when it initializes. An example of the information in CONFIG file 1903 is the number and types of the physical devices attached to system 302's IOPs 309 and 315. USER file 1905 is a list of the authorized users of system 302 and of the kind of access they may have to system 302's files. The information which specifies the kind of access for a given user is labelled UAP 1907 in USER file 1905.

Continuing with structures in the private address space 405 of the process performing the file I/O, contained therein are UDS 1909 and UFB 1911. User data space (UDS) 1909 is the location in PRIVAS 1909 from which or to which data is to be transferred in a given I/O operation. User file block (UFB) 1911 is a block which the program performing the I/O constructs for each of the file names which appear in the program. When a disk file is to be opened, UFB 1911 contains DFN 1912, the full name (volume name, file name) of the disk file. Further, when an I/O operation which transfers data is to be performed, UFB 1911 contains a pointer to UDS 1909 from or to which the data is to be transferred and a value indicating the size of UDS 1909.

UFB 1911 is linked by pointers to open file block (OFB) 725, which associates the file name represented by UFB 1911 with a disk file on a MS 311. OFB 725 contains completion semaphore (CSEM) 727, which is incremented whenever an I/O operation is completed on the disk file represented by OFB 725. OFB 725 also contains a pointer to VSCB 1917 representing the logical volume containing the disk file represented by OFB 725. VSCB 1917 contains a pointer to VCB 1913, representing MS 311 where the disk media containing the disk file is presently located, and VCB 1913 contains a pointer to UCB 707 for that MS 311. Thus, UCB 707 required for the I/O operation may be located from OFB 725. OFB 725 also contains a pointer to a chain of IOREs 713, each of which represents one I/O operation on the disk file represented by OFB 927. As previously explained, included in each IORE 713 is the physical address of BUF 729, the location in PMEM 303 from which or to which data is to be transfered by IOP 309 for MS 311. OFB 725 is further linked by pointers to a chain of OFBs 725 (not shown) belonging to the process and linked to PD PD 603 representing the process accessing the disk file represented by OFB 725 and to a chain (OFB chain 1927) of other OFBs 725 representing the same disk file in other processes. Included in PD 603 in a copy of UAP 1907 for the user for which the process represented by PD 603 is executing the program.

VCB chain 1915 represents the physical volumes locally available to users of system 302. Each logical volume locally available to users of system 302 is represented by a VSCB 1917. A logical volume may be stored on more than one physical volume, and a VSCB 1917 has pointers to each VCB 1913 upon which a portion is stored, while a VCB 1913 has a pointer to the VSCB 1917 representing the material stored on MS 311 represented by VCB 1913. Included in the VSCB 1917 for a volume is file access privileges (FAP) 1923 indicating how the file may be used. VSCBs 1917 and VCBs 1913 are organized into VCB chain 1915 and VSCB chain 1917, both accessible from MCB 601.

The first time any process opens a given disk file, the file system creates a file location and use block (FLUB) 1921 for the file. All of the FLUBs 1921 currently in system 302 form FLUB chain 1925, which may be located from MCB 601. Each FLUB 1921 contains the full name of the disk file it represents and the file access privileges (FAP) 1923, copied from VSCB 1917 for the file. The FLUB 1921 further contains a pointer to VSCB 1913 for the MS 311 upon which the file is located and a pointer to OFB chain 1927, made up of all of the OFBs 725 representing the disk file which the FLUB 1921 represents.

As indicated above, before a process executing on a system 302 can access a disk file, the process must first open the file. In order to do so, the process first must create a UFB 1911 containing DFN 1912 specifying the disk file to be opened and the kind of I/O operation it is to be opened for. The process then invokes the OPEN routine using a pointer to UFB 1911. OPEN first compares the UFB information indicating how the file is to be accessed with UAP 1907 in PD 603 for the process. If UAP 1907 indicates that that kind of access is not permitted to the process's user, OPEN returns an error. OPEN then examines FLUB chain 1925 to determine whether there is already a FLUB 1921 for the file. If there is none, OPEN creates FLUB 1921 by using the volume name from DFN 1912 in UFB 1911 to locate VSCB 1917 for the file in VSCB chain 1919 and locating VCB 1913 from VSCB 1917. The necessary information, including FAP 1912 is copied from VSCB 1917 into FLUB 1921 and the FLUB 1921 is linked as shown in FIG. 19. When the FLUB 1921 is completed, or if it already exists, OPEN first compares the kind of file access being sought with FAP 1923 in FLUB 1921 to determine whether the file can be accessed in the manner specified in the argument to the OPEN routine. If not, OPEN returns an error. Otherwise, OPEN creates OFB 725 for the disk file, indicates in it the mode of access for which the file has been opened, and links OFB 725 to PD 603 and OFB chain 1927 for the FLUB 1921 as shown. Additionally, OPEN locates VCSB 1913 for the disk file's volume from FLUB 1921 and copies a pointer to VCSB 1913 into OFB 725, completing the OPEN operation.

Once the disk file has been opened, the process represented by PD 603 may perform I/O operations on the disk file represented by OFB 727. One such operation is the READ operation, performed by a READ file system routine. Included in the arguments supplied to the READ routine is the address of UFB 1911 for the program file name presently associated with the disk file. READ locates OFB 725 for the disk file from UFB 1911 and determines whether the disk file was opened for reading. If it was not, READ returns an error; otherwise, it locks the logical page (LPAGE) 407 containing UDS 1909 into PMEM 303 and obtains the physical address of UDS 1909 in PMEM 303. Then READ creates an IORE 713 containing an IIOCW 719 specifying the READ operation and the physical address of UDS 1909, which thus functions as BUF 729 for the operation, calls STARTIO with the addresses of IORE 713 and UCB 707 (obtained via VSCB 1917 and VCB 1913), and waits on CSEM 727. As described in the general discussion of I/O, when IOP 729 has completed the I/O operation, the data is in BUF 729 and FLIH 803 has incremented CSEM 727. At this point, the READ routine resumes execution and processes IORE 713 representing the read operation. If RIOSW 721 indicates that the operation was successful, READ unlocks LPAGE 407 containing UDS 1909 specified in UFB 1911 and returns.

As will be clear to those skilled in the art, other I/O operations are performed in the same general fashion as described for OPEN and READ. For example, the WRITE operation performs generally as described for READ, except that the data to be written is locked into PMEM 303 and IORE 713 specifies a write operation. Similarly, the CLOSE operation is the reverse of the OPEN operation, i.e., the OFB 725 created by the OPEN is unlinked and deleted, and if that OFB 725 was the last OFB in chain 1927 for FLUB 1921, FLUB 1921 is unlinked from FLUB chain 1925 and deleted.

Figure 20:
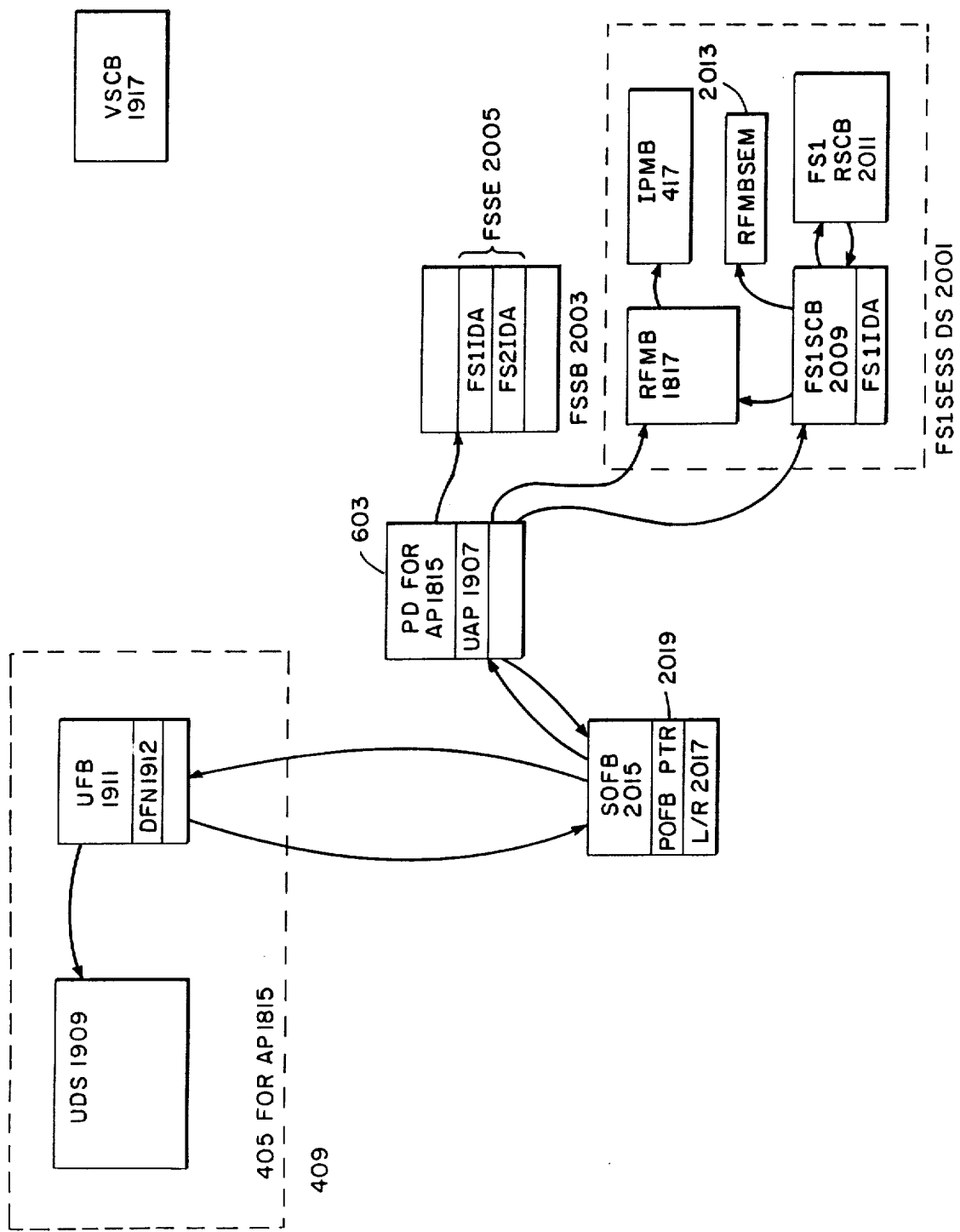
FIG. 20 is a detailed block diagram of remote file access structures in system 302 originating the access.
Figure 21:
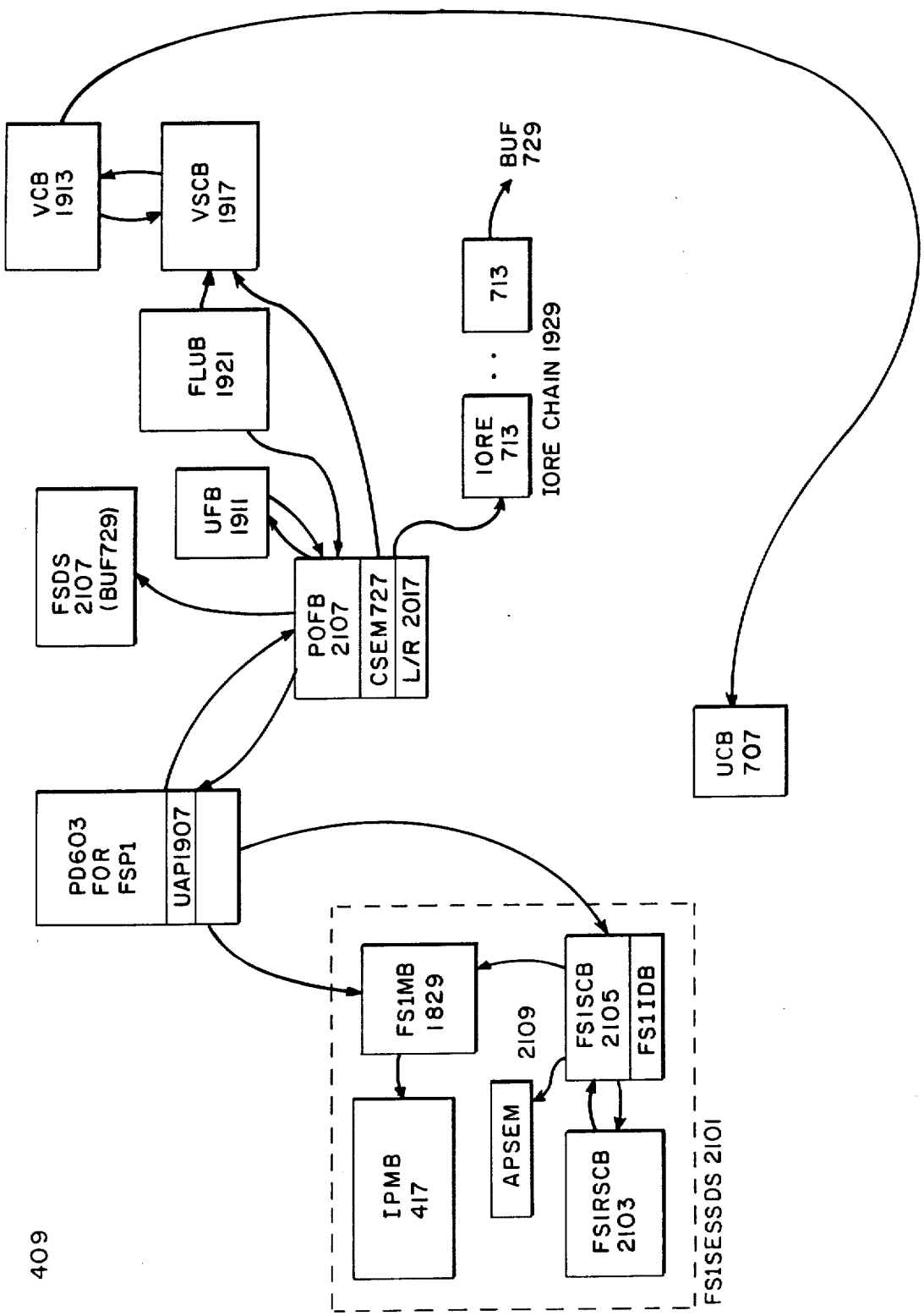
FIG. 21 is a detailed block diagram of remote file access structures in system 302 where the file is located.

17. Detailed Discussion of Remote File Access in System 301: FIGS. 20-21

As pointed out in the introduction to the discussion of remote file access, the file system routines in a component system 302 in which a remote I/O access originates accomplish the remote access by detecting that the disk file being operated on is on a remote system 302, producing a message to an agent process on the remote system which specifies the I/O operation, and waiting for a result message from the agent process. The agent process on the remote system 301 interprets the message, performs the I/O operation on the specified file, and returns the result message to system 302 where the I/O operation originated. On receiving the result message, the originating system interprets it and finishes the I/O operation using the information and data contained in the message.

The structures by which the originating system 302 turns a request for I/O in a remote system into a message are shown in FIG. 20. UDS 1909 and UFB 1911 are as previously described; however, the OFB for the opened remote disk file is different: it is a secondary OFB (SOFB) 2015, i.e., an OFB 715 representing a remotely-located disk file. L/R field 2017 in POFB 2107 indicates whether it is primary or secondary. POFB PTR field 2019 contains the address of a primary OFB, i.e., an OFB created for the remote file operations on the remote system. Because the disk file being accessed is not an originating system 302, SOFB 215 has no pointer to IORE chain 1927 and is not associated with an FLUB 1921, and is consequently not a member of any FLUB OFB chain 1929. SOFB 215 does, however, have a pointer to VSCB 1917 representing the remote file and is a member of the PFB chain for FSP1 1827. Further, SOFB 2015 contains no CSEM 727.

Additionally, PD 603 for process AP 1815 performing the remote access contains a pointer to file server session block (FSSB) 2003, a list of sessions between AP 1815 and file server processes on remote systems 302. In a preferred embodiment, FSSB 2003 contains one entry (FSSE) 2005 for each of the other component systems 302 in system 301. Each FSSE 2005 indicates which component system 302 it is for and if AP 1815 has sessions with that component system 302, further contains SESSIDs 505 for each of the file server processes for AP 1815 on that system. Here, the two identifiers identify FS1SESS 1825 and FS2SESS 1831.

As previously described, PD 603 contains pointers to a chain of all MBs 413 belonging to a process and to a chain of all SCBs 503 representing sessions belonging to the process. Further, each SCB 503 contains SESSID 505 for the session it represents, a pointer to the sessions's MB 413, and a pointer to the session's MRSEM 523. Consequently, the data structures belonging to FS1SESS 1825 and FS2SESS 1831 may be located from FSSB 2003 and PD 603. In FIG. 20, only the structures 2001 for FS1SESS 1825 are shown. They include RFMB 1817, RFMBSEM 2013, the session semaphore, IPMB 417, the first in the chain of message buffers for messages to RFMB 1817, and the session control blocks in originating system 302 for FS1SESS 1825, i.e., SCB 503 FS1 SCB 2009, containing FS1IDA for the remote session, and RSCB 1001 FS1 RSCB. FS2SESS 1831 also employs RFMB 1817 and IPMB 417, but has its own session control blocks and session semaphore.

The data structures used by FSP1 1827 in the remote system 302 where the disk file is located are shown in FIG. 21. FSP1 1829 is represented by PD 603 whose UAP 1907 contains information from UAP 1907 in PD 603 for AP 1815. PD 603 also contains pointers to FS1MB 1829 and to FS1 SCB 2105, representing the other end of FS1SESS. The other data structures in FS1SESS 2101 are IPMB 417, APSEM 2109, the session semaphore for FS1SESS 1829, and FS1 RSCB 2103. FS1 1827 waits on APSEM 2109 whenever it has finished an I/O operation for AP 1815. The disk file itself is represented by primary OFB (POFB) 2107. Since the file is located on this system 302, POFB 2107 contains CSEM 727 and has all of the pointers described with regard to OFB 725 except the pointer to UDS 1909, which is of course of the originating system 302. Instead of that pointer, POFB 2107 has a pointer to FSDS 2107, where data received in a message or to be sent in a message is stored.

Operation of remote file system access using the structures illustrated in FIGS. 20 and 21 is as follows: As previously described, GVL 1807 indicates whether a volume is local or remote. In a preferred embodiment, SDP 1805, in maintaining GVL 1807, creates a VSCB 1917 for each remote volume which indicates that the volume is remote. Consequently, OPEN examines VSCB 1917, and if VSCB 1917 indicates that the volume is remote, OPEN does not look for a FLUB 1921, but instead creates SOFB 2015 and links it to UFB 1911 and PD 603 for AP 1815. OPEN then sends a connect message specifying RFMB 1817 containing the information in UAP 1907 of PD for AP 1815 to SFMP 1821's global mailbox SFMB 1823 and waits on RFMBSEM 2013. A routine executing in SFMP 1821 determines from the UAP information whether the user has access to that system 302. If the user has no access, SFMP 1821 returns a decline message to RFMB 1817. On receipt of the decline message, the OPEN routine being executed by AP 1815 resumes execution and makes an error return. If access is permitted, SFMP 1821 creates FSP1 1827 and forwards the connect message to it. FSP1 1827 responds to the message by sending an accept message to RFMB 1817, thus establishing FS1SESS 1825 as described in the discussion of remote sessions. FSP1 1827 then waits on APSEM 2109.

On receipt of the accept message, OPEN in AP 1815 resumes execution and sends an open message via FS1SESS 1825 to FSP1 1827 and waits on RFMBSEM 2013. Included in the message is the information from UFB 1911 in AP 1815. FSP1 1827 responds to the message by creating UFB 1911 for the disk file and then invoking the file system OPEN routine with the address of the UFB 1911. OPEN then proceeds as previously described in the discussion of file I/O in system 302. OFB 725 constructed by the OPEN routine is a POFB 2107. When the OPEN operation is finished, FSP1 uses ISEND to send the result of the operation via FS1SESS 1825. If the operation is sucessful, the result message contains the address of POFB 2107. On receipt of the message, the OPEN routine being executed by AP 1815 in the originating system 302 examines the message and if the OPEN operation was successful, places the address of POFB 2107 in SOFB 2015.

The READ operation previously described is performed on a remote file as follows: when the READ file system routine being executed by AP 1815 examines L/R field 2017 of SOFB 2015, it determines that the file to be read is remotely located. READ then creates a read message containing POFB PTR 2019 and the value from UFB 1911 for AP 1815 indicating the size of the data to be read and uses ISEND to send it to FSP1 via FS1SESS 1825. Thereupon, READ waits on RFMBSEM 2013. When FSP1 1827 receives the message, it allocates FSDS 2107 of a sufficient size for the read, copies the address of FSDS 2107 into UFB 1911, and calls the READ file system routine. READ performs the read operation on the file as previously described, returning the data read to FSDS 1909. When the READ by FSP1 1827 is finished, FSP1 1827 makes a result message including the data in FSDS 2107 and uses ISEND to send it via FS1SESS 1825 to AP 1815. FSP1 1827 then waits on APSEM 2109. In the originating system 302, AP 1815 responds to RFMBSEM 2013 by continuing execution of the READ routine. READ copies the result data from IPMB 417 to UDS 1909, completing the READ operation.

The other remote I/O operations are performed analogously. For example, in the remote write operation, the data to be written is in UDS 1909, and when the operation is remote, the WRITE routine executed by AP 1815 sends a write message containing the contents of UDS 1909, its size, and POFBPTR 2019 via FS1SESS 1825 to FSP1 1827 and waits on RFMBSEM 2013. FSP1 1827 responds to the message by allocating FSDS 2107 of the proper size, entering its location and size in UFB 1911, copying the data from IPMB 417 into FSDS 2107, and invoking the file system WRITE routine. When that routine returns, FSP1 1827 makes a result message, sends it via ISEND to AP 1815, and waits on APSEM 2109. On receipt of the result message, the file system WRITE routine being executed by AP 1815 resumes executing, interprets the result message, and returns. A remote CLOSE operation sends a close message to FSP1 1827 and waits on RFMBSEM 2013. FSP1 1827 responds to the close message by calling the file system CLOSE routine, which unlinks and destroys POFB 2107 as previously described, and when it is finished, FSP1 1827 deletes UFB 911 and sends a result message to AP 1815. The CLOSE routine being executed by AP 1815 resumes execution in response to the result message and unlinks and destroys SOFB 2015.

If POFB 2107 destroyed by FSP1 1827 was the last POFB 2107 chained to PD 603 for FSP1, i.e., if all files accessed by FSP1 1827 for AP 815 have been closed, FSP1 1827 waits on a timer which is set to run out at a predetermined time. If no further messages arrive from AP 1815 before the timer runs out, FSP1 1827 employs IDISCONN to send a disconnect message to AP 1815 via FS1SESS 1825. Having thus terminated FS1SESS 1825, FSP1 1827 terminates itself. Some file operations, such as deleting a file or renaming it, do not imply other file actions, as does OPEN. If AP 1815 sends a message requesting such a file operation when there are no POFBs 2107 belonging to FSP1 1827, FSP1 1827 performs the action and waits on the timer as described above. If no further messages arrive from AP 1815 before the time runs out, FSP1 1827 disconnects FS1SESS 1825 and terminates itself.

18. Remote Shared File I/O

Certain disk files in loosely-coupled system 301 may be shared among several users simultaneously. All accesses to such a file in a given system 302 are made by a system process called the sharer. A process wishing to perform a file operation on a shared file establishes a session with the sharer and uses the inter-process message system to send a message specifying the operation to the sharer. The sharer then performs the operation and returns the results in substantially the same fashion as described for FSP1 1827. In system 301, the sharer process in each of the component systems 302 has a mail box with a global alias. A process on one of the component systems 302 performs operations on a shared file on another of the component systems 302 by establishing a remote session with the sharer process on the other component system 302 and sending and receiving the messages necessary to the file operation via the remote session.

19. Global Volume Lists: FIGS. 18, 22–24

As mentioned in the introduction to remote file access, the global volume list (GVL) 1807 in each component system 302 is an embodiment of a GIL 215 and SDP 1805, the system process in each component system 302 which syrichronizes and maintains GVL 1807, is an embodiment of a GIMS 213. SDP 1805 operates by receiving messages from other processes in its local system 302 and by exchanging messages with SDPs 1805 in other systems via sessions (DMSESS 1813) which it maintains with those SDPs 1805. The messages are application messages 1201 sent via the inter-process message system.

In the following, the lists employed by SDP 1805 in a preferred embodiment to implement and maintain GVL 1807 will be discussed, thereafter the routines executed by SDP 1805 in manipulating the lists will be described, and finally, the operation of SDP 1805 in maintaining and synchronizing the lists will be described.

Figure 22:
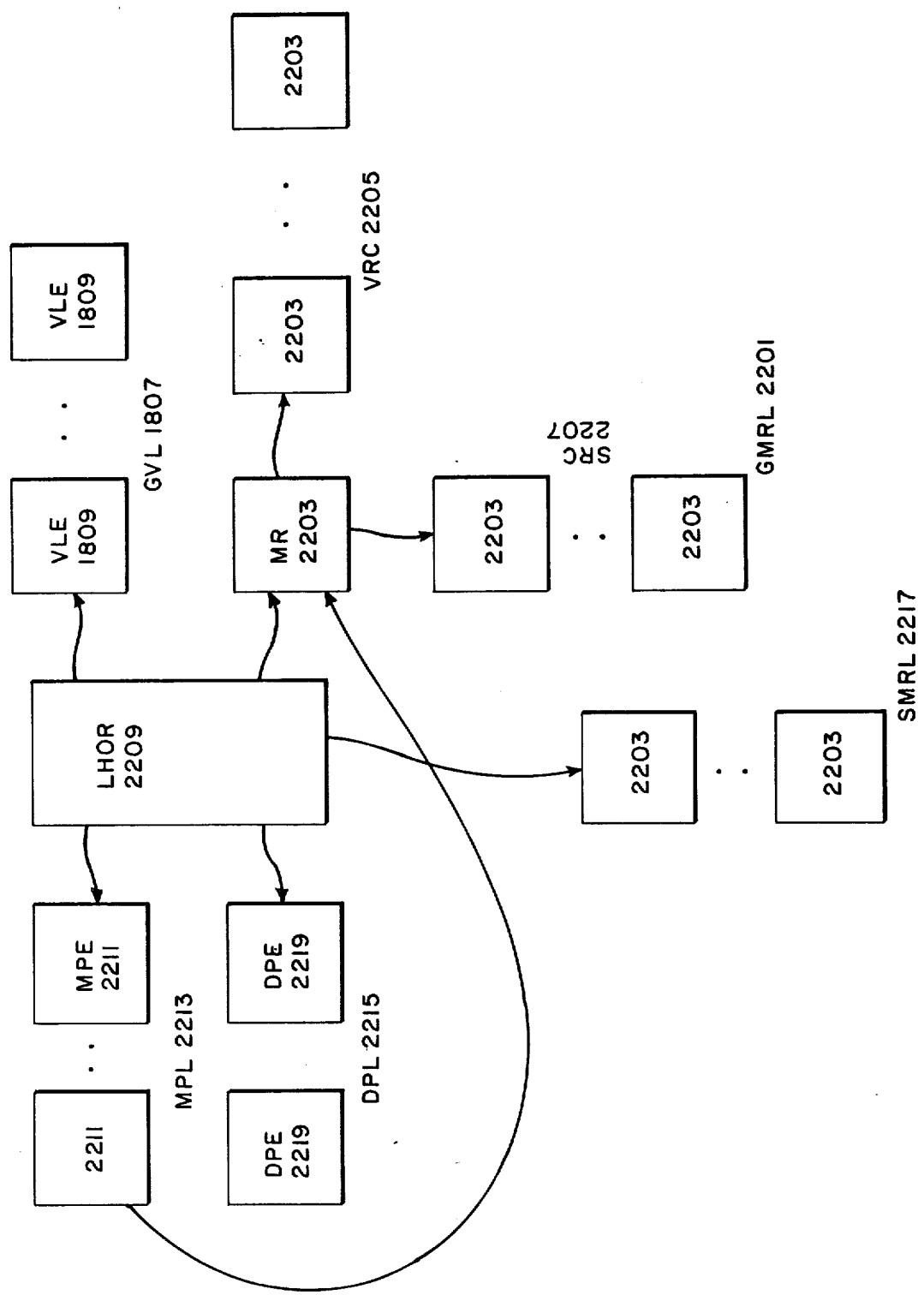
FIG. 22 is an overview of the lists used in SPD 1805.

20. Lists and Routines Employed by SDP 1805: FIGS. 22 and 23

FIG. 22 shows the lists which SDP 1805 manipulates in maintaining GVL 1807. There are five such lists. GVL 1807 is a linked list of VLEs 1809, each one representing one globally-accessible logical volume in system 1807. Generic mount request list (GMRL) 2207 is a linked list of mount requests (MR) 2203, each one of which represents a request to all systems 302 in loosely-coupled system 301 to to mount a specified logical volume. In GMRL 2207, the first MR 2203 which SDP 1805 receives for a given logical volume is linked into volume request chain (VRC) 2205; any subsequent MR 2203 from another system 302 for that same logical volume is chained to the first MR 2203 for that logical volume, forming system request chain (SRC) 2207 for that logical volume. SMRL 2217 is a chain of MRs 2203 of requests to the local system 302 to mount a logical volume on that system 302.

Mount pending list (MPL) 2213 is a linked list of mount pending entries (MPE) 2211, each one of which represents one logical volume mount operation currently taking place in system 301. Dismount pending list (DMPL) 2215 is a linked list of DPEs 2219, each one of which represents one logical volume dismount operation currently taking place in system 301. All of the lists described above are located in PRIVAS 405 of SDP 1805 and are accessible to SDP 1805 from a data structure termed list header (LHDR) 2209. SDP 1805 receives inter-process messages specifying the state of logical volumes being mounted or dismounted from processes on its own component system 302 or SDPs 1805 on other systems 302 in global DMMB 1811, and consequently waits on DMSEM 1843.

Details of VLE 1809, MR 2203, MPE 2211, and DPE 2219 are provided by FIG. 23. In each case, only fields relevant to the present discussion are shown. Here, only VLE 1809, MR 2203, and MPE 2211 will be dealt with; DPE 2219 will be explained in the discussion of dismounting below. Beginning with VLE 1809, the fields are the following:

VNAME 2301, containing the name of the logical volume represented by that VLE 1809;

VDA 2308, containing the device address of MS 311 upon which the logical volume is mounted in the system 302 where it is located;

VSYS 2305, containing an identifier for system 302 where the volume is located;

GVLCHN 2307, a pointer to the next VLE 1809 in GVL 1807.

As can be seen from the above, each VLE in a preferred embodiment associates a logical volume with the system 302 it is currently mounted on and the MS 311 upon which it is mounted.

MR 2203 contains the following fields:

TS 2309: a time stamp field indicating when the MR 2203 was created;

SRCHN 2311 and VRCHN 2313: pointers to the next MR 2203 in VRC 2205 or in SMRL 2217 and to SRC 2207;

PMBID 2315: if the mount request represented by MR 2203 originated on the local system 302, PMBID 2315 is a MBID 515 for a mailbox belonging to the process making the request;

VNAME 2317: the name of the requested logical volume;

VDA 2319: if the mount request is specific, the device upon which the logical volume is to be mounted.

VSYS 2323: the system 302 from which the mount request came;

As will be explained in more detail below, TS 2309 is used as a unique identifier of MR 2203.

The fields in MPE 2211 are the following:

STS 2325 and RTS 2327: time stamps indicating the time the disk containing the logical volume was spun up and the time the request was made respectively. RTS 2327 is copied from TS 2309 in a MR 2203 and serves to uniquely identify the MR 2203 associated with MPE 2211.

LCHN 2329: the pointer to the next MPE 2211 in MPL 2213 or DPL 2215.

MRPTR 2331: a pointer to MR 2203 for the mount request whose processing is represented by MPL 2213.

VCBADDR 2333: the address of VCB 1913 representing MS 311 upon which the disk containing the logical volume has been spun up.

VNAME 2335 and VSYS 2337: the name of the logical volume and the name of the system 302 it is mounted on respectively.

ACKFLGS 2341: 1 flag for each system 302 in system 301. When the flag is set, that system 302 has not yet acknowledged that a mount is pending.

STS 2325 is used to resolve conflicts between mount pending requests.

To manipulate GVL 1807, MRL 2201, MPL 2213, and DPL 2215, SDP 1805 employs the following routines:

LMRH, the local mount request handler: this routine handles mount request messages originating on the local system 302.

RMRH, the remote mount request handler: this routine handles mount request messages from remote SDPs 1805.

SPH, the spin up handler: this routine responds to a spin up message from SLIH 1603 indicating that a logical volume has become available.

RPMH, the remote pending mount handler: this routine handles pending mount messages from remote SDPs 1805.

MACKH, the mount acknowledgement handler: this routine handles mount acknowledgement messages from remote SDPs 1805.

MCH, the mount confirmation handler: this routine handles mount confirmation messages received from remote SDPs 1805.

LDRH, the local dismount request handler: this routine responds to a dismount request message from a local process.

RDRH, the remote dismount request handler: this routine handles dismount request messages received from remote SPDs 1805.

DACKH, the dismount acknowledgement handler, which handles acknowledgements from remote SDPs 1805 that a dismount request has been received.

DCH, the dismount confirmation handler, which handles confirmations from the dismount system routine and remote SDPs 1805 that a dismount has been completed.

21. Operation of SDP 1805

SDP 1805 in each component system 302 must alter its GVL 1807 whenever a logical volume is mounted on or dismounted from any component system 302 in loosely-coupled system 301. The following discussion will deal first with mounting, then with dismounting.

22. Mounting Logical Volumes in System 301

Disk mounts may come about in three ways:

specific mount: a process requests that a given logical volume be mounted on a specific MS 311 in the local system 302;

generic mount: a process requests that a given logical volume be mounted on any system 302 in system 301;

unrequested mount: an operator on a system 302 spins up a disk containing a logical volume without any mount request.

A process executing on a system 302 may request a specific or generic mount in a mount request message to its local SDP 1805; in the case of the unrequested mount, SLIH 1603 responds to an interrupt generated by IOP 309 upon which the disk is spun up by sending a spin up message to its local SDP 1805 identifying the logical volume and the MS 311 upon which it is mounted. As will be explained below, this message is handled in the same fashion as the spin up message which results when a requested logical disk is spun up.

Beginning with requested mounts, if the requested mount is generic, the request generic mount message contains MBID 515 for a MB 413 belonging to the process and the name of the requested logical volume. SDP 1805 responds to the request generic mount message by invoking the LMRH routine, which begins by examining GVL 1807 to determine if the logical volume name is already on GVL. If it is, the LMRH returns a message to that effect to the MB 413 for the requesting process. If it is not, the LMRH creates a MR 2203 for the request, placing the current time as indicated by system 302's clock in TS 2309, placing the MBID 515 in PMBID 2315, placing the logical volume name in VNAME 2317, and linking MR 2203 into VRC 2205 or SRC 2207 as required. If MR 2203 is the first request to mount that logical volume, LMRH examines MPL 2213 to determine whether the logical volume is in the process of being mounted. If it is not being mounted, SPD 1805 makes a SDP request generic mount message containing the values of fields 2309 and 2317 and sends it via DMSESS 1813 to each of the other SDPs 1805. Finally, LMRH sends a message to the terminal belonging to the operator of local system 302 asking him to mount the requested volume and waits on DMSEM 1843.

In response to the SDP request generic mount message, each remote SDP 1805 executes the RMRH routine, which checks MRL 2201 to determine whether there is already a MR 2203 on the list for that logical volume. If there is none, the RMRH 1805 makes a MR 2203 using the information in the SDP request generic mount message, links it into VRC 2205, and sends a message to the terminal belonging to the operator of its local system 302 asking him to mount the requested volume and waits on DMSEM 1843. As a consequence of the above, the operator of each component system 302 has received a message requesting him to mount the volume.

The request specific mount message sent by a process to SDP 1805 contains the identifier of the device on local system 302 on which the logical volume is to be mounted in addition to the information of the request generic mount message. Since the device is to be mounted on the local system, no mount request message is sent to the other systems 302. The LMRH responds to the request specific mount message generally as described for the request generic mount message except for the following:

MR 2203 includes the address of MS 311 drive in VDA 2319.

The local SDP 1805 sends a mount message to the operator of its system 302.

As a consequence of the above, only the operator of the local system 302 receives a message on his console requesting that he mount the logical volume.

Figure 24:
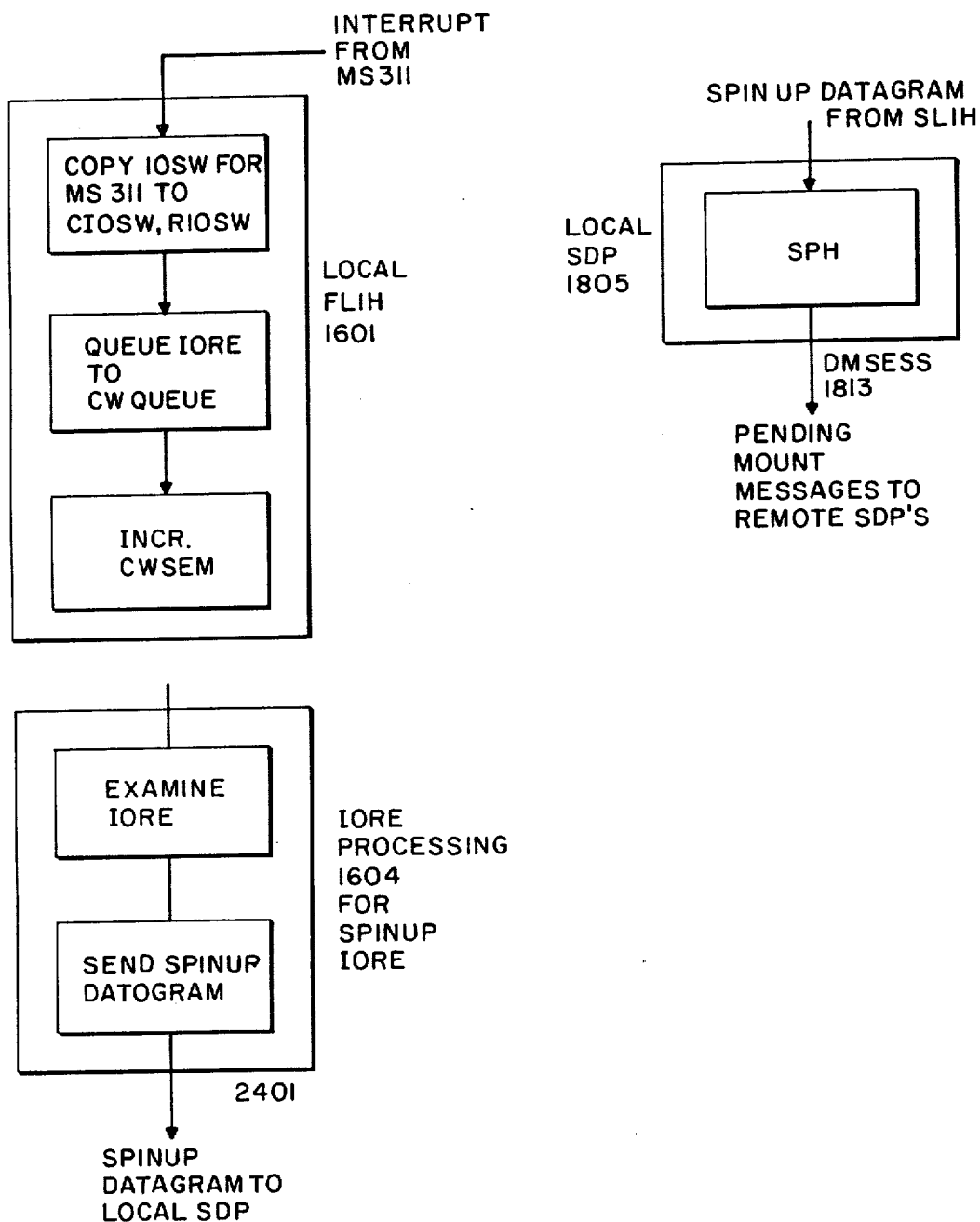
FIG. 24 is a flow diagram of spin up processing in system 301.

When the operator of a component system 302 places a logical volume on a disk and spins it up, whether in response to a console message or not, IOP 309 connected to the drive notes from the state of the bus connecting it to the drive that the drive has been spun up and generates an unsolicited interrupt to CPU 307. The IOSW 321 resulting from the interrupt indicates which physical device has become ready. As shown in FIG. 24, FLIH 1601 in the component system 302 responds to the unsolicited interrupt by producing an IORE 713 containing a copy of IOSW 321 resulting from the interrupt, queueing it to RW QUEUE 1103, the work queue for SLIH 1603, and incrementing RWSEM 1101, the semaphore upon which SLIH 1603 waits.

When SLIH 1603 processes the IORE 713 resulting from the spin up in block 1604 of FIG. 16, it does so in the fashion shown in block 2401 of FIG. 24. It examines IORE 713 and determines from the copy of IOSW 321 therein and VCB 1913 for the specified physical device that a logical volume has been spun up on a MS 311. Consequently, it sends a spin up datagram to DMMB 1811 belonging to the local SDP 1805. Contained in the datagram is the device address of the physical device.

In response to the spin up datagram, SDP 1805 invokes SPH, the spin up handler. That routine uses the device number in the data gram to invoke an I/O system routine which permits SPH to read the logical volume name of the disk which has spun up. SPH then compares the logical volume name and with logical volume names in the MPEs 2211 on MPL 2213. If there is a match, the same logical volume has been spun up on another system 302 and SPH sends a message to the local operator to dismount the disk. If there is no MPE 2211 for the logical volume on MPL 2213, SPH makes a MPE 2211 using the information obtained from the spin up datagram and the I/O routine to fill in VCBADDR 2333, VNAME 2335, and VSYS 2337 and setting STS 2325 to the current time. It then examines MRL 2201 to determine whether there is a MR 2203 for the logical volume specified in VNAME 2335. If there is, it places a pointer to that MR 2203 in MRPTR 2331 and copies TS 2309 from that MR 2203 into STS 2325. Then it links the new MPE 2211 into MPL 2213. Finally, it sends a pending mount message containing the values of fields 2325, 2327, 2333, 2335, and 2337 to each of the other SDPs 1805 and returns.

The remote SDPs 1805 each respond to the pending mount message by invoking the remote pending mount handler routine RMPH. RMPH first compares the logical volume name in the message with the logical volume names in VNAME 2333 of MPE 2211. If no match is found, RMPH constructs a MPE 2211 from the message and links it in as previously described. If a match is found, the value of STS field 2325 is compared with the time stamp in the message. If the time stamp in the message is later, i.e., the mount of the volume is already pending, RMPH simply sends a mount acknowledgement message to SDP 1805 from which the pending mount message came. If the time stamp is the message is earlier, RMPH constructs a MPE 2211 from the message and links it in as previously described for SPH and replaces the later MPE 2211 with the earlier MPE 2211.

Finally, RMPH sends a mount acknowledgement message to the SDP 1805 from which the message came.

The SDP 1805 on the system 302 in which the logical volume was spun up responds to each mount acknowledgement message by invoking the acknowledgement handler routine ACKH. For each acknowledgement message which it receives, ACKH resets the flag in ACKFLGS 2341 indicating that an acknowledgement has not been received. When all have been received, ACKH creates a VSCB 1917 for the volume and links it to the proper VCB 1913 and makes a VLE 1809 for the volume name and links it into GVL 1807. Then, if MPE 2211's MRPTR field is not null, ACKH locates the MR 2203 pointed to by the field and, if PMBID 2315 is not null, sends a mount complete message to that MB 413. Now, ACKH unlinks and destroys MPE 2211 for the pending mount and the MR 2203 pointed to by that MPE 2211 and sends confirmation messages to all of the remote SDPs 1805.

The remote SDPs 1805 each respond to the confirmation message by invoking MCH, the mount confirmation handler. MCH creates a VSCB 1917 for the volume which indicates that the volume is remote and otherwise proceeds in the same fashion as ACKH, except that no confirmation messages are sent.

22. Dismounting Logical Volumes in System 301

A process on system 301 may request that any volume listed on GVL 1807 be dismounted. The process does so by invoking a file system dismount routine. That routine first checks VSCB 1917 for the volume to determine whether it is local or remote. If the volume is local, the dismount routine checks whether any of the files of the volume are open. If any are, it returns an error. With both local and remote volumes, the dismount routine then sends a dismount request datagram to SDP 1805 and waits on a reply from SDP 1805. The datagram specifies the system 302 the logical volume is on, a mailbox for the process requesting the dismount, and the name of the volume. In response to the datagram, SDP 1805 invokes LDRH, the local dismount handler routine. LDRH creates a DPE 2219 and links it into DPL 2215. DPE 2219, shown in detail in FIG. 23, has the following relevant fields:

REQSYS 2343: an identifier for the system upon which the dismount request originates;

VOLSYS 2345: an identifier for the system upon which the volume to be dismounted is located.

RMBID 2347: a MBID 515 for the mailbox belonging to the process making the dismount request;

NACKRFL 2349: a flag indicating that the volume whose dismount was requested is still in use on some system 302;

DPLCHN 2351: a pointer to the next DPE 2219 in DPL 2215;

VNAME 2353: the name of the logical volume to be dismounted;

OKFL 2355: flags which are set if a system does not OK the dismount;

NOACKFL 2357: flags for systems which have not yet acknowledged the dismount request.

LDRH fills in fields 2347 and 2353 from the dismount request message and obtains the value of field 2345 from the VSCB 1917 for the volume. Fields 2349, 2355, and 2357 are set to values indicating that no response has been received from other component systems.

Beginning with a local dismount request, after setting the fields as described above, SDP 1805 sends a pending dismount message containing the above fields and REQSYS 2343 identifying SDP 1805's own system 302 to SDP 1805 on each of the other component system 302s. In response to the message, each SDP 1805 invokes RDRH, the remote dismount request handler. That routine creates a DPE with the information in the message. Then RDRH examines VSCB 1917 for the logical volume to determine whether any processes on that system 302 have open files in the volume. If any does, RDRH returns a negative acknowledgement message to the requesting SDP 1805 indicating that fact. If none does, RDRH sends a positive acknowledgement message to the requesting SDP 1805. Then RDRH links DPE 2219 into its DPL 2215 and returns.

When the acknowledgement message arrives at requesting SDP 1805, that SDP 1805 invokes DACKH, the dismount acknowledgement handler routine. On the arrival of each positive acknowledgement message, DACKH marks NOACKFL 2357 to indicate which system sent the acknowledgement. DACKH returns after making the flags until all systems have sent positive acknowledgements. When all positive acknowledgements are in, DACKH sends a dismount message to the dismount system routine and returns. The dismount system routine then resumes execution and puts a dismount message on system 302's operator's console. When the operator confirms the receipt of the message, the dismount system routine sends a dismount confirmation datagram to local SDP 1805. In response to the datagram, SDP 1805 invokes DCH, the dismount confirmation handler, which performs the actual dismount of the volume (i.e., unlinks and deletes the volume's VSCB 1917), sends a dismount confirmation message to the remote systems 302, sends a message confirming the dismount to the MB 413 specified in RMBID 2347, removes VLE 1809 for the volume from GVL 1807 and deletes VLE 1809, and unlinks and deletes DPE 2219. When each remote SDP 1805 receives the dismount confirmation message, it invokes its DCH, which unlinks and deletes the local VSCB 1917 for the volume, unlinks and deletes VLE 1809 for the volume from the local GVL 1807, and unlinks and deletes DPE 2219.

If a negative acknowledgement arives in SDP 1805, sets OKFL 2355 to indicate that fact. If any OKFL 2355 is set after all of the acknowledgements arive, DACKH does not send a dismount message to the dismount system routine. Instead, it unlinks and deletes DPE 2219 and sends negative confirmation messages to remote systems 302. In response to a negative confirmation message, DCH merely unlinks and deletes DPE 2219. Thus, if a system 302 is using a logical volume, a VLE 1809 and a VSCB 1917 for the volume remain on each component system 302.

In the case of the remote dismount, the SDP 1805 in the system 302 receiving the dismount request datagram from the system dismount routine also invokes LDRH. LDRH determines from the datagram which remote system 302 the logical volume is on. It then makes a DPE 2219 and links it into its local DPL 2215 and sends a pending dismount message as described above to the remote system 302 with the logical volume. Since the logical volume is on a remote system 302, LDRH now waits on an acknowledgement from RDRH on the remote system 302. In response to the pending dismount message, the remote SDP 1805 invokes the remote dismount request routine, which makes a DPE 2219 for the dismount request, links it into DPL 2215, determines whether there are any files open on its system 302 in the volume, and sends a positive or negative dismount acknowledgement message to LDRH, which responds to the message by marking NACKRFL 2349, ODFL 2355, and NOACFL 2357 as required by the message. If the acknowledgement was positive, LDRH sends pending dismount messages to the SDPs 1805 on the remaining component systems 302 and returns. RDRH on each of those systems handles the pending dismount message as previously described, and the dismount continues as described for the local dismount. If any of the acknowledgements are negative, LRDH proceeds a previously described.

23. Synchronizing GVL 1807 when a System 302 is Connected to or Disconnected from System 301

Each SDP 1805 includes a data structure in which the current status of all SDPs 1805 in the system 301 is specified. A given SDP 1805 may be in one of three states: disconnected, connecting, and connected. Thus, when a component system 302 is disconnected, the state of its SDP 1805 in all of the other systems is "disconnected." As previously described, when a component system 302 is connected to a loosely-coupled system 301, it first synchronizes its global alias list as previously described. Among the global aliases are aliases for DMB MB 1811. Consequently, once the aliases are synchronized, the SDP 1805 on the system 302 being connected can use ICONNECT to establish a DMSESS 1813 with each of the SDPs 1805 on the other component systems. When the system 302 being connected invokes ICONNECT, it sets its status to "connecting". In response to the CONNECT message, each of the other SDPs 1805 marks the status of the connecting system as "connected" and uses IACCEPT to send an ACCEPT message to the SDP 1805 for the system which is being connected. If CONNECT messages from two systems 302 cross, each system compares its system ID with the system ID of the system from which it received the CONNECT message. The system 302 with the lower system ID declines the session, while the system 302 with the higher system ID accepts it, thereby ensuring that there is only one DMSESS 1813 between the systems' SDPs 1805.

In response to the ACCEPT message, that SDP 1805 marks its state as "connected" and uses ISEND to send each of the other SDPs 1805 a list of the names of the logical volumes present on the connecting system. Each of these SDPs 1805 first makes a MPE 2211 for each volume on the list and links it into MPL 2213. Field 2337 of each MPE 2211 indicates the system 302 the volume name is from. The SDP then compares each logical volume name in MPL 2213 which it has received from the system being connected with the logical volume names on its GVL 1807. If there are any matches, i.e., if any of the volume names are not unique, the SDP 1805 sends a negative acknowledgement message to SDP 1805 in the connecting system 302, which then uses IDISCONN to disconnect DMSESS 1813 from the other SDPs 1805. If there are no matches, the other SDP 1805 uses ISEND to send a positive acknowledgement message which contains a list of the names of the logical volumes on that SDP 1805 to the connecting SDP 1805. The connecting SDP 1805 makes MPEs 2211 for all of the logical volume names and locations which it receives from the other systems 302 and links them into MPL 2213 in the same fashion as described above. If it receives no negative acknowledgements, it makes its GVL 1807 from the MPEs 2211, makes a VSCB 1917 for each logical volume, deletes the MPEs 2211, and uses ISEND to send a confirmation message to each of the other SDPs 1805. In response to the confirmation message, each of the other SDPs 1805 adds the volume names it received from SDP 1805 for the connecting system 302 to its GVL 1807, adds VSCBs 1917 for those volumes, and deletes the MPEs 2211 received from the connecting system 302. It should be noted here that if a SDP 1805 receives a spin up message while another system 302 is connecting, that SDP 1805 simply adds the information required to make a MPE 2211 for the spun-up disk to the list sent to the connecting system.

SDP 1805 on a component system 302 responds to a DISCONNECT message received on any of the DMSESSs 1813 connecting it to another component system 302 by removing all GVLs 1806 and VSCBs 1917 for logical volumes belonging to the system from which the DISCONNECT message was received. When a given system 302 is detached by operator command, or when a given system 302 fails, the DISCONNECT messages are provided as previously described in the discussion of remote sessions.

Figure 25:
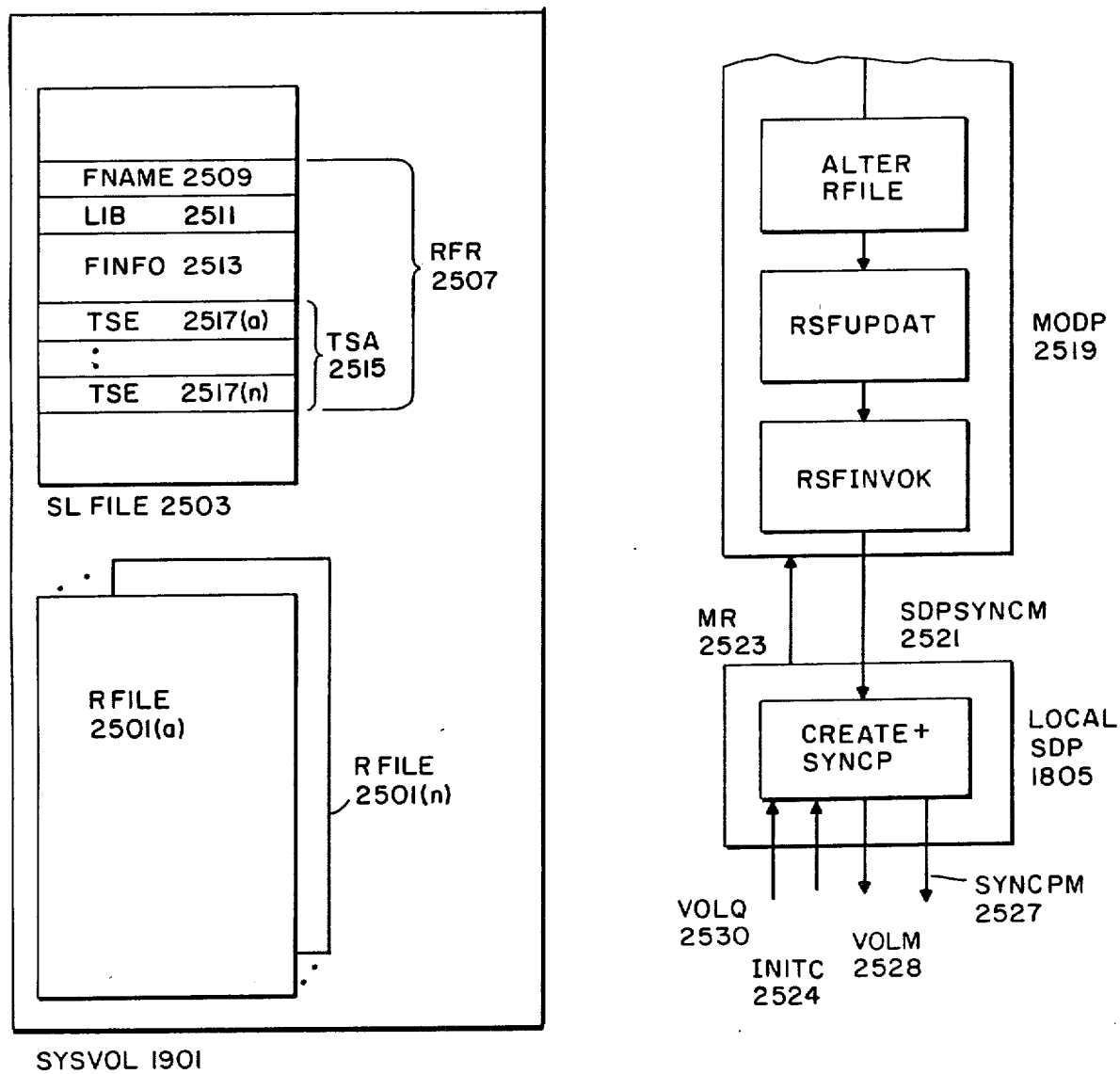
FIGS. 25 and 25A are a flow diagram of replicated file synchronization in system 302.

24. Synchronization of Replicated Files in System 301: FIG. 25

Certain global information required for operation of loosely-coupled system 301 must be locally available to each component system 302 and must be preserved when a given component system 302 is not operating. Such information is maintained in each system 302 in replicated files. Each system 302 has a copy of a given replicated file and all of the copies are identical. Examples of replicated files in a preferred embodiment are USERFILE 1905 and a GROUPFILE. As was previously explained, USERFILE 1905 contains an entry for each user of system 301. Included in the entry is information as to the kind of access the entry's user has to system 301. GROUPFILE defines groups of users.

Figure 25A:
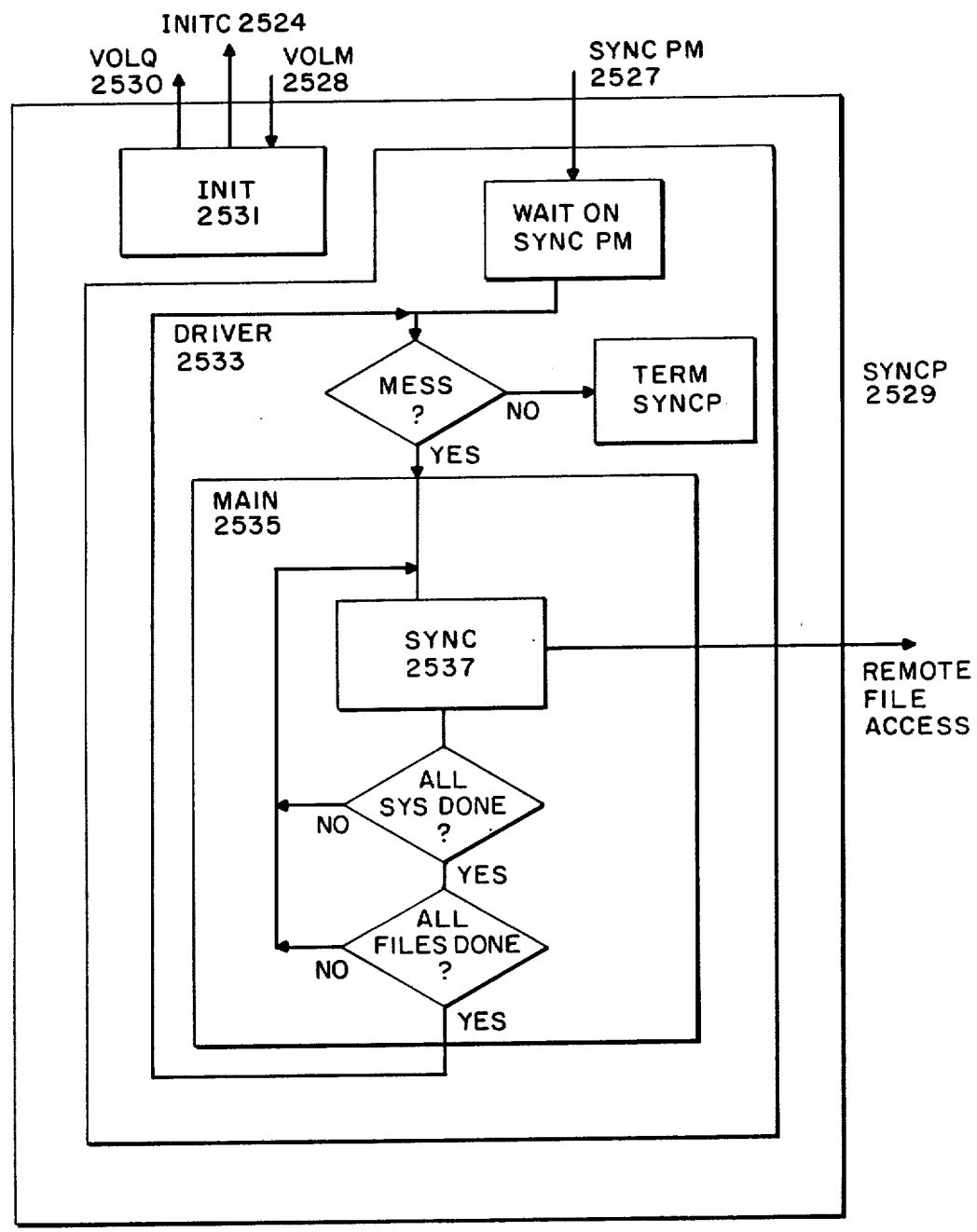

FIGS. 25 and 25A are a diagram of the structures used to manage replicated files in a preferred embodiment and a flow diagram of the processing involved in synchronizing a replicated file. Each replicated file (RFILE) 2501 has a replicated file record (RFR) 2507 in another file, synchronization file (SLFILE) 2503. In a preferred embodiment, all RFILES 2501 and SLFILE 2503 are located in SYSVOL 1901.

Each RFR 2507 contains the following information:
FNAME 2509: the name of RFILE 2501 represented by RFR 2507;
LIB 2522: the library in SYSVOL 1901 containing RFILE 2507;
FINFO 2513: information used in accessing RFILE 2507;
TSA 2515: an array of time stamp entries (TSEs) 2517, including a TSE 2517 for each system 302 showing when RFILE 2507 in that system 302 was last modified.

Synchronization is performed by routines executing in the process which modifies RFILE 2501 in a given component system 302 and by a synchronization process which is created by the local SDP 1805 of the component system 302 each time a RFILE 2501 must be synchronized. In FIGS. 25 and 25A, the modifying process is MODP 2519 and the synchronizing process is SYNCP 2529. Communication between MODP 2519, local SDP 1805, and SYNCP 2529 is by means of datagrams. Creation by SDP 1805 is necessary in a preferred embodiment because a process created by another process inherits the access privileges of the creating process. Here, MODP 2519 is a user process and cannot give SYNCP the access privileges necessary to modify RFILEs 2501 on remote systems 302, while SDP 1805, as a system process, can.

RFILES 2501 are synchronized across system 301 as follows: when a MODP 2519 in a given system 302 modifies RFILEs 2501, each time it modifies an RFILE, it calls a system routine called RSFUPDAT with the file and library names of RFILE 2501 which has been modified. RSFUPDAT locates RFR 2507 for RFILE 2501 in SLFILE 2503 and then locates TSE 2517 for the system 302 where the modification is taking place. It then places a value indicating the current time on system 302 in TSE 2517. Thereupon, the process calls the system routine RSFINVOK, giving it as an argument a list of the names of the RFILEs 2501 which were modified. In the cases of USERFILE and GROUPFILE, the above operations are performed by operating system security utility routines. RSFINVOK first compares the list of RFILES 2501 with RFRs 2507 to determine that each of the files on the list is in fact an RFILE 2501. If all of them are, RSFINVOK uses ISEND to send a datagram, SDPSYNCM 2521, containing the list to DMMB 1811 in local SDP 1805 and waits on a confirmation that SDPSYNCM 2521 was delivered to local SDP 1805.

On receiving to the datagram, SDP 1805 returns a response to MODP 2519 indicating that the message has been received and creates SYNCP 2529. As shown in FIG. 25A, on creation, SYNCP 2529 executes an INIT routine to initialize itself. INIT 2531 sets up a MB 413 and then sends a remote volume query message, VOLQ 2530, which includes MBID 515 for the mailbox in a datagram to SDP 1805 and waits on the MB 413. SDP 1805 responds to the remote volume query message by sending a VOLM 2528 datagram to SYNCP 2529. Contained in that datagram, is a list of the SYSVOLs 1901 on all systems 302 and the systems they are on. SDP 1805 obtains the list from GVL 1807. In response to the VOLM 2528 datagram, INIT 2531 sends an initialization complete datagram, INITC 2524, and returns. SYNCP 2529 waits on the MB 413 for SYNCP 2529.

SDP 1805 responds to INITC 2524 by sending SYNCPM 2527, which contains the list of RFILEs 2501 to be synchronized. In response to SYNCPM 2527, SYNCP 2529 invokes DRIVER routine 2533, which processes SYNCPMs 2527 and continues executing as long as there is a SYNCPM 2527 outstanding. When there are no more SYNCPMs 2527, DRIVER terminates SYNCP 2529. DRIVER processes a SYNCP 2529 by invoking MAIN routine 2535, which is a loop which processes the list of RFILEs 2501 from SYNCPM and for each RFILE 2501 on the list, synchronizes that RFILE 2501 on all component systems 302. MAIN performs each synchronization for a given RFILE 2501 and a given pair of systems 302 by invoking SYNC routine 2537. SYNC 2537 employs the remote file access system previously discussed to synchronize RFILEs 2501 between local system 302 and a remote system 302 as follows: first, it opens SLFILE 2503 on the remote system and checks whether the RFILE 2501 being synchronized has an RFR 2507 in that SLFILE 2503. If there is none, SYNC 2537 creates one there and continues as if there were one. If there is an RFR 2507, SYNC compares TSEs 2517 from the local and remote RFRs 2507. There are four TSEs 2517 of interest: TSE(1) 2517 in the local RFR for the local system 302, TSE(2) in the local RFR for the remote system 302, TSE(3) 2517 in the remote RFR for the local system 302, and TSE(4) 2517 in the remote RFR 2507 for the remote system 302.

First, SYNC determines whether synchronization is necessary by comparing TSE(1) and TSE(3) and TSE(2) and TSE(4). If either TSE(1)'s time is later than TSE(3)'s time or TSE(4)'s time is later than TSE(2)'s time, one of the RFILEs 2501 is out of synchronization. The next step is determining which is the most recent file. If TSE(1)'s time was later than TSE(3)'s but TSE(4)'s time is not later than TSE(2)'s, or vice-versa, RFILE 2501 represented by TSE(1) or TSE(4) respectively is the most recent file. If both TSE(1) and TSE(4) are later than TSE(3) and TSE(2) respectively, TSE(1) and TSE(4) are compared; if TSE(1) is later, it is the most recent; otherwise TSE(4) is the most recent. Once the most recent RFILE 2501 is determined, SYNC deletes the other RFILE 2501 and replaces it with a copy of the RFILE 2501 from the other system.

When the copy is made, SYNC updates RFR 2507 for RFILE 2501 on both systems. The updating consists of setting the TSEs 2517 for the two systems 302 involved in the synchronization to the time specified in the TSE 2517 for the system 302 from which the file was copied and of seting the TSEs 2517 for the systems 302 not involved in the synchronization to the most recent time for those systems in either of the RFRs 2507 for the RFILEs 2501 being synchronized, thereby ensuring that both RFRs 2507 reflect the most recent update.

When SYNC returns, MAIN checks whether synchronization for the RFILE 2501 needs to be performed on any other system 302 and whether there are any other RFILEs 2501 to be synchronized. If either is the case, MAIN again invokes SYNC 2537; otherwise, it returns to DRIVER 2533.

Synchronization of RFILEs 2501 when a system 302 is connected to system 301 is performed following volume synchronization by SDP 1805 for the connecting process. SDP 1805 creates SYNCP 2529 as previously described, but sends it a special version of SYNCPM 2527 which indicates that all of the RFILEs 2501 with RFRs in SLFILE 2503 are to be synchronized. SYNCP 2529 then synchronizes each of those files as previously described. As may be inferred from the above discussion, RFILE 2501 in a preferred embodiment is yet another embodiment of a GIL 215 and SYNCP 2529 another embodiment of a GIMS 213.

25. Conclusion

The foregoing Description of a Preferred Embodiment has disclosed how one may construct a loosely-coupled computer system in which certain resources are global, i.e., are accessible to users of the stand-alone component systems which make up the loosely-coupled system as if they were located on the user's component system. The Description has further disclosed how lists of global identifiers which represent the global resources on the component systems and which are identical on all of the component systems may be created and maintained and how systems may be built which determine from an identifier for a global resource whether the resource is local or remote and if it is remote, provide access to the resources by means of messages between the component system upon which the request to access the resource arises and the component system where the resource is located. Examples of global resources and remote access thereto which have been specifically disclosed herein include remote sessions between component systems, global mail box aliases, access to files which are on remote component systems, global volume names, and global user and group lists.

The embodiments disclosed herein are purely illustrative and exemplary. For example, it will be apparent upon study of the Description and drawings that the principles disclosed herein may be used to make other resources globally available, and systems which employ the disclosed principles to make such other resources globally available are within the concept of the invention. Moreover, the invention may be implemented using stand-alone computer systems other than the WANG VS systems used in the preferred embodiment and using communications means other than the I/O processor and high-speed link disclosed herein. The invention is further not dependent on special characteristics of the WANG VS operating system nor on special characteristics of its inter-process message system, file system, or security system, but may be implemented on systems having other operating systems, message systems, file systems, or security systems. For example, in other embodiments, standard session-level communications protocols might be substituted for the inter-process messages of the present embodiment. Finally, implementations conceptually and functionally equivalent to the ones disclosed herein may be made employing data structures and algorithms different from the ones disclosed herein.

Thus, the scope of the invention is not limited by the embodiments disclosed herein, but is instead determined solely by the appended claims and includes all embodiments which come within the meaning and range of equivalency of the claims.

What is claimed is:

1. A digital computer system comprising:
  (1) a plurality of stand-alone computer systems;
  (2) message transfer means for transferring messages among the stand-alone systems; and
  (3) in each of the stand-alone systems,
    (a) a plurality of processes,
    (b) a plurality of global mailboxes, each mailbox belonging to one of the processes,
    (c) a global mailbox list containing indications of all of the global mailboxes in the digital computer system and the stand-alone system to which each global mailbox belongs,
    the processes including
      a first process which establishes a session for exchanging messages with a second process having a global mailbox, the first process determining from the global mailbox list whether the global mailbox is on another one of the stand-alone systems and if that is the case, sending a connect message specifying the global mailbox via the message transfer means, and
      a remote session establishment process which receives the connect message from the message transfer means and responds thereto by establishing a remote session employing the message transfer means between the first process and the second process,
  whereby a process on one of the stand-alone systems establishes a session with any process on any of the stand-alone systems to which one of the global mailboxes belongs.

2. The digital computer system as set forth in claim 1 and wherein:
  each of the indications is an alias including a mailbox name and a location specifier.

3. The digital computer system as set forth in claim 1 and wherein:
  the remote session establishment process further responds to a mailbox list maintenance message from another stand-alone system indicating an operation on the global mailbox list by performing the operation indicated by the message.

4. The digital computer system as set forth in claim 3 and
  further including a third process which performs an operation on the global mailbox list in the stand-alone system and sends the mailbox list maintenance message indicating the operation to the other stand-alone systems.

5. The digital computer system as set forth in claim 4 and wherein:
  the operation is adding an indication to the global mailbox list;
  the third process adds the indication to the global mailbox list in the stand-alone system by making a pending indication, sending an addition message specifying the pending indication to the other stand-alone systems, awaiting an accept message from each of the other stand-alone systems, adding the pending indication to the global mailbox list after receiving all of the accept messages, and sending an activate message to each of the other stand-alone systems; and
  the remote session establishment process in each of the other stand-alone systems adds the pending indications to the global mailbox list by making a pending indication in response to the addition message, sending the accept message, awaiting the activate message, and on receipt of the activate message, adding the pending indication to the global mailbox list.

6. The digital computer system as set forth in claim 4 and wherein:
  the operation is cancelling an indication from the global mailbox list;
  the third process cancels the indication by removing the indication from the global mailbox list and thereupon sending a cancellation message specifying the removed indication to each of the other stand-alone systems and
  the remote session establishment process in each of the other stand-alone systems removes the indication specified in the cancellation message from the global mailbox list in response to the cancellation message.

7. The digital computer system as set forth in claim 3 and wherein:
  the operations include providing the global mailbox list to a stand-alone system being added to the digital computer system;
  the stand-alone system added sends an initialization message via the data transfer means to the other stand-alone systems;
  the remote session establishment process in each of the other stand-alone systems responds to the initialization message by sending a global mailbox list message indicating the global mailboxes located on the stand alone system to the stand-alone system being added; and
  the remote session establishment process on the stand-alone system being added responds to the global mailbox list messages by creating that stand-alone system's global mailbox list from the global mailbox list messages.

8. The digital computer system as set forth in claim 7 and wherein:

the remote session establishment process on the stand-alone system being added constructs that system's global mailbox list by sending a first global mailbox list response message containing the constructed global list to the other stand-alone systems, awaiting a second global mailbox list response message containing a second global list from each of the other stand-alone systems, and if all of the second global lists are identical with the constructed global mailbox list, using the constructed global mailbox list as the mailbox list and otherwise indicating an error and the remote session establishment process on each of the other stand-alone systems responds to the first global mailbox list response message by making that system's global mailbox list using the first global mailbox list and sending the second global mailbox list response message containing that system's global mailbox list to the system being added.

9. The digital computer system as set forth in claim 3 and wherein:

when one of the stand-alone systems is detached from the digital computer system, the operation is removing the indications in the global mailbox list for global mailboxes belonging to the stand-alone system being detached and the remote session establishment process in each of the other stand-alone systems responds to a detachment message indicating the detaching operation from the stand-alone system being detached by removing the indications in that system's global mailbox list for the global mailboxes in the stand-alone system being detached.

10. A digital computer system comprising:
(1) a plurality of stand-alone computer systems;
(2) message transfer means for transferring messages among the stand-alone systems; and
(3) in each of the stand-alone systems,
  (a) a global volume list containing at least one identifier identifying a global volume containing files, each global volume being located on a system of the plurality of stand-alone computer systems and accessible to other systems of the plurality of stand-alone computer system and the identifiers on the global volume list identifying each global volume and the system of the plurality of stand-alone computer systems upon which the global volume is located,
  (b) a plurality of processes for executing programs on the stand-alone system,
  (c) remote session establishment means for establishing sessions for sending messages via the data transfer means between processes on different ones of the stand-alone systems,
  (d) global volume accessing means executing in a first one of the processes,
  (e) global volume request receiving means executing in a second one of the processes, and
  (f) global volume list maintenance means executing in a third one of the processes which keeps the global volume list identical to the global volume lists in the other stand-alone systems;
and wherein the global volume accessing means determines from the global volume list whether a requested global volume is on another one of the stand-alone systems and if it is, causes the first one of the processes to employ the remote session establishment means to establish a session with the second one of the processes on the other stand-alone system and thereupon provides a first message via the session to which the global volume request receiving means executing in the second one of the processes responds by accessing the requested global volume as specified in the first message and the third one of the processes has a session with the third one of the processes in each of the other stand-alone systems and the global volume list maintenance means maintains the global volume list by means of messages exchanged via the sessions with the other third ones of the processes.

11. The digital computer system as set forth in claim 10 and wherein:

the second one of the processes further provides a second message via the session to the first one of the processes indicating the result of the access to the requested global volume.

12. The digital computer system as set forth in claim 10 and further including in each stand-alone system:

means for adding a volume to the stand-alone system; and means for detecting the addition of the volume to the stand-alone system; and wherein the global volume list maintenance means responds to the detection of the addition of the volume by sending pending mount messages via the sessions to the other third ones of the processes indicating that the identifier of the volume is to be added to the global volume lists in those stand-alone systems, waiting for acknowledgement messages from the other third ones of the processes, and on receipt of all of the acknowledgement messages, adding the identifier for the volume to the global volume list and sending a confirmation message to the other such processes.

13. The digital computer system as set forth in claim 12 and wherein:

the global volume list maintenance means further responds to the pending mount message by checking the global volume list to determine whether the identifier for the volume specified in the pending mount message can be added to the global volume list and if it can be, sending an acknowledgement message via the session with the third one of the processes from which the pending mount message was received and responding to the confirmation message by adding the identifier for the specified volume to the global volume list.

14. The digital computer system as set forth in claim 27 and further including in each stand-alone system:

means connected to the data transfer means for detecting that an additional stand-alone system has been added to the digital computer system; and wherein the global volume list maintenance means further responds to the detection of the addition of a stand-alone system by establishing a session with the third one of the processes in the additional stand-alone system and sending a global volume list message via the session containing the identifiers for the global volumes on the global volume list;

the global volume list maintenance means in the additional stand-alone system creates a new global volume list from the global volume list messages received from the other stand-alone systems and sends a global volume list message with the new global volume list to the other stand alone systems; and the global volume list maintenance means in each of the other stand alone systems compares its global volume list with the new global volume list and updates its global volume list by adding any identifiers for global volumes not on its global volume list to its global volume list.

15. The digital computer system as set forth in claim 14 and wherein:

the global volume list maintenance means in each of the other stand-alone systems returns the updated global volume list to the additional stand alone system; and the global volume list maintenance means compares the updated global volume lists with its global volume list and signals an error if the global volume lists are not identical.

* * * * *